United States Patent
Asaad et al.

(10) Patent No.: US 10,664,234 B2
(45) Date of Patent: May 26, 2020

(54) SPATIAL PREDICATES EVALUATION ON GEOHASH-ENCODED GEOGRAPHICAL REGIONS

(71) Applicant: International Business Machines Corporation, Armonk, NY (US)

(72) Inventors: Sameh W. Asaad, Briarcliff Manor, NY (US); Dajung Lee, San Diego, CA (US); Roger Moussalli, Peekskill, NY (US); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/361,850

(22) Filed: Mar. 22, 2019

(65) Prior Publication Data
US 2019/0235835 A1    Aug. 1, 2019

Related U.S. Application Data

(62) Division of application No. 15/080,886, filed on Mar. 25, 2016, now Pat. No. 10,346,131.

(51) Int. Cl.
*G07F 7/02* (2006.01)
*G06F 16/29* (2019.01)
*G06F 7/02* (2006.01)

(52) U.S. Cl.
CPC ............... *G06F 7/02* (2013.01); *G06F 16/29* (2019.01)

(58) Field of Classification Search
CPC .. H04W 4/02–046; G01S 19/13; G01S 19/42; G01S 5/00; G06F 17/30241
See application file for complete search history.

(56) References Cited

U.S. PATENT DOCUMENTS 7,426,455 B1 *   9/2008   Antony .................. G06F 17/10
                                                         345/443
8,715,088 B2    5/2014   Kohlhoff
(Continued)

OTHER PUBLICATIONS

R. Moussalli et al., "Fast and Flexible Conversion of Geohash Codes to and from Latitude/Longitude Coordinates," 23rd Annual International IEEE Symposium on Field-Programmable Custom Computing Machines (FCCM 2015), May 2015, p. 179-186, Institute of Electrical and Electronics Engineers (IEEE).
(Continued)

*Primary Examiner* — Matthew D Sandifer
(74) *Attorney, Agent, or Firm* — Jeff LaBaw, Esq.; Hoffmann & Baron, LLP

(57) ABSTRACT

A method of performing an evaluation of a spatial predicates for first and second regions includes receiving a first set of geohashes representing the first region, and receiving a second set of geohashes representing the second region. The method also includes for each geohash within the first set of geohashes: performing a respective pairwise evaluation of a first spatial primitive for the geohash within the first set and each of the geohashes within the second set to produce a set of first binary results corresponding to respective ones of the geohashes within the second set; and combining the set of first binary results using a first Boolean logic operator to produce one of a set of second binary results corresponding to respective ones of the geohashes within the first set. The method further includes combining the set of second binary results using a second Boolean logic operator to produce a third binary result corresponding to the first set of spatial primitives.

13 Claims, 26 Drawing Sheets

(56) References Cited

U.S. PATENT DOCUMENTS

| | | | |
|---|---|---|---|
| 8,938,686 B1 | 1/2015 | Erenrich et al. | |
| 9,426,620 B2* | 8/2016 | Xu | H04W 4/021 |
| 10,311,088 B1* | 6/2019 | Fowler | G06F 16/29 |
| 2012/0233210 A1 | 9/2012 | Bogosian | |
| 2013/0013661 A1* | 1/2013 | Inakoshi | G01C 21/20 |
| | | | 708/442 |
| 2013/0054647 A1 | 2/2013 | Terauchi | |
| 2013/0097163 A1 | 4/2013 | Oikarinen et al. | |
| 2014/0280318 A1 | 9/2014 | Simms et al. | |
| 2015/0046086 A1 | 2/2015 | Krauss | |
| 2015/0052154 A1 | 2/2015 | Krauss | |
| 2015/0095333 A1 | 4/2015 | Porpora et al. | |
| 2015/0215409 A1 | 7/2015 | Chow et al. | |
| 2016/0283515 A1* | 9/2016 | Moussalli | G01S 19/13 |

OTHER PUBLICATIONS

C. Strobl, "Dimensionally Extended Nine-Intersection Model (DE-9IM)," in Encyclopedia of GIS (S. Shekhar & H. Xiong, eds.), 2008, p. 240-245, Springer Science+Buisiness Media.

A. Fox et al., "Spatio-temporal Indexing in Non-relational Distributed Databases," 2013 IEEE International Conference on Big Data, Oct. 2013, p. 291-299, Institute of Electrical and Electronics Engineers (IEEE).

J. Fender et al., "A High-speed Ray Tracing Engine Built on a Field-Programmable System," 2003 IEEE International Conference on Field-Programmable Technology (FPT), Dec. 2003, p. 188-195, Institute of Electrical and Electronics Engineers (IEEE).

J. Schmittler et al., "Realtime Ray Tracing of Dynamic Scenes on an FPGA Chip," Proceedings of the ACM SIGGRAPH/EUROGRAPHICS Conference on Graphics Hardware (GH '04), Aug. 2004, p. 95-106, Association for Computing Machinery (ACM).

M. Woulfe et al., "Hardware Accelerated Broad Phase Collision Detection for Realtime Simulations," 4th Workshop in Virtual Reality Interactions and Physical Simulation (VRIPHYS), 2007, 10 pages, The Eurographics Association.

H. Hussain et al., "An Adaptive FPGA Implementation of Multi-Core K-Nearest Neighbour Ensemble Classifier Using Dynamic Partial Reconfiguration," 22nd International Conference on Field Programmable Logic and Applications (FPL 2012), Aug. 2012, p. 627-630, Institute of Electrical and Electronics Engineers (IEEE).

E.S. Manolakos et al., "Flexible IP Cores for the k-NN Classification Problem and Their FPGA Implementation," 2010 IEEE International Symposium on Parallel & Distributed Processing, Workshops and Phd Forum (IPDPSW), Apr. 2010, p. 1-4, Institute of Electrical and Electronics Engineers (IEEE).

L. Woods et al., "Complex Event Detection at Wire Speed with FPGAs," Proceedings of the VLDB Endowment, Sep. 2010, v. 3, n. 1-2, p. 660-669, VLDB Endowment.

R. Moussalli et al., "Stream-Mode FPGA Acceleration of Complex Pattern Trajectory Querying," in Advances in Spatial and Temporal Databases, 13th International Symposium (SSTD 2013), Aug. 2013, Lecture Notes in Computer Science (LNCS) 8098, Springer-Verlag.

R. Moussalli et al., "High Performance FPGA and GPU Complex Pattern Matching Over Spatio-Temporal Streams," GeoInformatica, Apr. 2015, v. 19, n. 2, p. 405-434, Springer Science+Buisiness Media.

ESRI (Environmental Systems Research Institute), "Understanding spatial relations," as of Mar. 4, 2016, 14 pages, http://edndoc.esri.com/arcsde/9.0/general_topics/understand_spatial_relations.htm.

Wikipedia, "DE-9IM," as of Mar. 4, 2016, 13 pages, https://en.wikipedia.org/w/index.php?title=DE-9IM&printable=yes.

geohash.org, "Tips & Tricks," as of Mar. 4, 2016, 3 pages, http://geohash.org/site/tips.html.

Wikipedia, "Geohash," as of Mar. 4, 2016, 7 pages, https://en.wikipedia.org/w/index.php?title=Geohash&printable=yes.

Alpha Data, "ADM-PCIE-7V3," as of Mar. 4, 2016, 2 pages, http://www.alpha-data.com/dcp/products.php?product=adm-pcie-7v3.

MongoDB, Inc., "MongoDB Manual 3.2: Geospatial Indexes and Queries," as of Mar. 4, 2016, 2 pages, https://docs.mongodb.org/manual/applications/geospatial-indexes/.

Oracle Corporation, "MySQL 5.7 Reference Manual 12.15.10 Spatial Geohash Functions," as of Mar. 4, 2016, 3 pages, http://dev.mysql.com/doc/refman/5.7/en/spatial-geohash-functions.html.

International Business Machines (IBM), "IBM Streams," as of Mar. 4, 2016, 2 pages, http://www-03.ibm.com/software/products/en/ibm-streams.

International Business Machines (IBM), "IBM SPSS software," as of Mar. 4, 2016, 3 pages, http://www-01.ibm.com/software/analytics/spss/.

V. Singala, "Finding Nearest Location with Open Box Query using Geohashing and MapReduce," Thesis for Master of Engineering, Jul. 2013, Computer Science and Engineering Department, Thapar University, Patiala, India.

Moussalli et al., "Enhanced Conversion Between Geohash Codes and Corresponding Longitude Latitude Coordinates," U.S. Appl. No. 14/669,715, filed Mar. 26, 2015, not yet published, 43 pages.

* cited by examiner

FIG. 9A

671  $Mask_{prefix} = < m_i | m_i = 1, \text{ if } 0 \leq i < K; 0, \text{ otherwise} >$ 672  $Mask_{short} = < m_i | m_i = 1, \text{ if } 0 \leq i < S; 0, \text{ otherwise} >$ 673  $Mask_{long} = < m_i | m_i = 1, \text{ if } 0 \leq i < L; 0, \text{ otherwise} >$ 674  $Mask_{suffix:S} = < m_i | m_i = 1, \text{ if } K \leq i < L; 0, \text{ otherwise} >$ 675  $Mask_{suffix:L} = < m_i | m_i = 1, \text{ if } K \leq i < S; 0, \text{ otherwise} >$ 676  $Mask_{suffix:T} = < m_i | m_i = 1, \text{ if } S \leq i < L; 0, \text{ otherwise} >$

FIG. 9B $Mask_{prefix} = \{1_0\ 1_1\ ...\ 1_{K-2}\ 1_{K-1}\} \| \{0_K\ 0_{K+1}\ ...\ 0_{S-2}\ 0_{S-1}\} \| \{0_S\ ...\ 0_{L-2}\ 0_{L-1}\} \| \{0_L\ ...\ 0_{N-1}\}$ $Mask_{short} = \{1_0\ 1_1\ ...\ 1_{K-2}\ 1_{K-1}\} \| \{1_K\ 1_{K+1}\ ...\ 1_{S-2}\ 1_{S-1}\} \| \{0_S\ ...\ 0_{L-2}\ 0_{L-1}\} \| \{0_L\ ...\ 0_{N-1}\}$ $Mask_{long} = \{1_0\ 1_1\ ...\ 1_{K-2}\ 1_{K-1}\} \| \{1_K\ 1_{K+1}\ ...\ 1_{S-2}\ 1_{S-1}\} \| \{1_S\ ...\ 1_{L-2}\ 1_{L-1}\} \| \{0_L\ ...\ 0_{N-1}\}$ $Mask_{suffix:S} = \{0_0\ 0_1\ ...\ 0_{K-2}\ 0_{K-1}\} \| \{1_K\ 1_{K+1}\ ...\ 1_{S-2}\ 1_{S-1}\} \| \{0_S\ ...\ 0_{L-2}\ 0_{L-1}\} \| \{0_L\ ...\ 0_{N-1}\}$ $Mask_{suffix:L} = \{0_0\ 0_1\ ...\ 0_{K-2}\ 0_{K-1}\} \| \{1_K\ 1_{K+1}\ ...\ 1_{S-2}\ 1_{S-1}\} \| \{1_S\ ...\ 1_{L-2}\ 1_{L-1}\} \| \{0_L\ ...\ 0_{N-1}\}$ $Mask_{suffix:T} = \{0_0\ 0_1\ ...\ 0_{K-2}\ 0_{K-1}\} \| \{0_K\ 0_{K+1}\ ...\ 0_{S-2}\ 0_{S-1}\} \| \{1_S\ ...\ 1_{L-2}\ 1_{L-1}\} \| \{0_L\ ...\ 0_{N-1}\}$

|  | CONTAIN PREDICATE | TOUCH PREDICATE | WITH PCIe |
|---|---|---|---|
| LUTs | 571 | 2798 | 28690 |
| FFs | 504 | 2927 | 38409 |
| DSPs | 0 | 0 | 32 |
| BRAM 18K | 0 | 0 | 16 |

FIG. 24

$\text{Constant}_{ones} = \{1_0\ 1_1\ ...\ 1_{K-2}\ 1_{K-1}\}\ ||\ \{1_K\ 1_{K+1}\ ...\ 1_{S-2}\ 1_{S-1}\}\ ||\ \{1_S\ ...\ 1_{L-2}\ 1_{L-1}\}\ ||\ \{1_L\ ...\ 1_{N-1}\}$ $\underleftarrow{\text{Shift left}}$

FIG. 25

$BP(g_S, g_L) = \{0_0\ 0_1\ ...0_{K-2}\ 0_{K-1}\}\ ||\ \{1_{K\geq S}\ ...0_{L-2}\ 0_{L-1}\}\ ||\ \{0_L\ ...0_{N-1}\}$ $\text{Decoded}(g_S) = \boxed{\{0_0\ 0_1\ ...0_{S-2}\ 0_{S-1}\}\ ||\ \{1_{S(K)}\}}\ ...\ 0_{L-2}\ 0_{L-1}\}\ ||\ \{0_L\ ...0_{N-1}\}$ $\hookrightarrow \text{AND of Decoded}_{gs}(K\ \text{downto}\ 0) \neq 0$

FIG. 26

$...\ ||\{1_K\ 0_{K+1}\ 0_{K+2}\ 1_{K+3}\ 0_{K+4}\ 1_{K+3}\ ...\ s_{S-1}\}||\ ...$ $\underleftrightarrow{\text{S-K bits}}$

FIG. 27

$\_100101_{new:S} = \{1_0 \; 0_1 \; 0_3 \; 1_4 \; 0_5 \; 1_6 \; \cdots \; 0(1)_{S-K-1}\} \| \{\cdots\}$
$\underbrace{\hspace{4cm}}_{S-K \text{ bits}}$

FIG. 28

$g_S = \{prefix\} \| \{s_K \; s_{K+1} \; \cdots \; s_{S-2} \; s_{S-1}\} \| \{0_S \; \cdots \; 0_{L-2} \; 0_{L-1}\} \| \{0_L \; \cdots \; 0_{N-1}\}$ S-K bits $g_{S:new} = \{s_0 \; s_1 \; \cdots \; s_{S-K-2} \; s_{S-K-1}\} \| \{0_{S-K} \; \cdots \; 0_{L-2} \; 0_{L-1}\} \| \{0_L \; \cdots \; 0_{N-1}\}$

SPATIAL PREDICATES EVALUATION ON GEOHASH-ENCODED GEOGRAPHICAL REGIONS

CROSS-REFERENCE TO RELATED APPLICATIONS

The present application is a divisional of U.S. patent application Ser. No. 15/080,886, filed Mar. 25, 2016, having the same title and inventors as the present application, which in turn is related to U.S. patent application Ser. No. 14/669,715 filed on Mar. 26, 2015 and entitled "Enhanced Conversion Between Geohash Codes and Corresponding Longitude/Latitude Coordinates," the disclosures of which are hereby incorporated by reference herein in their entireties.

STATEMENT REGARDING DISCLOSURES BY THE INVENTORS

A paper entitled "Fast and Flexible Conversion of Geohash Codes to and from Latitude/Longitude Coordinates," the disclosure of which is hereby incorporated by reference herein, was presented at the 23rd Annual IEEE International Symposium on Field-Programmable Custom Computing Machines in May 2015. A copy of this paper is submitted herewith and cited in an accompanying Information Disclosure Statement (IDS). Each of the authors of this paper is also named as an inventor in the present application. This paper was not published or otherwise made available to the public more than one year before the filing of the parent U.S. application Ser. No. 15/080,886.

BACKGROUND OF THE INVENTION

The present invention relates generally to the electrical, electronic and computer arts, and, more particularly, to geographical information management.

In the era of Big Data and the Internet-of-Things-That-Move, embedded location sensing (e.g., Global Position System or GPS) devices are becoming ubiquitous within smart phones, laptops, smart watches, navigation systems, and even digital cameras. These embedded devices continuously produce time-stamped spatial (i.e. spatiotemporal) data, thus allowing for querying of devices, cars, and/or individuals in motion. Analyzing this data (e.g., extracting patterns) presents significant business opportunities, such as by enabling the resolving of complex problems pertaining to fields including but not limited to crime pattern analysis, epidemic spread characterization, insurance pricing, and traffic congestion prediction.

However, analyzing spatiotemporal data also creates new challenges arising from the overwhelming amounts of such data being produced, as well as the complexity of the queries coupled with processing performance constraints (in many cases real-time). Moreover, the volume of such data is rapidly increasing, especially due to the widespread use of GPS-enabled smart-phones. Thus, new high-performance techniques are needed to attain improved levels of processing performance for spatial (e.g., geographic) queries.

Geohash is a geographic coordinate system which was recently introduced in 2009, and which is widely used for indexing in geographical information systems (GIS). 0/1/2-D geometries can be represented using one or more geohash codes of potentially varying precisions (i.e. code lengths) by encoding a point (0-dimension), line (1-dimension) or 2-D shape as a 2-D shape (collection of boxes) when encoded with geohashes. Geohash codes have many benefits over the conventional longitude latitude system, including integer indexing, arbitrary precision (shortening the code lowers precision), and simple proximity estimation (prefix matching).

However, traditional spatial algorithms operate on data represented using the conventional latitude/longitude geographical coordinate system, and as such spatial predicates on 0/1/2-D geometries are instead evaluated using the Dimensionally Extended Nine-Intersection Model (DE-9IM) matrix, which lacks the aforementioned benefits associated with geohash-coded geometries. Geometries (such as geographical regions) can be represented in several ways, such as by a list of edges (and respective vertices) or by a list of geohash blocks. Spatial predicates are operations applied to determine relations between geometries. Spatial predicates are evaluated using the DE-9IM model for non-geohash-encoded geometries, but there exists no defined mechanism to evaluate spatial predicates on geohash-encoded regions.

BRIEF SUMMARY

Principles of the invention, in accordance with one or more embodiments thereof, provide techniques for geohash-based evaluation of spatial predicates and/or spatial primitives. In one aspect, a method of performing an evaluation of a spatial predicate for a first region and a second region comprises: receiving a first set of one or more geohashes representing the first region, and receiving a second set of one or more geohashes representing a second region. The method also comprises, for each geohash within the first set of one or more geohashes: performing a respective pairwise evaluation of a first spatial primitive for the geohash within the first set and each of the geohashes within the second set to produce a set of first binary results corresponding to respective ones of the geohashes within the second set; and combining the set of first binary results using a first Boolean logic operator to produce one of a set of second binary results corresponding to respective ones of the geohashes within the first set. The method further comprises combining the set of second binary results using a second Boolean logic operator to produce a third binary result corresponding to the first one of the set of spatial primitives.

In another aspect, a method of evaluating each of plurality of spatial primitives for a pair of geohashes comprises the steps of: detecting which of the pair of geohashes is a shorter geohash and which of the pair of geohashes is a longer geohash; identifying a breakpoint for the pair of geohashes; determining a set of one or more masks each associated with at least one of the pair of geohashes; evaluating a first one of the spatial primitives for the pair of geohashes, the first one of the spatial primitives being a "contain" spatial primitive; and evaluating at least a second one of the spatial primitives for the pair of geohashes, the at least second one of the spatial primitives being at least one "touch" spatial primitive.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. By way of example only and without limitation, one or more embodiments may advantageously facilitate geohash-based evaluation of spatial predicates and/or spatial primitives, with significantly increased performance relative to conventional non-geohash-based evaluation techniques, such as DE-91M discussed above.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

The following drawings are presented by way of example only and without limitation, wherein like reference numerals (when used) indicate corresponding elements throughout the several views, and wherein:

FIG. 9A conceptually depicts exemplary terminology and notation associated with an illustrative embodiment of the present invention;

FIG. 9B conceptually depicts exemplary terminology and notation associated with an illustrative embodiment of the present invention;

FIGS. 24-28 are illustrative formulaic expressions referred to throughout portions of the Detailed Description, according to embodiments of the present invention.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of the present invention will be described herein in the context of illustrative methods and/or apparatuses for geohash-based evaluation of spatial predicates and/or spatial primitives. It is to be appreciated, however, that the invention is not limited to the specific apparatuses and/or methods illustratively shown and described herein. Rather, aspects of the present disclosure relate more broadly to methods and apparatus for performing geohash-based evaluation of spatial predicates and/or spatial primitives. Moreover, it will become apparent to those skilled in the art given the teachings herein that numerous modifications can be made to the embodiments shown that are within the scope of the claimed invention. That is, no limitations with respect to the embodiments shown and described herein are intended or should be inferred.

I. Use of Geohash Spatial Primitives to Compute Spatial Predicates

I-A. Overview of Geohash Coding

Figure 1A:
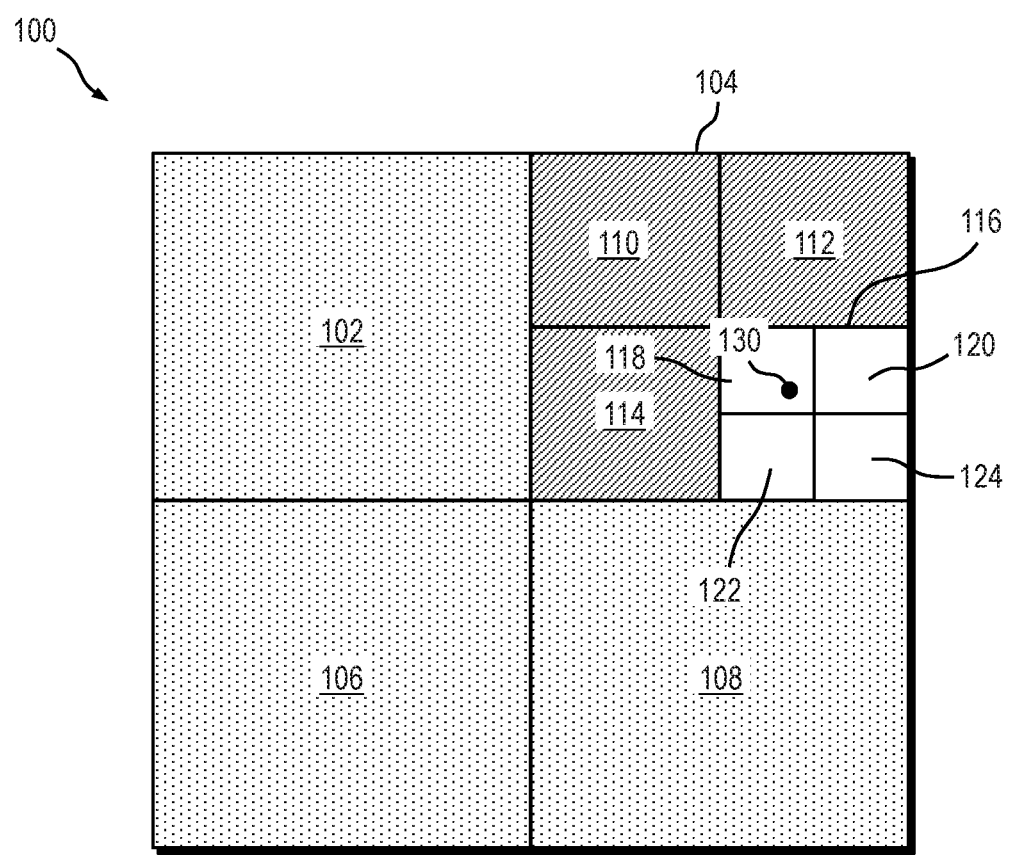
FIG. 1A conceptually depicts an illustrative division of a space into a plurality of buckets.

Geohash is a geographic coordinate system that hierarchically divides space into grid-shaped buckets. FIG. 1A conceptually depicts an illustrative division of a space 100 into a plurality of buckets, 102, 104, 106 and 108. Each bucket may be further subdivided into multiple grid-shaped buckets, and so on, creating a hierarchy of buckets as shown. For example, bucket 104 is divided into buckets 110, 112, 114 and 116, and bucket 116 is further divided into buckets 118, 120, 122 and 124.

Figure 1B:
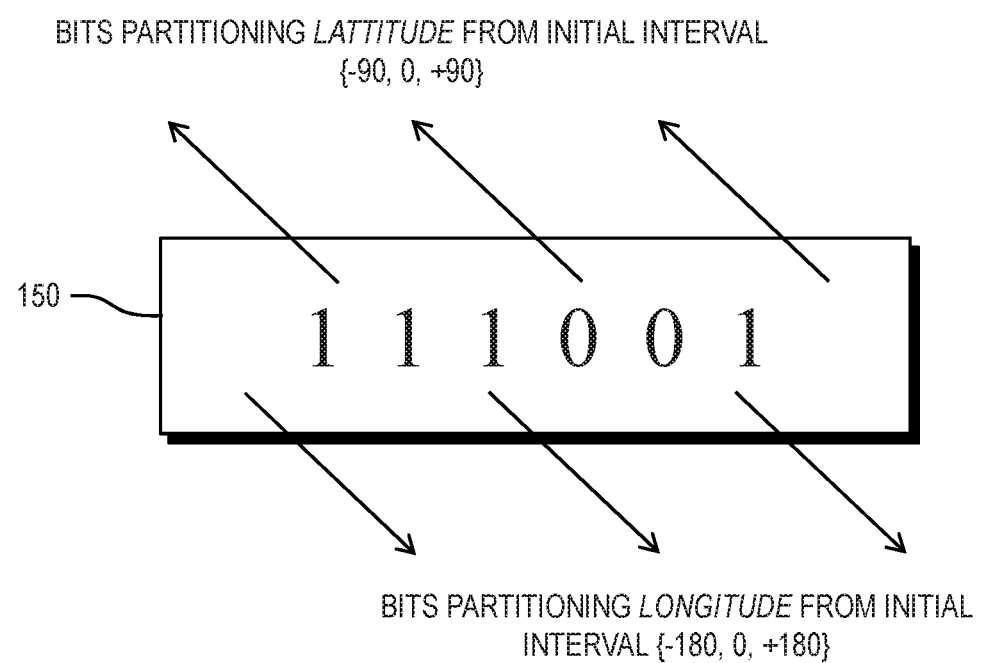
FIG. 1B conceptually depicts an exemplary geohash code represented as a string of bits.

FIG. 1B depicts an exemplary geohash code 150. The geohash code 150, represented in FIG. 1B as a string of bits, denotes a rectangle (bounding box) located on the earth. It provides a spatial hierarchy with arbitrary precision: the precision can be reduced (i.e., representing a larger area) by removing characters from the end of the string; that is, the longer the geohash code, the smaller the bounding box represented by the code. For example, a point of interest in FIG. 1A, point 130, can be represented by either of buckets 104, 116 or 118, depending on the required level of precision (i.e., tolerated error), with bucket 118 providing the highest level of precision and bucket 104 providing the lowest level of precision of the available buckets.

A geohash code can be represented as a binary string, where the bits respective to the longitude and latitude space divisions are interleaved. For example, the geohash code 150 includes a bit sequence, with a first set of interleaved bits (e.g., read from left to right, the first, third and fifth bits) representing bits partitioning longitude from an initial interval {−180, 0, +180}, and a second set of interleaved bits (e.g., read from left to right, the second, fourth and sixth bits) representing bits partitioning latitude from an initial interval {−90, 0, +90}.

Thus, a geohash code is at its heart a string of bits, where each bit is generated by hierarchically dividing a two-dimensional space into grid shapes, interleaving vertical and horizontal divisions. One single geohash code represents one grid section on the earth. As a grid section is split into smaller ones, more bits are appended to the end of the geohash bit string. Smaller regions require more bits to be represented, as they are more precise. Note that 64-bit geohashes can represent any location on the surface of the earth with centimeter-scale precision.

With reference to FIGS. 1A and 1B, a methodology for converting from latitude/longitude coordinates to geohash code will now be described. The longitude space is bounded by the initial interval {−180, 0, +180} representing the minimum (min), middle (mid), and maximum (max), respectively, of the interval. If the longitude of the point of interest (e.g., point 130) is greater than the mid of the interval (i.e., if the point 130 resides in the upper subinterval), then a geohash bit of "1" is produced, and the new interval becomes $$\left\{mid, \frac{mid+max}{2}, max\right\}.$$

Alternatively, if the longitude of the point of interest 130 is smaller or equal to the mid of the interval, then a geohash bit of "0" is produced, and the new interval becomes $$\left\{min, \frac{min+mid}{2}, mid\right\}.$$

This process is repeated up to the desired precision (number of geohash bits) in a bit-serial fashion. The same method is applied to the latitude, where the initial interval is {−90, 0, +90}. Finally, the longitude and latitude bits are interleaved in the resulting geohash code 150. FIG. 1B lists the binary geohash code for the illustrative point of interest 130 depicted in FIG. 1A.

With continued reference to FIGS. 1A and 1B, a methodology for converting from geohash code to latitude/longitude coordinates will now be described. Given a set of latitude/longitude bits in the geohash code, the respective intervals are updated in a manner consistent with the serial process described above, with no geohash bits generated at each step; instead, one geohash bit is consumed at each step. Each input geohash bit is examined to update the interval at hand, starting from the initial intervals {−90, 0, +90} and {−180, 0, +180} for latitude and longitude, respectively. The resulting latitude/longitude values are the respective mid values of the final latitude/longitude intervals.

I-B. Concepts Related to Geohash Codes And Associated Regions

Figure 2A:
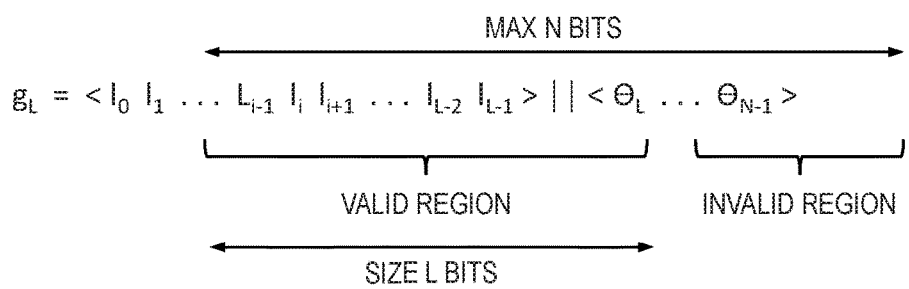
FIG. 2A conceptually depicts terminology and notation associated with a geohash code.
Figure 2B:
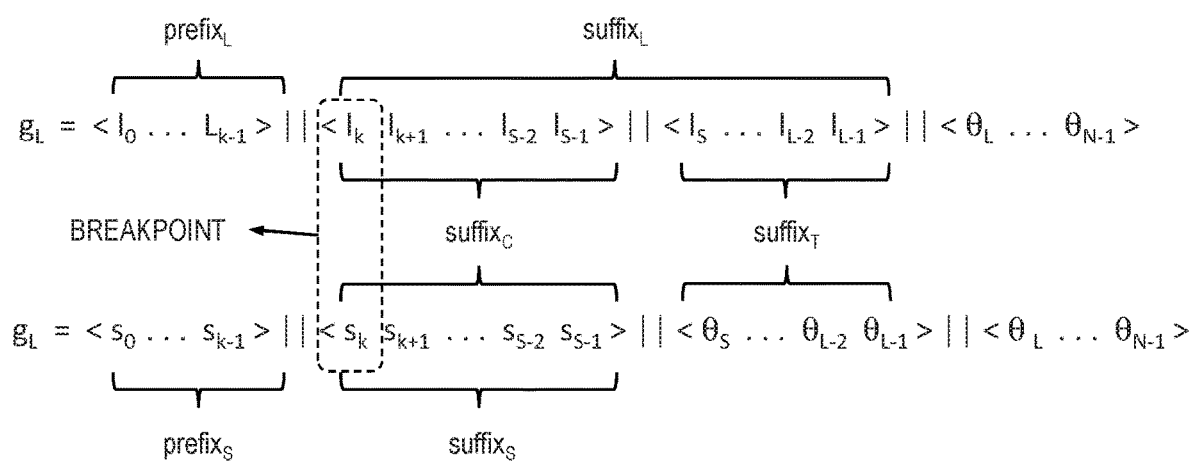
FIG. 2B conceptually depicts terminology and notation related to pairs of geohash codes.

Although the techniques discussed herein are also applicable to variable length strings, FIGS. 2A and 2B illustrate geohash codes represented and/or stored using N-bit fixed size binary strings. Since the actual length of geohashes differ depending on precision, only L bits out of the aforementioned N bits are actual valid bits. When a single geohash code with length L is presented with an N-bits string, it has valid region [0,L) and invalid region [L,N). With reference to FIG. 2A, $\langle l_0, \ldots, l_{L-1}\rangle$ are valid bits, while $\langle l_L, \ldots, l_{N-1}\rangle$ are invalid bits. Note that the bit index starts from $l_0$ toward $l_{N-1}$ for geohash code analysis. Accordingly:

$$g_L = \langle l_0, l_1, \ldots, l_{N-1}\rangle l_i \in \{0,1\}, \text{ where } 0 \leq i < N$$

FIG. 2B illustrates terminology and notation related to pairs of geohash codes. When evaluating relations between two geohash encoded spaces, $g_S$ denotes the shorter of the two codes and $g_L$ denotes the longer code. A region defined by $g_S$ represents a larger grid section with less accuracy than $g_L$. The size or length of valid bits of $g_S$ and $g_L$ are given as S and L, respectively. Accordingly:

$$g_S = \langle s_i | s_i \in \{0,1\}, \text{if } 0 \leq i < S; s_i = 0, \text{otherwise}\rangle$$

$$g_S = \langle l_i | l_i \in \{0,1\}, \text{if } 0 \leq i < L; l_i = 0, \text{otherwise}\rangle$$

where size($g_S$)=S, size($g_L$)=L, and S<L (or S≤L)

The hierarchical structure of a geohash code entails several properties and intuitions, which can be used to process geohash operations. For example, a single code can represent two directions (axes) on a two dimensional space at once because it interleaves digits, or bits, for each of latitude horizontally and longitude vertically. On the other hand, two distinct values are needed when using the conventional latitude/longitude coordinate system. As another example, a shorter geohash code represents a larger region than a longer code. As it narrows down to a more precise region, more bits are needed for accuracy.

When multiple geohash codes share a common prefix, that common prefix substring code represents the larger region covering all of the said geohashes. Two locations with a long common geohash prefix are close to each other, and nearby locations usually share a similar prefix. However, it is not always guaranteed that two close locations share a long common prefix (when they are located near the border of two bounding boxes).

The first bit after this common prefix is referred to herein as the breakpoint, and may be more formally defined as a bit index, K, where the first different bit value between two geohashes, S and L appears such that $L_K \neq S_K$ and $L_i = S_i$ where $0 \leq i < K$. The breakpoint divides these two geohash codes into multiple substrings. The prefix region is the substring of common bits at [0, K−1], where K is the breakpoint. prefix$_S$=prefix$_L$ and size(prefix)=K. The suffixes are the substrings of valid bits (i.e., the valid regions) starting from the breakpoint K:

suffix$_S$: a substring of $g_S$ from K to the end S−1.
suffix$_L$: a substring of $g_L$ from K to the end L−1.
suffix$_C$: a substring of $g_L$ from K to S−1.
suffix$_T$: a substring of $g_L$ from S to L−1.

suffix$_L$=suffix$_C$‖suffix$_T$

As used herein, the boundary, interior and exterior of a geohash code are defined as follows: A point is a boundary point of a geohash if every neighborhood of the point contains at least one point in the corresponding geohash box and at least one point not in the corresponding geohash box. The interior of a geohash is all points that are part of the corresponding geohash box, including the boundary points.

The exterior of a geohash is all points that are not part of the interior (i.e. including boundary) points of the corresponding geohash box.

For a given geometry that is represented using multiple geohash codes, the definitions are similar. The interior of a geohash-coded geometry is the union of all the individual geohashes' interiors. The boundary of a geohash-coded geometry is the union of all the individual geohashes' boundaries, with the exception of the intersecting individual boundaries of adjacent individual geohashes. The exterior of a geohash-coded geometry is all points that are not part of the interior of that geohash-coded geometry.

Figure 3A:
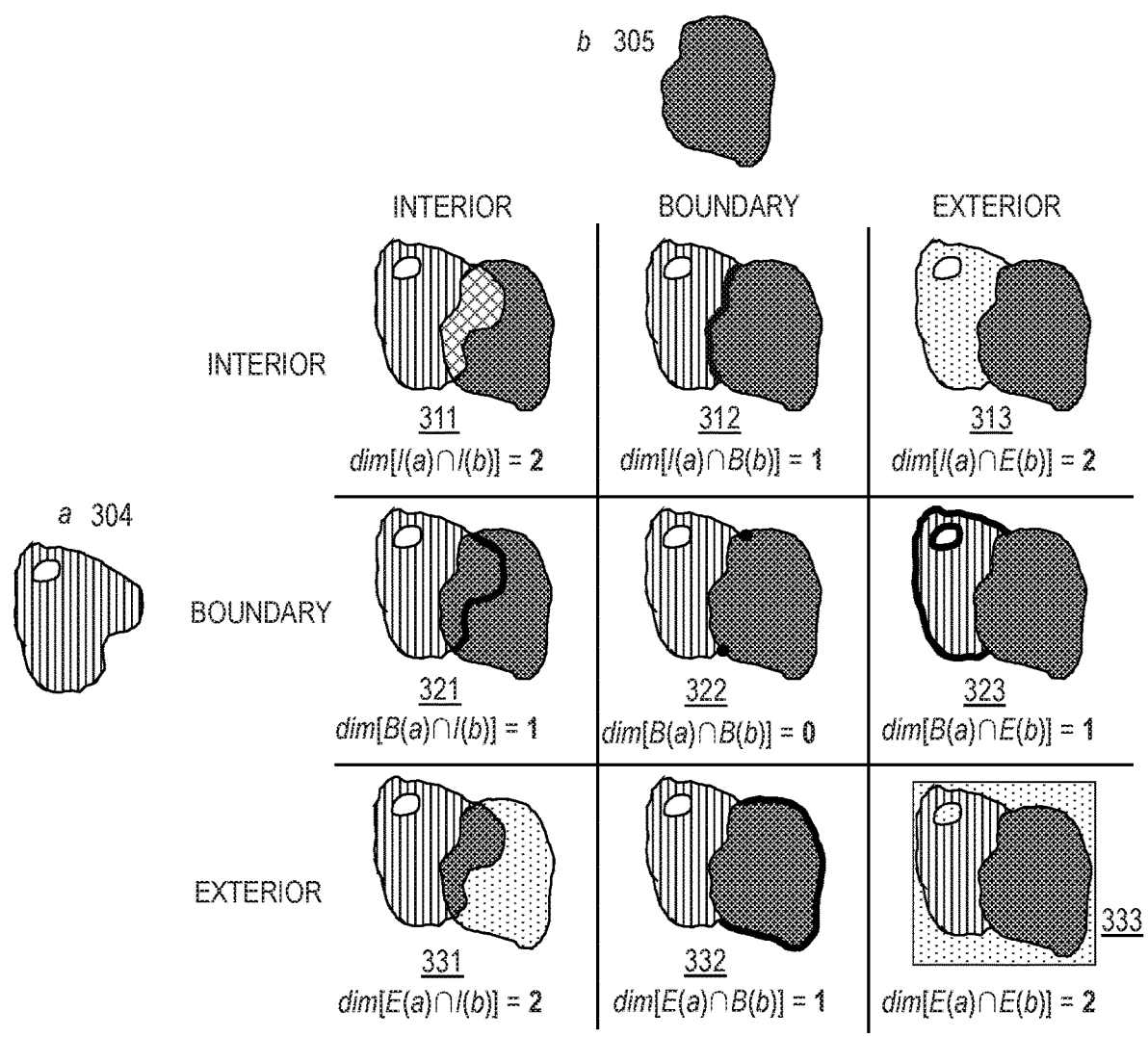
FIG. 3A conceptually depicts terminology related to a pair of geohash-based geometries.

FIG. 3A illustrates these definitions with respect to a pair of exemplary geometries, a 304 and b 305. The two-dimensional black shape in box 311 represents the intersection of a's interior I(a) and b's interior I(b). The one-dimensional black shape in box 312 represents the intersection of a's interior I(a) and b's boundary B(b). The two-dimensional black shape in box 313 represents the intersection of a's interior I(a) and b's exterior E(b).

The one-dimensional black portion of box 321 represents the intersection of a's boundary B(a) and b's interior I(b). The zero-dimensional black shape(s) in box 322 represents the intersection of a's boundary B(a) and b's boundary B(b). The one-dimensional black shape(s) in box 323 represents the intersection of a's boundary B(a) and b's exterior E(b).

The two-dimensional black shape in box 331 represents the intersection of a's exterior E(a) and b's interior I(b). The one-dimensional black shape in box 332 represents the intersection of a's exterior E(a) and b's boundary B(b). The two-dimensional black shape(s) in box 333 represents the intersection of a's exterior E(a) and b's exterior E(b).

I-C. Geohash Spatial Primitives

Figure 3B:
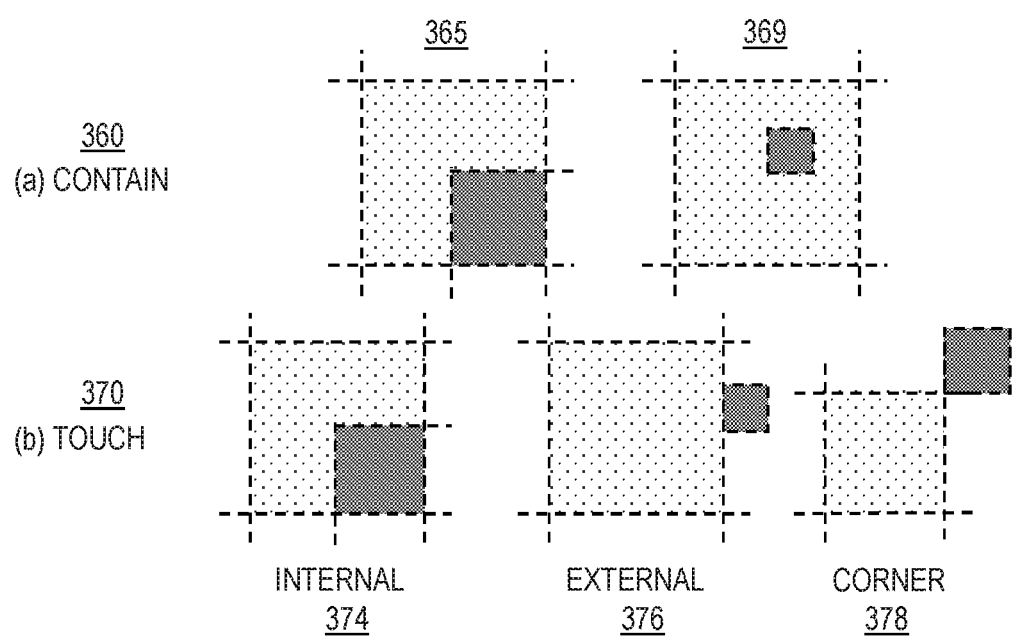
FIG. 3B conceptually depicts spatial primitives with respect to exemplary regions.

Illustrative embodiments of the present invention provide methods for evaluating spatial predicates on geohash-coded geometries which include replacing the traditional DE-91M model with spatial primitives, such as equals, contains, and touches (internal, external, corner). Geohash spatial primitive calculation is about analyzing the spatial relations between two geographical regions each defined by a single geohash. FIG. 3B illustrates these spatial primitives with respect to exemplary regions. A geohash $g_A$ equals a geohash $g_B$ if the precision (size) of $g_A$ is equal to the precision of $g_B$, and if the value of $g_A$ is equal to the value of $g_B$.

A geohash $g_S$ contains a geohash $g_L$ if the region $R_S$ defined by $g_S$ is larger than and can entirely cover a region $R_L$ defined by $g_L$. In other words, geohash $g_S$ contains geohash $g_L$ if the region $R_L$ defined by geohash $g_L$ is part of the region $R_S$ defined by $g_S$. From the perspective of geohash properties, $g_S$ is the prefix of $g_L$. The contain primitive 360 is illustrated in 365 and 369.

For two geohashes $g_A$ and $g_B$, regardless of relative lengths, geohash $g_A$ and a geohash $g_B$ touch each other if their intersection is zero or one dimensional region (i.e. point or line). In other words, if the boundaries of the regions defined by the geohashes $g_A$ and $g_B$ share a (zero-dimensional) point or a (one-dimensional) line segment, then $g_A$ touches $g_B$ (and vice versa). Whereas the contain primitive corresponds to the relations between the prefixes of two geohashes, the touch primitives pertain to the relations between their suffixes. The touch primitives 370 are illustrated in 374, 376 and 378.

There are three forms of geohash touch: internal touch, external touch, and corner touch. Internal touch is illustrated in 374, which is identical to 365 discussed above with regard to the contain primitive. Internal touch also requires satisfaction of the contain primitive. External touch is illustrated in 376. Corner touch is illustrated in 378.

To facilitate further discussions, two geometric concepts are defined herein: push towards and overlap. While generating a geohash code, if after some point in either (latitude, longitude) dimension only 0's or only 1's are generated, then the region being defined by the geohash code is said to push towards one particular direction/edge as narrowing down to smaller region from a bigger region. Given two geohashes and regardless of their relative lengths, if the segment projection of the two geohashes on either (latitude, longitude) axis overlay, then the regions defined by the geohashes overlap in a given dimension.

A geohash $g_S$ and a geohash $g_L$ touch each other internally if the region defined by $g_S$ contains the region defined by $g_L$ and their boundaries overlap on one or two edges such that their intersection is a one dimensional line on each of these edge(s). Equivalently, $g_L$ and $g_S$ touch each other internally if $g_L$ is contained in $g_S$ AND $g_L$ pushes toward an edge of $g_S$. $g_L$ pushes toward an edge of $g_S$ when, after the breakpoint, all the remaining latitude (or longitude) bits in $g_L$ hold same values (either all 1's or all 0's).

For the external touch, no geohash contains the other, but rather they intersect only at the boundary. After splitting at a breakpoint, the geohashes push toward each other in one dimension (either latitude or longitude) and overlap in the other perpendicular direction. Equivalently, for two geohashes $g_A$ and $g_B$, regardless of their relative lengths, geohash $g_A$ and geohash $g_B$ touch each other externally if the region defined by $g_A$ does not contain the region defined by $g_B$ and their boundaries overlap on one edge.

A geohash $g_S$ and a geohash $g_L$ touch each other at a corner, if the region defined by $g_S$ does not contain the region defined by $g_L$ and their boundaries overlap only at a corner, with a zero-dimensional intersection (i.e., the single point at that corner). More broadly, regardless of their relative lengths, two geohashes $g_A$ and $g_B$ touch each other at a corner if they push toward each other in both dimensions (latitude and longitude).

I-D. Geohash Spatial Predicates

The discussion thus far has been focused on evaluating spatial relations between pairs of geohash codes. The techniques introduced above can be extended to apply to arbitrary-shaped geohash-coded regions A and B, which are represented as geohash codes {A1, A2, A3 . . . , Aa} and {B1, B2, B3, . . . , Bb}, respectively; the actual number of geohash codes per region (i.e. a for A and b for B) can vary, with a minimum of 1 code per region.

By analyzing spatial relations of geohash codes pairwise, one from each set (region A and region B), one can in turn express the spatial relations of the two geometric shapes. For example, if all geohash codes from region A are contained in geohash codes from region B, then A is contained in B. Another example is if at least one geohash code from region A touches a geohash code from region B, then region A touches region B.

Figure 4:
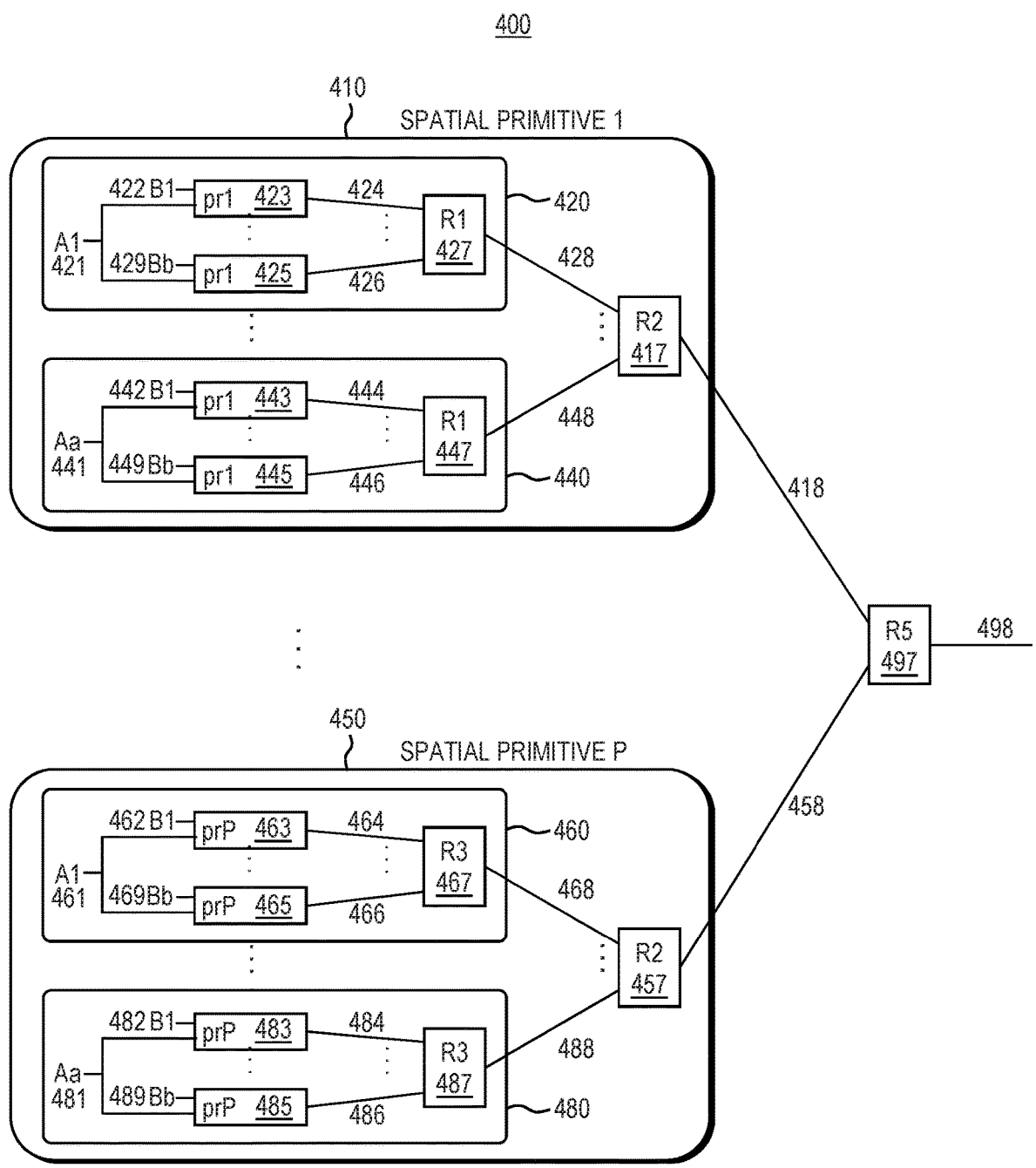
FIG. 4 is a generic graphical representation of exemplary computations associated with one or more illustrative embodiments of the present invention.

FIG. 4 is a generic graphical representation of an architecture 400 for the core computations needed to evaluate a spatial predicate. Spatial predicates are of the form f(A,B), i.e. a function with inputs geohash-coded regions A and B (and in that order). Spatial predicates are evaluated using a Boolean expression over the pair-wise evaluation of one or more spatial primitives with reduction tree. For each spatial primitive (pr1, . . . , prP) needed for the evaluation of a spatial predicate, a corresponding component is included, in which each geohash of A is paired with all geohashes of B. The spatial primitive (denoted as pr) is then evaluated on every pair. Boolean operators are used to "reduce" the partial results into the overall spatial predicate evaluation (denoted as true or false), Architecture 400 shown in FIG. 4 includes one or more components each corresponding to a respective spatial primitive (pr1, . . . , prP). Each component includes a set of subcomponents each corresponding to a respective geohash within region A (a1, . . . , Aa). Within each subcomponent, there are a set of modules each corresponding to a respective geohash within region B (b1, . . . , Bb), and each module is operative to perform a spatial primitive on two geohashes, one from region A and one from region B. In illustrative embodiments, these modules may be of types described below with reference to Section II and/or Section III.

Within architecture 400 shown in FIG. 4, component 410 corresponds to the first spatial primitive pr1, and includes subcomponent 420 corresponding to a first geohash of region A (A1 421). Subcomponent 420 includes modules each corresponding to a respective geohash within region B (b1, . . . , b2). Module 423 evaluates first spatial primitive pr1 on the first geohash of region A (A1 421) and the first geohash of region B (B1 422) to produce bit 424. Module 425 evaluates first spatial primitive pr1 on the first geohash of region A (A1 421) and the last geohash of region B (Bb 429) to produce bit 426. Within subcomponent 420, logic gate 427 receives the respective bits (e.g., 424 and 426) produced by each module and combines them using Boolean operation R1 to produce bit 428, which is output from subcomponent 420.

Component 410 also includes subcomponent 440 corresponding to a last geohash of region A (Aa 441). Subcomponent 440 includes modules each corresponding to a respective geohash within region B (b1, . . . , b2). Module 443 evaluates first spatial primitive pr1 on the last geohash of region A (Aa 441) and the first geohash of region B (B1 442) to produce bit 444. Module 445 evaluates first spatial primitive pr1 on the last geohash of region A (Aa 441) and the last geohash of region B (Bb 449) to produce bit 446. Within subcomponent 440, logic gate 447 receives the respective bits (e.g., 444 and 446) produced by each module and combines them using Boolean operation R1 to produce bit 448, which is output from subcomponent 440.

Component 410 further includes logic gate 417, which receives the respective bits (e.g., 428 and 448) produced by each module and combines them using Boolean operation R2 to produce bit 418, which is output from component 410. The logic gates (e.g., 427 and 447) within respective subcomponents (e.g., 420 and 440) of a given component (e.g., 410) all perform the same Boolean operation R1. Logic gate 417 performs Boolean operation R2, which may or may not be the same as Boolean operation R1.

Within architecture 400 shown in FIG. 4, component 450 corresponds to the last spatial primitive prP, and includes subcomponent 460 corresponding to a first geohash of region A (A1 461). Subcomponent 460 includes modules each corresponding to a respective geohash within region B (b1, . . . , b2). Module 463 evaluates last spatial primitive prP on the first geohash of region A (A1 461) and the first geohash of region B (B1 462) to produce bit 464. Module 465 evaluates first spatial primitive pr1 on the first geohash of region A (A1 461) and the last geohash of region B (Bb 469) to produce bit 466. Within subcomponent 460, logic gate 467 receives the respective bits (e.g., 464 and 466) produced by each module and combines them using Boolean operation R3 to produce bit 468, which is output from subcomponent 460.

Component 450 also includes subcomponent 480 corresponding to a last geohash of region A (Aa 481). Subcomponent 480 includes modules each corresponding to a respective geohash within region B (b1, . . . , b2). Module 483 evaluates last spatial primitive prP on the last geohash of region A (Aa 481) and the first geohash of region B (B1 482) to produce bit 484. Module 485 evaluates first spatial primitive pr1 on the last geohash of region A (Aa 481) and the last geohash of region B (Bb 489) to produce bit 486. Within subcomponent 480, logic gate 487 receives the respective bits (e.g., 484 and 486) produced by each module and combines them using Boolean operation R3 to produce bit 488, which is output from subcomponent 480.

Component 450 further includes logic gate 457, which receives the respective bits (e.g., 468 and 488) produced by each subcomponent and combines them using Boolean operation R2 to produce bit 458, which is output from component 450. The logic gates (e.g., 467 and 487) within respective subcomponents (e.g., 460 and 480) of a given component (e.g., 450) all perform the same Boolean operation R3. Logic gate 457 performs Boolean operation R4. Any one of Boolean operations R1-R4 may or may not be the same as any other one of Boolean operations R1-R4.

Architecture 400 also includes logic gate 497, which receives the respective bits (e.g., 418 and 458) produced by each component and combines them using Boolean operation R5 to produce bit 498, which is output from architecture 400 as the evaluation of the spatial predicate for regions A and B. Boolean operation R5 may or may not be the same as any one of Boolean operations R1-R4.

Where evaluation of a given spatial predicate only requires evaluation of a single spatial primitive, only a single component (e.g., 410) is required, with the output of that component (e.g., 418) being output as the evaluation of the spatial predicate for regions A and B. In such an embodiment, component 450 and logic gate 497 are unused and may be eliminated, although it may be desirable to retain them in order to retain the ability to evaluate special predicates which require evaluation of multiple spatial primitives. An embodiment of the present invention may use the aforementioned spatial primitives to implement one or more of the following spatial predicates: equals, disjoint, touch (also known as meet), contain, cover, within (also known as inside), coveredBy, intersect, overlap, touchBorder.

The spatial predicate equals(A, B) is true when regions A and B are topologically equal; in other words, the interiors of A and B intersect and no part of the interior or boundary of one region intersects the exterior of the other. When evaluating the "equals" spatial predicate using the conceptual architecture shown in FIG. 4, R3, R4 and R5 are unused. Spatial primitive pr1 is "equals," with R1 being OR and R2 being AND.

The spatial predicate disjoint(A, B) is true when A and B have no point in common and thus form a set of disconnected geometries. When evaluating the "disjoint" spatial predicate using the conceptual architecture shown in FIG. 4, R5 is AND. Spatial primitive pr1 is "contains," with R1 being OR and R2 being NOR. Spatial primitive pr2 is "touches (external OR corner)," with R3 being OR and R4 being NOR.

The spatial predicate touch(A, B) is true when A and B have at least one boundary point in common but no interior points. When evaluating the "touch" spatial predicate using the conceptual architecture shown in FIG. 4, R5 is AND.

Spatial primitive pr1 is "touches (external OR corner)," with R1 being OR and R2 being OR. Spatial primitive pr2 is "contains," with R3 being OR and R4 being NOR.

The spatial predicate touchBorder(A, B) is true when A and B have at least one boundary point in common. When evaluating the "touchBorder" spatial predicate using the conceptual architecture shown in FIG. 4, R3, R4 and R5 are unused. Spatial primitive pr1 is "touches" (i.e., "touches (internal OR external OR corner)"), with R1 being OR and R2 being OR.

The spatial predicate contains(A, B) is true when B lies in A and their interiors intersect. Equivalently, contains(A, B) is true when no points of B lie in the exterior of A, and at least one point of the interior of B lies in the interior of A. When evaluating the "contains" spatial predicate using the conceptual architecture shown in FIG. 4, R3, R4 and R5 are unused. Spatial primitive pr1 is "contains," with R1 being OR and R2 being AND.

The spatial predicate intersects(A, B) is true when regions A and B have at least one point in common. When evaluating the "intersects" spatial predicate using the conceptual architecture shown in FIG. 4, R5 is OR. Spatial primitive pr1 is "contains," with R1 being OR and R2 being OR. Spatial primitive pr2 is "touches," with R3 being OR and R4 being OR.

The spatial predicate covers(A, B) is true when region B lies in region A. An equivalent definition is that covers(A, B) is true when no points lie in the exterior of A. Another equivalent definition is that covers(A, B) when every point of B is a point of (the interior or boundary of) A. The foregoing definitions are broadly applicable to geohash-coded geometries and also to non-geohash geometries such as points and line segments. However, for geohash-coded geometries, point and line segment geometries are coded as one or more 2-D shapes (geohash boxes). Thus, an embodiment of the present invention may implement covers(A, B) in the same way as contains(A, B).

The spatial predicate within(A, B) is true when A lies in the interior of B. An embodiment of the present invention may implement within(A, B) in the same way as contains(B, A).

The spatial predicate covered By(A, B) is true when every point of A is a point B, and the interiors of the two regions have at least one point in common. An embodiment of the present invention may implement covered By(A, B) in the same way as covered(B, A).

II. Hardware for Calculating Geospatial Primitives and Predicates

II-A. Overview of Geohash Primitive Calculation Module

Embodiments of the present invention may implement the generic architecture shown in FIG. 4 using hardware, software, and/or a combination thereof. In a hardware implementation of the architecture shown in FIG. 4, R1 to R5 may be implemented using conventional Boolean logic gates. However, an illustrative embodiment includes a special-purpose hardware circuit module for calculating the spatial primitives pr1, pr2, . . . prP.

More particularly, an exemplary module comprises novel circuitry for calculating primitives at the logic circuit level. Since bit level operations are required, primitive evaluation in hardware has considerable benefits against software design in terms of performance, throughput as well as latency. Using parallel hardware, these operations are parallelizable, scalable, and able to be implemented in a fully pipelined manner regardless of the length or size of the geohash. Additional advantages associated with embodiments in which spatial primitives are evaluated using hardware include: (1) deterministic high throughput operation (one geohash per cycle), (2) deterministic low latency operation, (3) low power consumption in customizable hardware, (4) low resource utilization due to the ability to efficiently implement bit level operation in logic circuit(s), and/or (5) flexible circuit design with respect to an architected maximum geohash code size. Moreover, an embodiment can employ field-programmable gate arrays (FPGAs) for efficiently exploiting the bit-level granularity of geohash codes, resulting in a resource-friendly architecture operating at wire-speed (e.g., without stalls).

Figure 5:
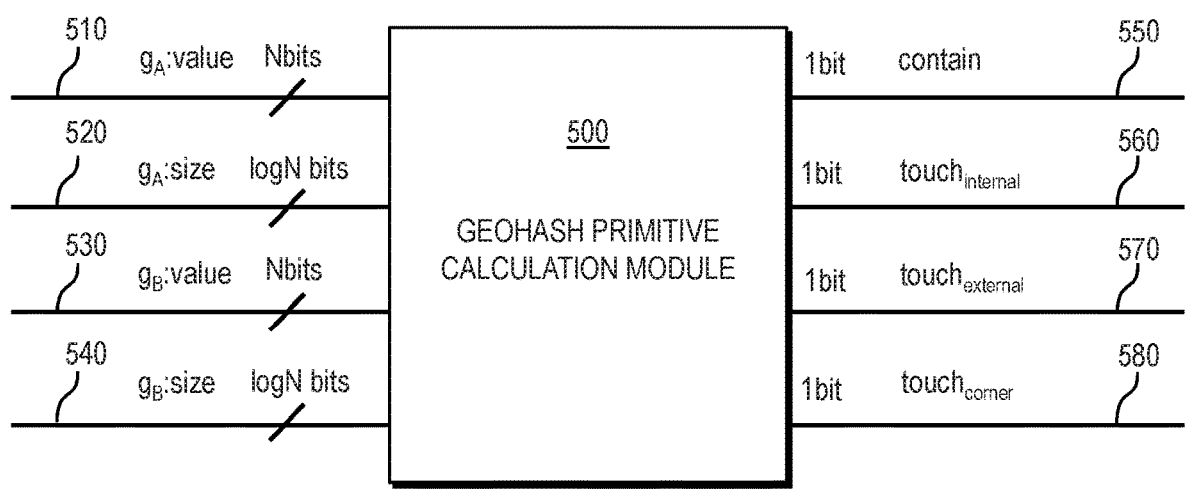
FIG. 5 shows inputs and outputs of an exemplary calculation module according to one or more illustrative embodiment of the present invention.

FIG. 5 shows inputs and outputs of an exemplary geohash primitive calculation module 500 according to an embodiment of the present invention. Geohash primitive calculation module 500 has four inputs 510, 520, 530 and 540 corresponding to two input geohashes $g_A$ and $g_B$. Input 510 includes N bits containing the value of first input geohash $g_A$. Input 520 includes log(N) bits indicating the size (i.e., the number of valid bits) of first input geohash $g_A$, as discussed above with reference to FIG. 2A. Input 530 includes N bits containing the value of second input geohash $g_B$. Input 540 includes log(N) bits indicating the size (i.e., the number of valid bits) of second input geohash $g_B$, as discussed above with reference to FIG. 2A.

Geohash primitive calculation module 500 has four outputs 550, 560, 570 and 580. Each of these outputs consists of a single bit indicating whether a respective spatial primitive is satisfied with respect to input geohashes $g_A$ and $g_B$. Output 550 indicates whether one of the input geohashes contains the other input geohashes. Output 560 indicates whether the input geohashes touch internally. Output 570 indicates whether the input geohashes touch externally. Output 580 indicates whether the input geohashes touch at a corner. Thus, geohash primitive calculation module 500 performs a parallel computation of each of the spatial primitives discussed above with reference to FIG. 3B.

Figure 6A:
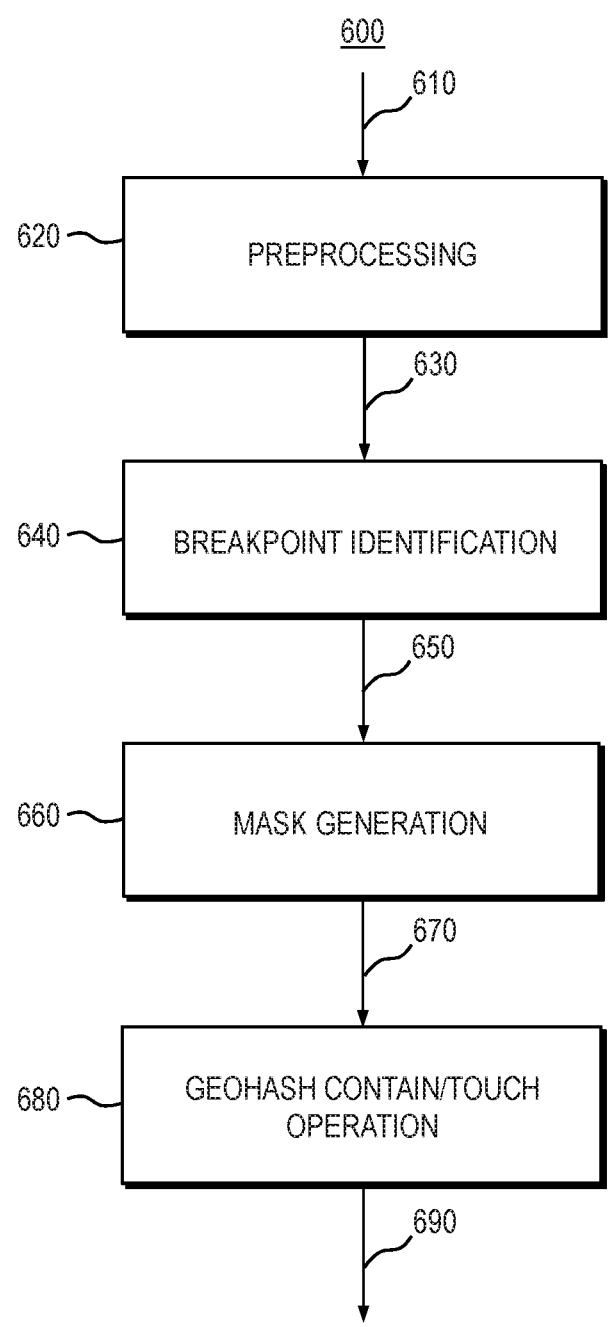
FIG. 6A shows an overview of an exemplary execution pipeline associated with the illustrative calculation module shown in FIG. 5.

FIG. 6A shows an overview of the pipeline 600 associated with the geohash primitive calculation module 500 shown in FIG. 5. Pipeline 600 begins when initial input 610 is provided to preprocessing stage 620. Initial input 610 may comprise inputs 510-540 shown in FIG. 5. Preprocessing stage 620 produces an intermediate output 630 which is input to breakpoint identification stage 640. Breakpoint identification stage 640 produces an intermediate output 650 which is input to mask generation stage 660. Mask generation stage 660 produces an intermediate output 670 which is input to geohash contain/touch operation stage 680. Geohash contain/touch operation stage 680, also known as the main stage, produces final output 690. Final output 690 may comprise outputs 550-580 shown in FIG. 5.

Figure 6B:
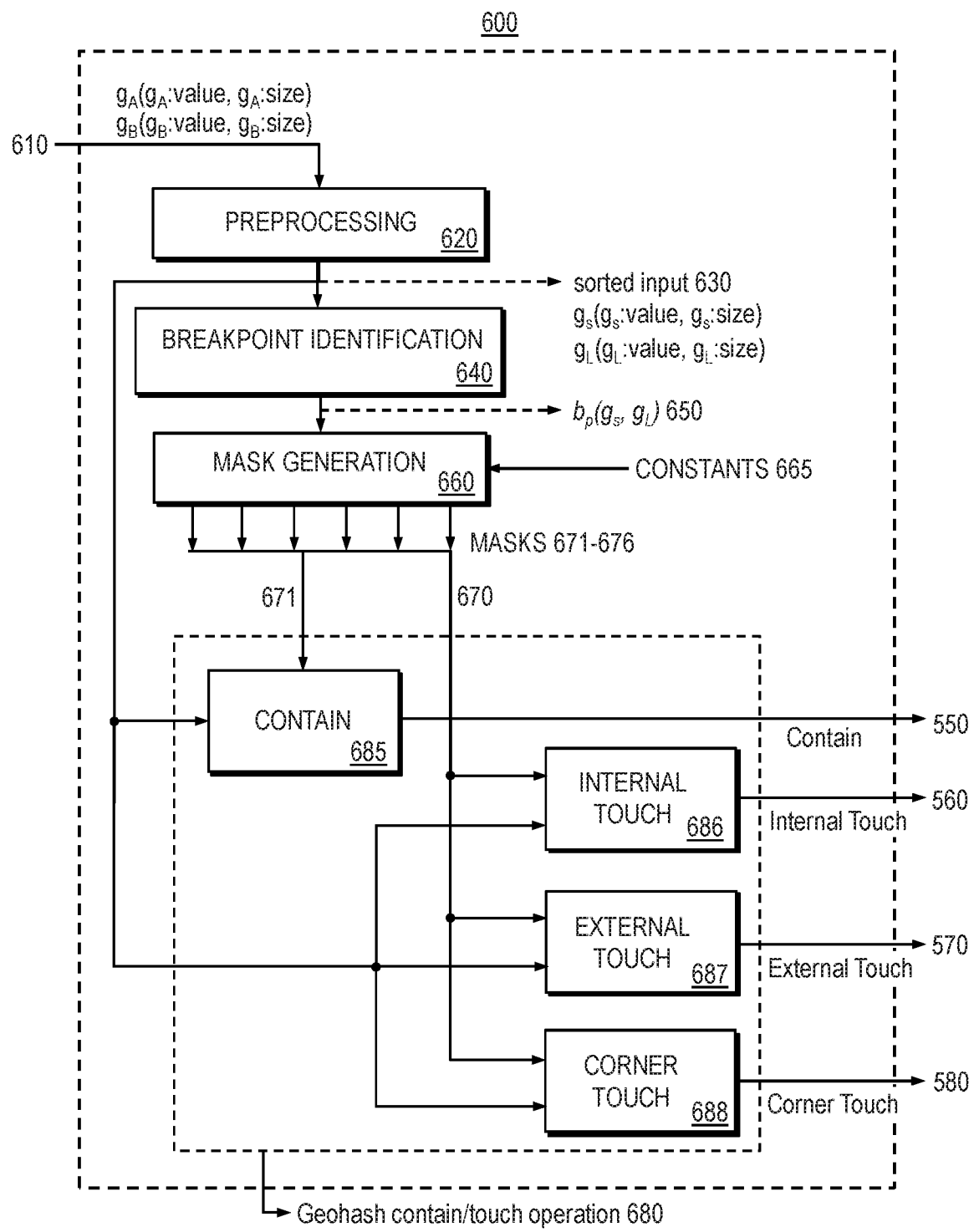
FIG. 6B shows further details of the exemplary execution pipeline shown in FIG. 6A.

FIG. 6B provides a more detailed view of an embodiment of the pipeline 600 shown in FIG. 6A. As shown in FIG. 6B and discussed above with reference to FIG. 6A, pipeline 600 begins when initial input 610 is provided to preprocessing stage 620. As shown in FIG. 6B and discussed above with reference to FIGS. 5 and 6A, initial input 610 may include the four inputs shown in FIG. 5: $g_B$:value 510, $g_B$:size 520, $g_B$:value 530, and $g_B$:size 540. Preprocessing stage 620 sorts geohash inputs $g_A$ and $g_B$ to determine which one is shorter ($g_S$) and which one is longer ($g_L$). The outputs 630 of preprocessing stage 620 include indications of the respective values and sizes (i.e., lengths) of $g_S$ and $g_L$. The outputs 630 of preprocessing stage 620 are provided to breakpoint identification stage 640, which produces output 650 indicating a breakpoint of $g_S$ and $g_L$ as discussed above with reference to FIG. 2B.

The output 650 of breakpoint identification stage 640 is provided to mask generation stage 660. Mask generation stage 660 is also provided with one or more constants 665 (e.g., 0xFFFF, 0xAAAA, 0x5555, etc.) and produces output 670. Output 670 may comprise a set of six masks: $\text{mask}_{prefix}$ 671, $\text{mask}_{short}$ 672, $\text{mask}_{long}$ 673, $\text{mask}_{suffix:S}$ 674, $\text{mask}_{suffix:L}$ 675, and $\text{mask}_{suffix:T}$ 676. The outputs 670 of mask processing stage 660 are provided to the main stage, geohash contain/touch operation stage 680.

The main stage, geohash contain/touch operation stage 680, includes four modules 685-688 which execute in parallel to generate the four outputs 550-580 shown in FIG. 5, which collectively correspond to the final output 690 shown in FIG. 6A. Contain module 685 generates contain output 550, internal touch module 686 generates internal touch output 560, external touch module 687 generates external touch output 570, and corner touch module generates corner touch module 688. Each of the modules within geohash contain/touch operation stage 680 receives inputs including at least a subset of the masks 670 generated by stage 660 and also receives the sorted inputs 630 generated by preprocessing stage 620. $\text{Mask}_{prefix}$ 671 is used solely by contain module 685, while the remaining masks 672-676 are used by the three touch modules 686-688.

II-B. Preprocessing Stage

Figure 7:
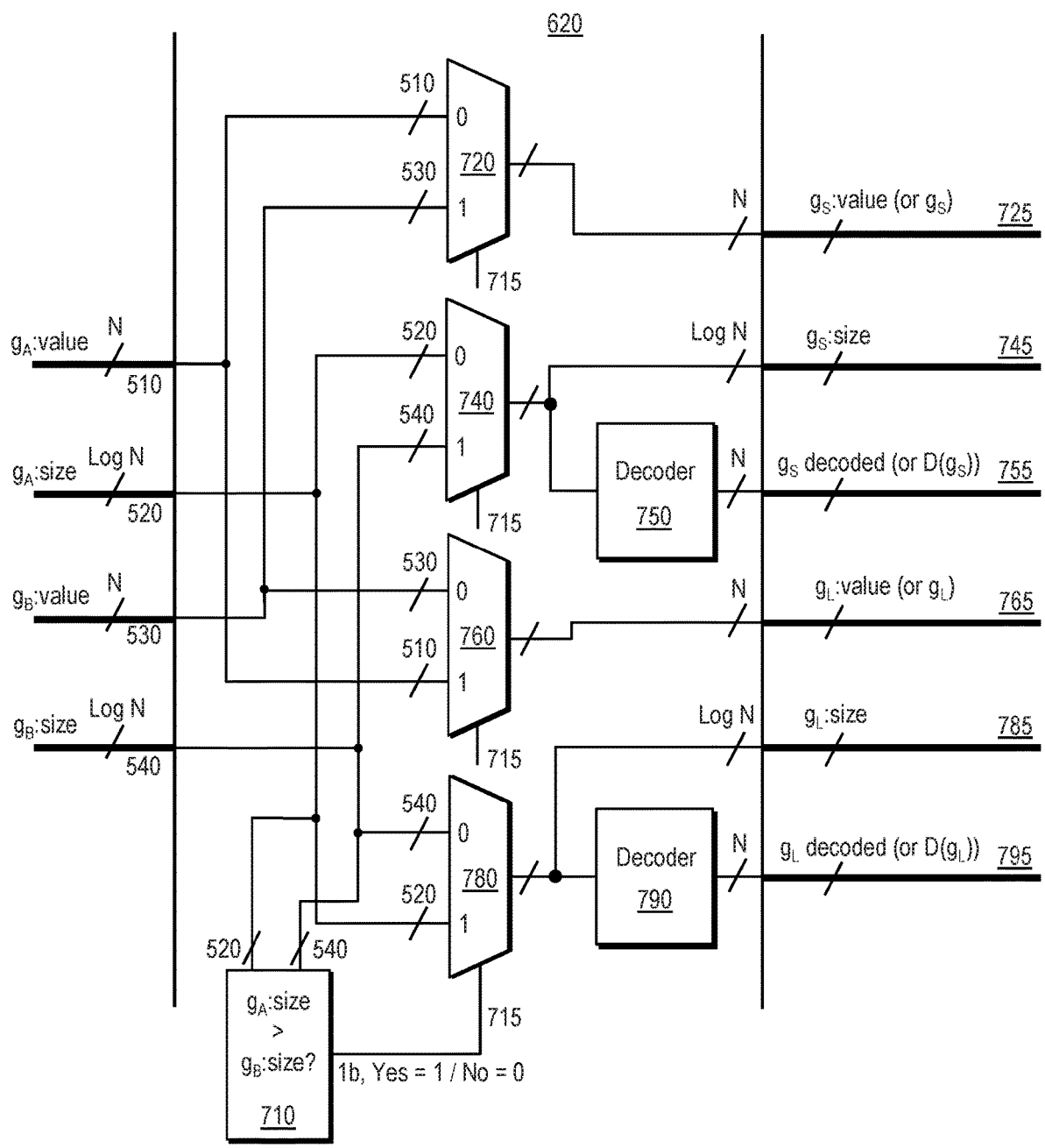
FIGS. 7 and 8 are simplified schematic diagrams of exemplary circuits which may be associated with one or more illustrative embodiment of the present invention.

FIG. 7 shows a schematic for an illustrative embodiment of preprocessing stage 620 shown in FIGS. 6A and 6B. Preprocessing stage 620 sorts geohash inputs $g_A$ and $g_B$ to determine which one is shorter ($g_S$) and which one is longer ($g_L$). Preprocessing stage 620 receives the four inputs discussed above with reference to FIG. 5: $g_B$:value 510, $g_A$:size 520, $g_B$:value 530, and $g_B$:size 540. The output 630 of preprocessing stage 620 includes six values 725, 745, 755, 765, 785 and 795.

As shown in FIG. 7, $g_A$:size 520 and $g_B$:size 540 are provided to a comparator 710 within processing stage 620. Comparator 710 produces a single-bit select signal 715, which has a value of 1 if $g_A$:size 520 is greater than $g_B$:size 540, and otherwise has a value of 0. The select signal 715 generated by comparator 710 is used to control each of a set of four 2-to-1 multiplexers 720, 740, 760 and 780, each of which may be considered as a multiple-input, single-output switch.

The output 725 of multiplexer 720 is equal to $g_A$:value 510 if select signal 715 is 0 and is equal to $g_B$:value 530 if select signal is 1. Thus, the output 725 of multiplexer 720 is the value of the shorter of the two input geohashes, $g_S$:value (or more simply $g_S$), which has N bits. The output 745 of multiplexer 740 is equal to $g_A$:size 520 if select signal 715 is 0 and is equal to $g_B$:size 540 if select signal is 1. Thus, the output 745 of multiplexer 740 is the size of the shorter of the two input geohashes, $g_S$:size, which has log N bits. In addition to being a component of the output 630 of preprocessing stage 620, the output 745 of multiplexer 740 is also provided to a binary decoder 750 which produces output 755, which has N bits representing the decoded size of $g_S$ or $D(g_S)$.

The output 765 of multiplexer 760 is equal to $g_B$:value 530 if select signal 715 is 0 and is equal to $g_A$:value 510 if select signal is 1. Thus, the output 765 of multiplexer 760 is the value of the longer of the two input geohashes, $g_L$:value (or more simply $g_L$), which has N bits. The output 785 of multiplexer 780 is equal to $g_B$:size 540 if select signal 715 is 0 and is equal to $g_A$:size 560 if select signal is 1. Thus, the output 785 of multiplexer 780 is the size of the longer of the two input geohashes, $g_L$:size, which has log N bits. In addition to being a component of the output 630 of preprocessing stage 620, the output 785 of multiplexer 780 is also provided to a binary decoder 790 which produces output 795, which has N bits representing the decoded size of $g_L$ or $D(g_L)$.

Binary decoders 750 and 790 each receive as input log N bits representing a geohash size ($g_S$:size 745 for decoder 750 and $g_L$:size 785 for decoder 790) and produce decoded data signals $D(g_S)$ 755 and $D(g_L)$ 795 respectively. Each of these decoded data signals is a one-hot N-bit vector consisting of all zeros except for a single "1" bit at the position reflecting the size. Shown below are representations of exemplary geohashes denoted by $g_S$ (shorter geohash) and $g_L$ (longer geohash), and their decoded sizes $D(g_S)$ and $D(g_L)$. Note that the "1" in $D(g_S)$ occurs to the left of (i.e., before when read left-to-right) the "1" in $D(g_L)$ because $g_S$ is shorter than $g_L$. In other words, because $g_L$ is at least as long as $g_S$, the index of the "1" in $D(g_L)$ is equal to or larger than the "1" in $D(g_S)$. When S is the size of the shorter geohash, and L is the size of the longer one (i.e., $S \leq L \leq N$):

$$g_S = \{s_0\, s_1 \ldots s_{K-2}\, s_{K-1}\}\|\{s_K\, s_{K+1} \ldots s_{S-2}\, s_{S-1}\}\| \{0_S \ldots 0_{L-2}\, 0_{L-1}\}\|\{0_L \ldots 0_{N-1}\}$$

$$D(g_S) = \{0_0\, 0_1 \ldots 0_{K-2}\, 0_{K-1}\}\|\{0_K\, 0_{K+1} \ldots 0_{S-2}\, 0_{S-1}\}\|\{1_S \ldots 0_{L-2}\, 0_{L-1}\}\|\{0_L \ldots 0_{N-1}\}$$

$$g_L = \{l_0\, l_1 \ldots l_{K-2}\, l_{K-1}\}\|\{l_K\, l_{K+1} \ldots l_{S-2}\, l_{S-1}\}\| \{l_S \ldots l_{L-2}\, l_{S-1}\}\|\{0_L \ldots 0_{N-1}\}$$

$$D_L = \{0_0\, 0_1 \ldots 0_{K-2}\, 0_{K-1}\}\|\{0_K\, 0_{K+1} \ldots 0_{S-2}\, 0_{S-1}\}\|\{0_S \ldots 0_{L-2}\, 0_{S-1}\}\|\{1_L \ldots 0_{N-1}\}$$

II-C. Breakpoint Identification Stage

As discussed above with reference to FIG. 2B, the breakpoint is the index K of the first (bit) difference between two geohashes. In graphical notation, the breakpoint corresponds to a point where one big region covering all regions splits into two different regions while narrowing down to target smaller regions. The breakpoint is the first non-zero bit in the XOR of gS and gL. Thus, finding the breakpoint K starts by computing $g_L$ XOR $g_S$ (also represented as $g_L \oplus g_S$). Let $x = g_L \oplus g_S$. x has all zeros at the first K bits at $\{0, 1, \ldots K-1\}$, since $l_i = i_s$, where $0 \leq i < K$. When $l_K \neq s_K$ at K, it has the first active '1' bit, where the breakpoint is. More formally:

$$g_L = \{l_0\, l_1 \ldots l_{K-1}\}\|\{l_K\, l_{K+1} \ldots l_{S-2}\, l_{S-1}\}\|\{l_S \ldots l_{L-2}\, l_{L-1}\}\|\{0_L \ldots 0_{N-1}\}$$

$$g_S = \{s_0\, s_1 \ldots s_{K-1}\}\|\{s_K\, s_{K+1} \ldots s_{S-2}\, s_{S-1}\}\|\{0_S \ldots 0_{L-2}\, 0_{L-1}\}\|\{0_L \ldots 0_{N-1}\}$$

$$g_L \oplus g_S = \{l_0 \oplus s_0 \ldots l_{K-1} \oplus s_{K-1}\}\|\{l_K \oplus s_K \ldots l_{S-1} \oplus s_{S-1}\}\|\{l_S \oplus 0_S \ldots l_{L-1} \oplus 0_{L-1}\}\|\{0_L \ldots 0_{N-1}\}$$

$$g_L \oplus g_S = \{0_0\, 0_1 \ldots 0_{K-2}\, 0_{K-1}\}\|\{l_K \ldots l_{S-1} \oplus s_{S-1}\}\|\{l_S \oplus 0_S \ldots l_{L-1} \oplus 0_{L-1}\}\|\{0_L \ldots 0_{N-1}\}$$

Using x, the breakpoint signal BP is computed as an N-bit one-hot signal in which one bit is "1," and all other bits are "0." The "hot" bit (i.e. equal to "1") in BP occurs at the breakpoint. The breakpoint signal of two geohashes $\text{BP}(g_S, g_L)$ can be found by applying the following equation at each bit of x:

$$\text{BP}(g_S, g_L)_i = \overline{(x_0 + x_1 + \ldots + x_{i-2} + x_{i-1})} \hat{\ } x_i = \text{NOR}(x_0, \ldots, x_{i-1}) \hat{\ } x_i, \text{when } (g_L \oplus g_S)_i = x_i$$

In other words, for each bit $x_i$ of x, if $x_i$ is equal to "1," and all preceding bits in x (i.e. $x_0 \ldots x_{i-1}$) are zeros, then $BP_i=1$, else $BP_i=0$. A generic representation of the resulting BP signal is:

$$BP(g_S, g_L) = \{0_0 \, 0_1 \ldots 0_{K-2} \, 0_{K-1}\} \| \{1_K \, 0_{K+1} \ldots 0_{S-2} \, 0_{S-1}\} \| \{0_S \ldots 0_{L-2} \, 0_{L-1}\} \| \{0_L \ldots 0_{N-1}\}$$

Figure 8:
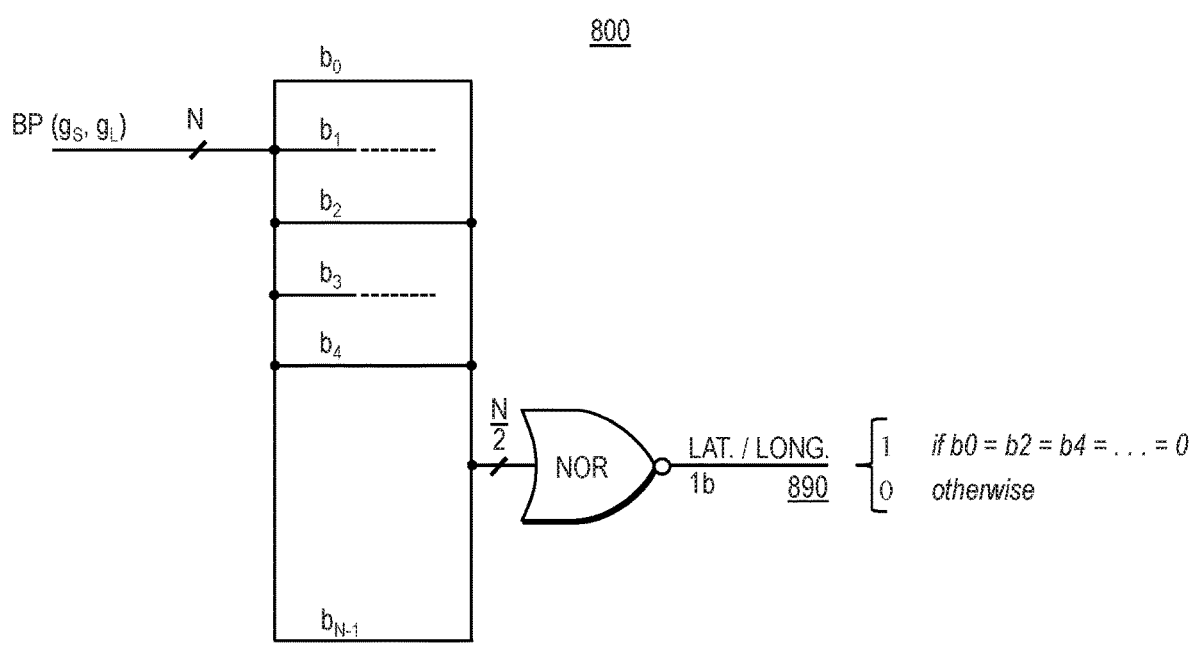

Breakpoint identification stage 640 also includes the circuit 800 shown in FIG. 8, which is operative to determine whether the breakpoint happens in latitude or longitude. The output 890 of circuit 800 is a one bit signal, which is 0 if the breakpoint is in longitude and 1 if the breakpoint is in latitude. Circuit 800 picks all longitude bits and checks them: if all longitude values are zeros, then the breakpoint K is in latitude, and the output 890 is one. Otherwise, the output 890 is zero.

II-D. Mask Generation Stage

II-D-1. Definitions of Masks

Masks 670 are generated in mask generation stage 660 to be used in the main stage 680. Masks block unnecessary bits of code and let the modules 685-688 see only necessary bits, for example, prefix or suffix, which greatly simplifies later processing. These masks can be easily applied in stage 680 by using a bit-wised AND (^) logic gate operation. The masks 671-676 generated by mask generation stage 660 are formally defined in FIG. 9A and generically represented in FIG. 9B.

$Mask_{prefix}$ 671 includes ones for valid bits of the common prefix of the geohashes $g_S$ and $g_L$ and zeros elsewhere. $Mask_{short}$ 672 indicates the valid bits of the shorter geohash ($g_S$). $Mask_{long}$ 673 indicates the valid bits of the longer geohash ($g_L$). $Mask_{suffix:S}$ 674 indicates the valid suffix bits of the shorter geohash ($suffix_S$). $Mask_{suffix:L}$ 675 indicates the valid suffix bits of the longer geohash ($suffix_L$). $Mask_{suffix:T}$ 676 indicates the portion of the valid suffix bits of the longer geohash that are after the index of the last valid bit in the shorter geohash ($suffix_T$).

II-D-2. First Embodiment: at Each Decoded Bit, Check Prior Bits

In one embodiment, masks are generated in stage 660 from $BP(g_S, g_L)$, $D(g_S)$, and $D(g_L)$, which are generated in stages 620 and 640 as discussed above. Generic representations include:

$$BP(g_S, g_L) = \{0_0 \, 0_1 \ldots 0_{K-2} \, 0_{K-1}\} \| \{1_K \, 0_{K+1} \ldots 0_{S-2} \, 0_{S-1}\} \| \{0_S \ldots 0_{L-2} \, 0_{L-1}\} \| \{0_L \ldots 0_{N-1}\}$$

$$D(g_S) = \{0_0 \, 0_1 \ldots 0_{K-2} \, 0_{K-1}\} \| \{0_K \, 0_{K+1} \ldots 0_{S-2} \, 0_{S-1}\} \| \{1_S \ldots 0_{L-2} \, 0_{L-1}\} \| \{0_L \ldots 0_{N-1}\}$$

$$D(g_L) = \{0_0 \, 0_1 \ldots 0_{K-2} \, 0_{K-1}\} \| \{0_K \, 0_{K+1} \ldots 0_{S-2} \, 0_{S-1}\} \| \{0_S \ldots 0_{L-2} \, 0_{L-1}\} \| \{1_L \ldots 0_{N-1}\}$$

Initially, $Mask_{prefix}$ 671, $Mask_{short}$ 672, and $Mask_{long}$ 673 are generated as follows:

$$(Mask_{prefix})_i = \overline{b_0 + b_1 + \ldots + b_{i-2} + b_{i-1}} = NOR(b_0, b_1, \ldots, b_{i-2}, b_{i-1}), \text{ when } BP(g_S, g_L)_i = b_i$$

$$(Mask_{short})_i = \overline{ds_0 + ds_1 + \ldots + ds_{i-2} + ds_{i-1}} = NOR(ds_0, ds_1, \ldots, ds_{i-2}, ds_{i-1}), \text{ when } D(g_S)_i = ds_i$$

$$(Mask_{long})_i = \overline{dl_0 + dl_1 + \ldots + dl_{i-2} + dl_{i-1}} = NOR(dl_0, dl_1, \ldots, dl_{i-2}, dl_{i-1}), \text{ when } D(g_L)_i = dl_i$$

Subsequently, $Mask_{prefix}$ 671, $Mask_{short}$ 672, and $Mask_{long}$ 673 are used to compute $Mask_{suffix:S}$ 674, $Mask_{suffix:L}$ 675, and $Mask_{suffix:T}$ 676 as follows (with the Boolean inverse and AND operations all being bit-wise):

$$Mask_{suffix:S} = Mask_{short} \wedge \overline{Mask_{prefix}}$$

$$Mask_{suffix:L} = Mask_{long} \wedge \overline{Mask_{prefix}}$$

$$Mask_{suffix:T} = Mask_{long} \wedge \overline{Mask_{short}}$$

II-D-3. Second Embodiment: Shifting Operation

In another embodiment, masks 671-673 are generated by using shift operators in which it shifts left a constant value 665 of N bits having all ones as shown in FIG. 24.

If Constant 665 is shifted left by N–S (the number of shorter geohash bits), then the resulting value will have ones in bit positions $0 \leq i < S-1$ and zeros for rest, thus generating $Mask_{short}$ 672. $Mask_{prefix}$ 671 can be similarly generated by shifting $Constant_{ones}$ 665 left by N–K, while $Mask_{long}$ 673 can be generated by shifting $Constant_{ones}$ 665 left by N–L. The sizes of the geohashes S and L are provided by preprocessing stage 620, as discussed above with reference to FIG. 7. A binary logic encoder can find the breakpoint K from $BP(g_S, g_L)$, which is provided by breakpoint identification stage 640 as discussed above.

As with the first method discussed above, $Mask_{prefix}$ 671, $Mask_{short}$ 672, and $Mask_{long}$ 673 can be used to compute $Mask_{suffix:S}$ 674, $Mask_{suffix:L}$ 675, and $Mask_{suffix:T}$ 676 as follows (with the Boolean inverse and AND operations all being bit-wise):

$$Mask_{suffix:S} = Mask_{short} \wedge \overline{Mask_{prefix}}$$

$$Mask_{suffix:L} = Mask_{long} \wedge \overline{Mask_{prefix}}$$

$$Mask_{suffix:T} = Mask_{long} \wedge \overline{Mask_{short}}$$

II-E. Contain Module of Main Stage

II-E-1. Overview of Contain Module

While the functionality of the contain module 685 in main stage 680 can be implemented in several different ways, the fundamental concept is determining if the valid bits of a shorter geohash are a prefix of a longer geohash. If so, both input geohashes will have a common prefix, with that common prefix being the shorter geohash. If one pair of geohashes is in contain, then the size of shorter geohash, S, and the breakpoint index, K, should typically be same or K is larger than S (K≥S).

$$BP(g_S, g_L) = \{0_0 \, 0_1 \ldots 0_{K-2} \, 0_{K-1}\} \| \{1_{K \geq S} \ldots 0_{L-2} \, 0_{L-1}\} \| \{0_L \ldots 0_{N-1}\}$$

$$Decoded(g_S) = \{0_0 \, 0_1 \ldots 0_{S-2} \, 0_{S-1}\} \| \{1_S \ldots 0_{L-2} \, 0_{L-1}\} \| \{0_L \ldots 0_{N-1}\}$$

Note that the breakpoint should happen at most at S from the graphical intuition of geohash, but while handling an N number of bits including invalid bits, it could be over S. Such instances will not affect the result of the geohash primitive calculation. Here is an example, where K is larger than S, with K=L−2:

$$g_S = \{0_0 \, 0_1 \ldots 0_{K-2} \, 0_{K-1}\} \| \{0_K \, 0_{K+1} \ldots 0_{S-2} \, 0_{S-1}\} \| \{0_S \ldots 0_{L-2} \, 0_{L-1}\} \| \{0_L \ldots 0_{N-1}\}$$

$g_L=\{0_0\ 0_1\ \ldots\ 0_{K-2}\ 0_{K-1}\}\|\{0_K\ 0_{K+1}\ \ldots\ 0_{S-2}$
$0_{S-1}\}\|\{0_S\ \ldots\ 1_{L-2}\ 0_{L-1}\}\|\{0_L\ \ldots\ 0_{N-1}\}$

II-E-2. First Embodiment: Subtract Breakpoint Index from Geohash Size

One embodiment of the contain module 685 in main stage 680 involves subtracting the breakpoint index from a geohash size. A decoded $g_S$ has only one active bit ("1"), which is located at the end point of valid $g_S$ bits. When $g_S$ contains $g_L$, they have a shared prefix and the breakpoint always happens at or over the end point of $g_S$. As shown above, Decoded($g_S$) is always equal or less than BP($g_S$, $g_L$) when $g_S$ contains $g_L$. Thus, contain($g_S$, $g_L$) can be computed as follows:

---
If Decoded ($g_S$) ≥ BP($g_S$, $g_L$),
Then $g_S$ contains $g_L$,
Else $g_S$ does not contain $g_L$
---

II-E-3. Second Embodiment: At Each Geohash Size Bit, Check Prior Bits

Another embodiment of the contain module 685 in main stage 680 includes, at each geohash size bit, checking all previous bits, as shown in FIG. 25.

Thus, contain($g_S$, $g_L$) can be computed as follows:

---
For 0 ≤ i < N
  If BP($g_S$, $g_L$)$_i$ = 1 // happens at K
    If AND Decoded$_{gS}$(i-1 downto 0) ≠ 0
      contain(i) = 1
---

II-E-4. Third Embodiment: Use the Prefix Mask

A further embodiment of the contain module 685 in main stage 680 includes using a prefix mask. Since $g_L$ and $g_S$ have a common prefix $\{l_0\ l_1\ \ldots\ l_{S-2}\ l_{S-1}\}=\{s_0\ s_1\ \ldots\ s_{S-2}\ s_{S-1}\}$, applying an XOR operation to $g_L$ and $g_S$, $g_L \oplus g_S$, should result in all zeros in the prefix region if contain($g_S$, $g_L$) is true. In order to focus only on the prefix region, the remaining bits can be cleared by applying Mask$_{short}$ 672. $g_L$ is contained in $g_S$ only if the short-masked XOR of $g_L$ and $g_S$ (i.e. $g_L \oplus g_S \wedge$ Mask$_{short}$) contains all zeros.

$g_L=\{l_0\ l_1\ \ldots\ l_{S-2}\ l_{S-1}\}\|\{l_S\ \ldots\ l_{L-1}\}\|\{0_L\ \ldots\ 0_{N-1}\}$ $g_S=\{s_0\ s_1\ \ldots\ s_{S-2}\ s_{S-1}\}\|\{0_S\ \ldots\ 0_{L-1}\}\|\{0_L\ \ldots\ 0_{N-1}\}$ $g_L \oplus g_S=\{l_0 \oplus s_0\ \ldots\ l_{S-1} \oplus s_{S-1}\}\|\{l_S \oplus 0_S\ \ldots\ l_{L-1} \oplus 0_{L-1}\}\|\{0_L\ \ldots\ 0_{N-1}\}$ $(g_L \oplus g_S)\wedge\text{Mask}_{short}=\{l_0 \oplus s_0\ \ldots\ l_{S-1} \oplus s_{S-1}\}\|\{0_S\ \ldots\ 0_{L-1}\}\|\{0_L\ \ldots\ 0_{N-1}\}$ This algorithm can be equivalently expressed in pseudocode as follows:

---
1:  $g_L \oplus g_S$      ← XOR of $g_S$ and $g_L$
2:  $(g_L \oplus g_S)_{short}$  ← Mask$_{short}$ $\wedge$ $g_L \oplus g_S$
3:  if $(g_L \oplus g_S)_{short}$ is all zeros then
4:      contain ← TRUE
5:  else
6:      contain ← FALSE
7:  end if
8:  return contain
---

II-F. Internal Touch Module of Main Stage

Evaluating whether two geohash regions touch internally requires checking (1) if a large region contains a smaller one, and (2) if the smaller region pushes toward an edge of the large one from the inside. The first of these conditions is evaluated by the contain module 685 of main stage 680, discussed above. With respect to the second condition, when a geohash region pushes towards one direction, latitude or longitude, bit values for that direction should be all same, zeros (0) or ones (1) because of the hierarchical structure: $1_{K+2}=1_{K+4}=\ldots=1_K$ The remainder of the internal touch operation deals with checking a suffix of the longer geohash code, suffix$_L$. However, if one of the geohash regions contains the other, i.e., if the first condition is true, then they will have a common prefix whose length is the same as the size of the smaller geohash. Thus, it is sufficient to check only the portion of the suffix of the longer geohash (suffix$_L$) which is beyond the endpoint of the shorter geohash: suffix$_T$ shown in FIG. 2B.

An embodiment of the internal touch module 686 of the main stage 680 masks and checks all latitude or longitude bits by applying a suffix mask to the longer geohash to isolate suffix data in valid bits to check all bit values of latitude or longitude in a suffix. The following algorithm generates Mask$_{suffix:T:lat}$ or Mask$_{suffix:T:long}$ depending on which dimension includes the breakpoint. If the breakpoint is a latitude bit, then Mask$_{suffix:T:lat}$ is needed, else Mask$_{suffix:T:long}$. These can be generated by applying Mask$_{suffixT}$ 676 to respective binary constants, 101010 . . . and 010101 . . . The proper mask is then applied to the longer geohash and the remaining bits are checked to be zeros (0) or ones (1).

---
1:  contain      ← Check contain operation
2:  $(g_L)_{suffix:T:lat}$ ← Mask$_{suffix:T:lat}$ $\wedge$ $g_L$
3:  $(g_L)_{suffix:T:long}$ ← Mask$_{suffix:T:long}$ $\wedge$ $g_L$
4:  push        ← FALSE as default
5:  if (K is at latitude) then
6:      if (($g_L)_{suffix:T:lat}$ is all zeros or Mask$_{suffix:T:lat}$) then
7:          push ← TRUE
8:      end if
9:  else
10:     if (($g_L)_{suffix:T:long}$ is all zeros or Mask$_{suffix:T:lon}$) then
11:        push ← TRUE
12:     end if
13: end if
14: touch$_{in}$ ← (push $\wedge$ contain)
15: return touch$_{in}$
---

Figure 10:
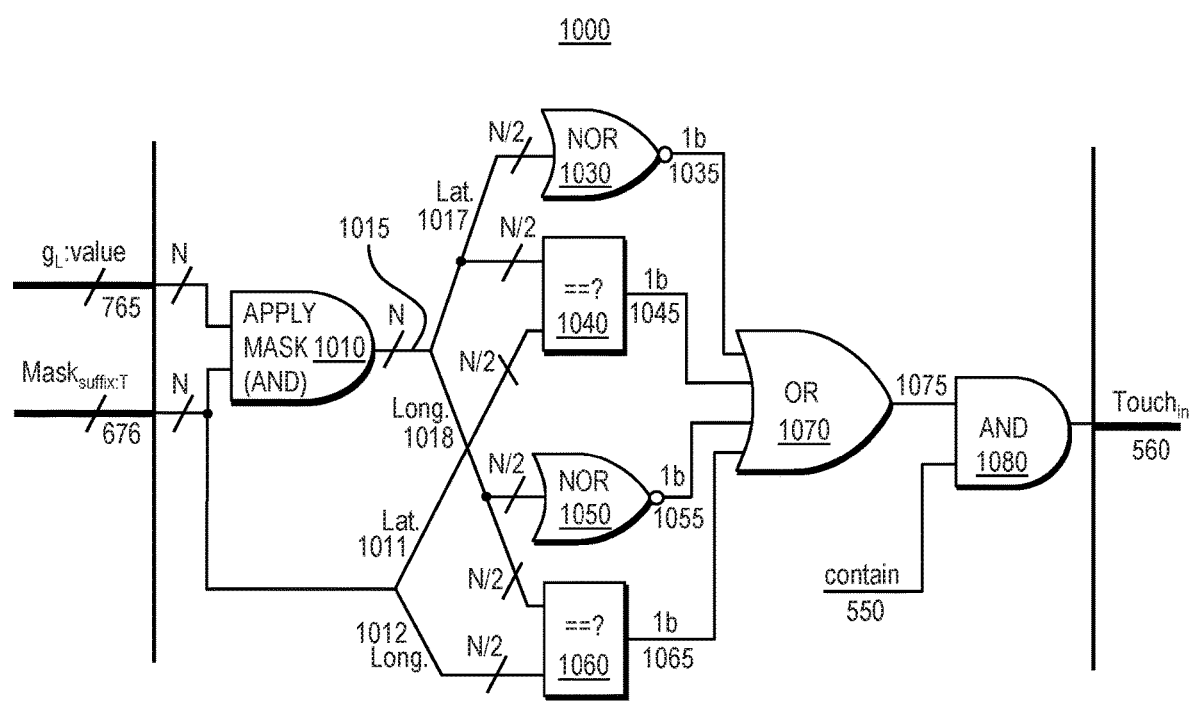
FIGS. 10-18 are simplified schematic diagrams of exemplary circuits which may be associated with one or more illustrative embodiments of the present invention.

FIG. 10 shows a schematic for an exemplary circuit 1000 to implement the internal touch module 686 of the main stage 680. Circuit 1000 receives $g_L$:value 765 from preprocessing stage 620 and Mask$_{suffix:T}$ 676 from mask generating stage 660, each of which has N bits. Gate 1010 applies Mask$_{suffix:T}$ 676 to $g_L$:value 765 using a bit-wise AND operation. The resulting masked output $(g_L)_{suffix:T}$ 1015 is then separated into components for latitude $(g_L)_{suffix:T:lat}$ 1017 and longitude $(g_L)_{suffix:T:lon}$ 1018, for example by applying masked output 1015 to respective binary constants, 101010 . . . and 010101 . . . The latitude 1017 and longitude 1018 components of masked output 1015 are provided to respective NOR gates 1030 and 1050 to produce respective single-bit outputs 1035 and 1055. Output 1035 will have a value of 1 if $(g_L)_{suffix:T:lat}$ 1017 is all zeroes and a value of 0 otherwise. Output 1055 will have a value of a value of 1 if $(g_L)_{suffix:T:lat}$ 1017 is all zeroes and a value of 0 otherwise.

Mask$_{suffix:T}$ 676 is also separated into components for latitude 1011 (Mask$_{suffix:T:lat}$) and longitude 1012 (Mask$_{suffix:T:lon}$), for example by applying Mask$_{suffix:T}$ 676 to respective binary constants, 101010 . . . and 010101 . . . The respective latitude components of Mask$_{suffix:T}$ 1011 and masked output 1017 are provided to a comparator 1040, which produces a binary output 1045 having a value of 1 if the aforementioned latitude components are equal and a value of 0 otherwise. The respective longitude components of Mask$_{suffix:T}$ 1012 and masked output 1018 are provided to another comparator 1060, which produces a binary output 1065 having a value of 1 if the aforementioned longitude components are equal and a value of 0 otherwise.

The aforementioned bit output values 1035, 1045, 1055 and 1065 are then input into an OR gate 1070 to produce push 1075 similar to that produced by the above pseudo-code. Push 1075 is combined with the output 550 of contain module 685 in AND gate 1080 to produce the final output value 560.

II-G. External Touch Module of Main Stage

II-G-1. Introduction to External Touch Module

When two geohash regions touch each other externally, they split at the breakpoint, push toward each other in one dimension, and overlap in the other dimension. When two geohash regions, $R_L$ and $R_S$, push towards each other, one of two cases can occur at the breakpoint K: (1) $s_K=1$ and $l_K=0$ or (2) $s_K=0$ and $l_K=1$. Note that, by definition, $s_K \neq l_K$. In both of the aforementioned cases, the remaining latitude or longitude bits after K, should be the inverse of $s_K$ and $l_K$, in order to stay touching:

$$s_{K+2}=s_{K+4}= \ldots =\overline{s_K}$$

$$l_{K+2}=l_{K+4}= \ldots =\overline{l_K}$$

By way of example, if the two geohash regions split into different sides of a longitude line, such as a left side of zero in latitude and a right side of one latitude (i.e., the breakpoint is a latitude value), then the region with zero in latitude at the breakpoint must have all ones in latitude beyond the breakpoint, and the region with one in latitude at the breakpoint must have all zeros in latitude beyond the breakpoint. This is necessary for the regions to push towards one direction and thereby stay touching. For example, when the breakpoint K is a latitude value:

$$g_{L:lat}=\{\text{prefix}\}\|\{l_K\ l_{K+2}\ l_{K+4}\ldots\}\|\{0_L\ldots 0_{N-1}\}$$

$$g_{S:lat}=\{\text{prefix}\}\|\{s_K\ s_{K+2}\ s_{K+4}\ldots\}\|\{0_L\ldots 0_{N-1}\}$$

$$g_{L:long}=\{\text{prefix}\}\|\{l_{K+1}\ l_{K+3}\ l_{K+5}\ldots s_{S-1}\ l_S\ldots\}\|\{0_L\ldots 0_{N-1}\}$$

$$g_{S:long}=\{\text{prefix}\}\|\{s_{K+1}\ s_{K+3}\ s_{K+5}\ldots s_{S-1}\}\|\{0_L\ldots 0_{N-1}\}$$

The latitude values should therefore be either:

| Case (1) | OR | Case (2) |
|---|---|---|
| $s_K=1, s_{K+2}=s_{K+4}=s_{K+6}=\ldots=0$ | | $s_K=0, s_{K+2}=s_{K+4}=s_{K+6}=\ldots=1$ |
| $l_K=0, l_{K+2}=l_{K+4}=l_{K+6}=\ldots=1$ | | $l_K=1, l_{K+2}=l_{K+4}=l_{K+6}=\ldots=0$ |

At the same time, the regions defined by the geohashes must overlap in the other dimension. The remaining bits, $\langle l_{K+1}, l_{K+3}, \ldots \rangle$ in suffix$_C$ should be same as $\langle s_{K+1}, s_{K+3}, \ldots \rangle$ in suffix$_S$. For example, where breakpoint K is a latitude value as discussed above, the longitude of $g_S$ should be a prefix of $g_L$. Expressed differently:

$$s_{K+1}=l_{K+1}, s_{K+3}=l_{K+3}, \ldots s_i=l_i,$$

where $i=K+2n+1 \leq S$, s. t. $n \in \{0, N\}$

II-G-2. First Embodiment: Checking Once Using XOR

By definition of breakpoint and prefix, $g_L \oplus g_S$ has all zeros in the prefix $\langle 0 \ldots K-1 \rangle$. In order for the conditions discussed above in the previous section to be true, $g_L \oplus g_S$ should have all ones at $\{K, K+2, K+4,\}$ and all zeroes at $\{K+1, K+3, K+5, \ldots\}$ in the range between K and S−1. In other words, $g_L \oplus g_S$ must have a pattern of $\{1, 0, 1, 0,\}$ in the range between K and S−1. This requirement is referred to as the XOR condition:

$$g_L=\{l_0\ l_1\ldots l_{K-1}\}\|\{l_K\ l_{K+1}\ldots l_{S-2}\ l_{S-1}\}\|\{l_S\ldots l_{L-2}\ l_{L-1}\}\|\{0_L\ldots 0_{N-1}\}$$

$$g_S=\{s_0\ s_1\ldots s_{K-1}\}\|\{s_K\ s_{K+1}\ldots s_{S-2}\ s_{S-1}\}\|\{0_S\ldots 0_{L-2}\ 0_{L-1}\}\|\{0_L\ldots 0_{N-1}\}$$

$$g_L \oplus g_S=\{l_0 \oplus s_0\ldots l_{K-1} \oplus s_{K-1}\}\|\{l_K \oplus s_K\ldots l_{S-1} \oplus s_{S-1}\}\|\{l_S \oplus 0_S\ldots l_{L-1} \oplus 0_{L-1}\}\|\{0_L\ldots 0_{N-1}\}$$

$$g_L \oplus g_S=\{0_0 1\ldots 0_{K-2}\ 0_{K-1}\}\|\{l_K\ldots l_{S-1} \oplus s_{S-1}\}\|\{l_S 0_S\ldots l_{L-1} \oplus 0_{L-1}\}\|\{0_L\ldots 0_{N-1}\}$$

Note that other values $\{l_S, \ldots, l_{L-1}\}$ will remain past S, but these can be removed by masking $g_L \oplus g_S$ with mask$_{suffix:S}$. Such masking will result in data being present only between K and S−1. When the XOR condition holds, two separate cases must be considered to check for an external touch: $s_K=1$ ($l_K=0$) or $l_K=1$ ($s_K=0$). Either the latitude or longitude bits can be isolated by applying bit operations or masks.

Figure 11:
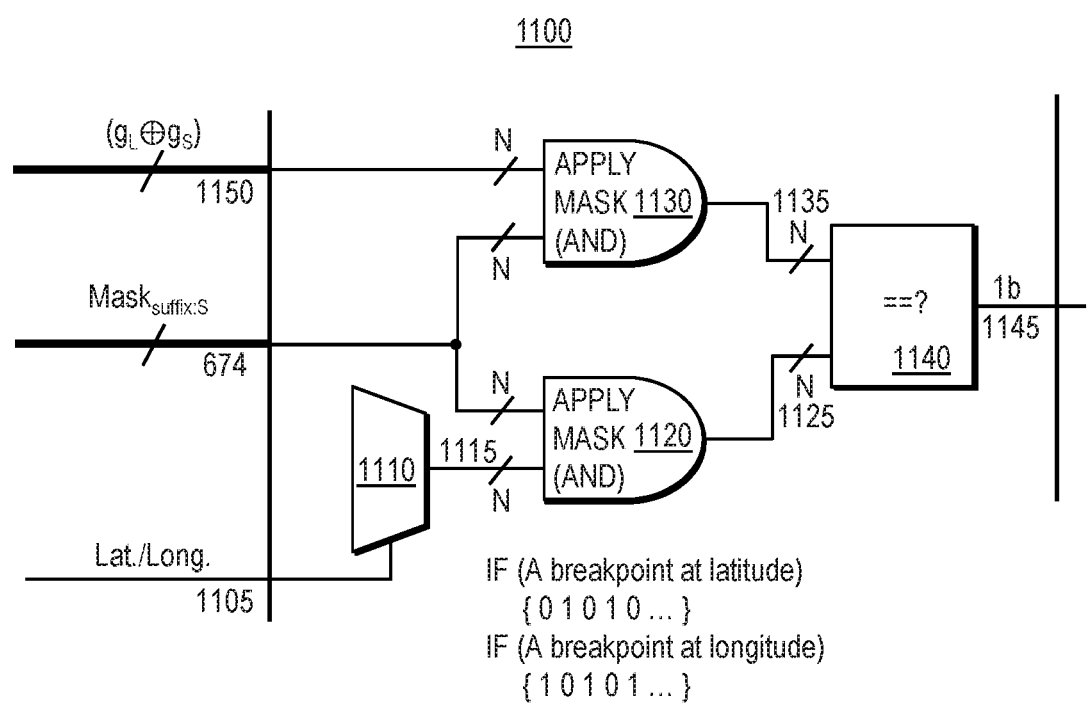

FIG. 11 is a schematic diagram of a circuit 1100 which can be used to check for the XOR condition as part of an embodiment of external touch module 687 in main stage 680. Multiplexer 1110 uses latitude/longitude select signal 1105 to produce mux output 1115 consisting of N bits having a specific pattern. If latitude/longitude select signal 1105 indicates that the breakpoint is at latitude, then mux output 1115 will have the pattern $\{0\ 1\ 0\ 1\ 0 \ldots\}$ If latitude/longitude select signal 1105 indicates that the breakpoint is at longitude, then mux output 1115 will have the pattern $\{1\ 0\ 1\ 0\ 1 \ldots\}$.

Mux output 1115 is applied to Mask$_{suffix:S}$ 674 using a bitwise AND operation by gate 1120 to produce output 1125. Depending on which of the two aforementioned values of mux output 1115 is selected, output 1125 will be either Mask$_{suffix:S:lat}$ or Mask$_{suffix:S:lon}$. Mask$_{suffix:S}$ 674 is also applied to $g_L \oplus g_S$ 1150 using a bitwise AND operation by gate 1130 to produce output 1135. Comparator 1140 performs a bitwise comparison of signals 1125 and 1135 to produce a single-bit output 1145. If signals 1125 and 1135 are equal, then the XOR condition is true and the output 1145 of comparator 1140 is 1; otherwise the XOR condition is false and the output 1145 of comparator 1140 is 0.

Performing a bitwise AND of $g_L \oplus g_S$ with $g_S$ will isolate latitude values of $g_S$: $\{s_K, s_{K+2}, s_{K+4}, \ldots\}$:

$$(g_L \oplus g_S)\hat{\ }g_s\{0_0 \ldots 0_{K-1}\}\|$$
$$\{1_K\ 0_{K+1}\ 1_{K+2}\ 0_{K+3} \ldots\}\|\{l_S \ldots l_{L-1}\}\|\{0_L \ldots 0_{N-1}\} =$$
$$\{0_0 \ldots 0_{K-1}\}\|\{1_K\hat{\ }s_K\ 0_{K+1}\hat{\ }s_{K+1}\ 1_{K+2}\hat{\ }s_{K+2}\ 0_{K+3}\hat{\ }s_{K+3} \ldots\}$$
$$\|\{l_S\hat{\ }0_S \ldots l_{L-1}\hat{\ }0_{L-1}\}\|\{0_L \ldots 0_{N-1}\} =$$
$$\{0_0 \ldots 0_{K-1}\}\|\{s_K\ 0_{K+1}\ s_{K+2}\ 0_{K+3} \ldots\}\|\{0_S \ldots 0_{L-1}\}\|\{0_L \ldots 0_{N-1}\}$$

Performing a bitwise AND of $g_L \oplus g_S$ with $Mask_{suffix:S}$ (as discussed above with reference to 1130 in FIG. 11) will isolate only valid latitude values of $g_S$. Performing a bitwise AND of $g_L \oplus g_S$ with $g_L$ can similarly permit isolation of latitude values of $g_L$: $\{1_K, 1_{K+2}, 1_{K+4}, \ldots\}$:

$$(g_L \oplus g_S)\hat{\ }g_L = \{0_0 \ldots 0_{K-1}\}\|\{1_K\ 0_{K+1}\ 1_{K+2}\ 0_{K+3} \ldots\}\|\{l_{S+1}\ l_{S+2}\ l_{S+3} \ldots l_{L-1}\}\|\{0_L \ldots 0_{N-1}\}$$

Applying either $Mask_{suffix:S}$ or an inverted version of $Mask_{suffix:T}$ to $(g_L \oplus g_S) \wedge g_L$ will generate $((g_L \oplus g_S)\hat{\ }g_L)_C$. Using $mask_{suffix:T}$ 676 and the signal of latitude/longitude signal of a breakpoint (similar to signal 1105 in FIG. 11), one can create a latitude/longitude version of $mask_{suffix:T}$ analogous to the latitude/longitude version of $Mask_{suffix:S}$ 1125 in FIG. 11. Applying this latitude/longitude version of $Mask_{suffix:T}$ to $(g_L \oplus g_S)\hat{\ }g_L$ will generate $((g_L \oplus g_S)\hat{\ }g_L)_T$. Adding these two values generates $((g_L \oplus g_S)\hat{\ }g_L)_{C+T}$, which only includes valid values of $\{1_K, 1_{K+2}, 1_{K+4}, \ldots\}$:

$$((g_L \oplus g_S)\hat{\ }g_L)_C = \{0_0 \ldots 0_{K-1}\}\|\{1_K\ 0_{K+1}\ 1_{K+2}\ 0_{K+3} \ldots\}\|\{0_S\ 0_{S+1}\ 0_{S+2}\ 0_{S+3} \ldots 0_{L-1}\}\|\{0_L \ldots 0_{N-1}\}$$

$$((g_L \oplus g_S)\hat{\ }g_L)_T = \{0_0 \ldots 0_{K-1}\}\|\{0_K\ 0_{K+1}\ 0_{K+2}\ 0_{K+3} \ldots\}\|\{l_S\ 0_{S+1}\ l_{S+2}\ 0_{S+3} \ldots 0_{L-1}\}\|\{0_L \ldots 0_{N-1}\}$$

$$((g_L \oplus g_S)\hat{\ }g_L)_{C+T} = \{0_0 \ldots 0_{K-1}\}\|\{1_K\ 0_{K+1}\ 1_{K+2}\ 0_{K+3} \ldots\}\|\{l_S\ 0_{S+1}\ l_{S+2}\ 0_{S+3} \ldots 0_{L-1}\}\|\{0_L \ldots 0_{N-1}\}$$

As discussed above, if a geohash pair of $g_S$ and $g_L$ touch each other, there are only two cases: (1) $s_K=1$ and $l_K=0$ or (2) $s_K=0$ and $l_K=1$. In case (2), $((g_L \oplus g_S)\hat{\ }g_L)_{C+T}$ has a single bit of one at K, $1_K$, which is same is $BP(g_S, g_L)$. By checking the XOR value in circuit 1100, the $s_K$ values are known to be satisfied. In case (2), $(g_L \oplus g_S)\hat{\ }g_S$ has only a single bit of one at K, $s_K$, but it does not guarantee all ones at $\{1_S, 1_{S+2},\}$ over S. So it is necessary to check if $\{1_S, 1_{S+1}, 1_{S+2}, \ldots\}$ is all ones using $((g_L \oplus g_S)\hat{\ }g_L)_T$.

If $s_K=1$ in case (1), then the rest of ith bits (where i is an integer) in $g_S$ n∈{0,N}, between K+2 and K+2n, s.t should be all zeros and ith bits in $g_L$ n∈{0,N}, between K+2 and K+2n, s.t. should be all zeros. Since it is already known that the ith bits of $g_S$ and $g_L$ between K+2 and K+2n are exclusive to each other, then it is only necessary to check if $g_L$ satisfies this condition. It applies to other case(2) as same when $1_K=1$. The evaluation of the external touch can thus be concluded by simply evaluating only whether $(g_L)_{suffix:L:lat/long}$ is equal to $BP(g_S, g_L)$.

Figure 12:
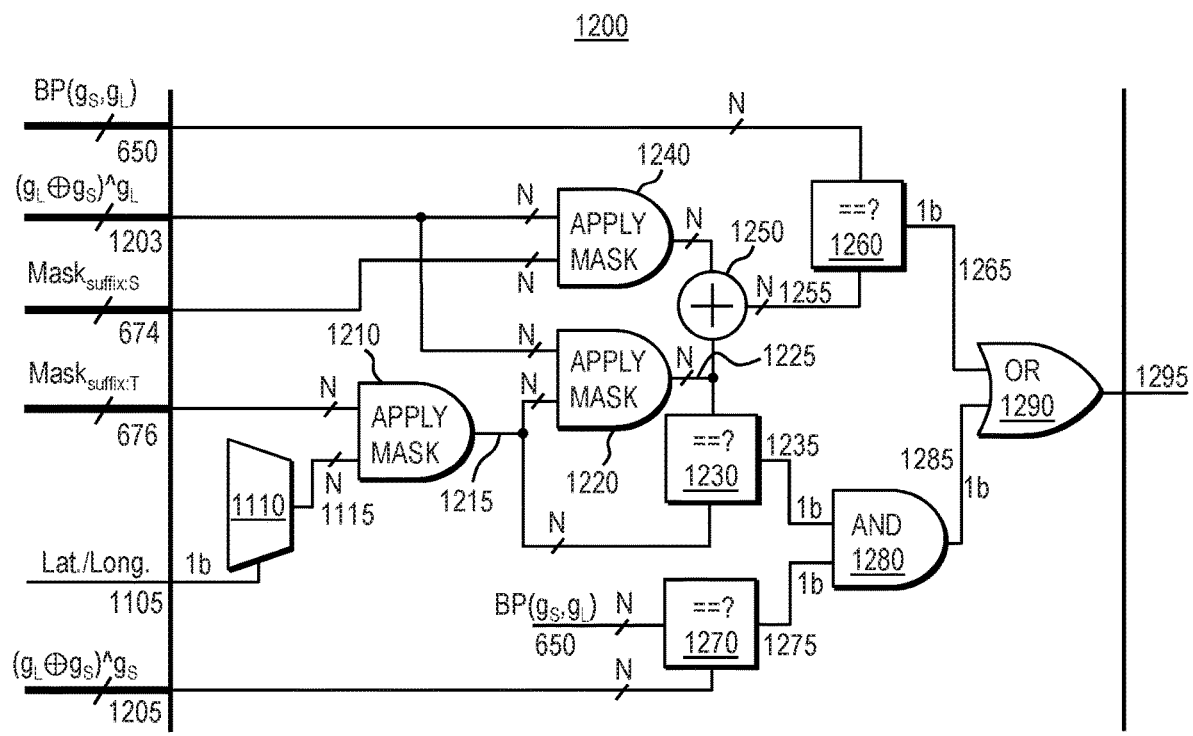

FIG. 12 is a schematic diagram of an exemplary circuit 1200 which can be used to check for the foregoing condition within an illustrative embodiment of external touch module 687 in main stage 680. Latitude/longitude select signal 1105, multiplexer 1110, and mux output 1115 are similar to those discussed above with reference to FIG. 11. Mux output 1115 is combined with $Mask_{suffix:T}$ 676 using a bit-wise AND operation in gate 1210 to produce a latitude/longitude version of $Mask_{suffix:T}$ 1215, which is then applied to $(g_L \oplus g_S)\hat{\ }g_L$ 1203 using a bit-wise AND operation in gate 1220 to produce $((g_L \oplus g_S)\hat{\ }g_L)_T$ 1225. $Mask_{suffix:S}$ 674 is applied to $(g_L \oplus g_S)\hat{\ }g_L$ 1203 using a bit-wise AND operation in gate 1240 to produce $((g_L \oplus g_S)\hat{\ }g_L)_C$ 1245. $((g_L \oplus g_S)\hat{\ }g_L)_C$ 1245 and $((g_L \oplus g_S)\hat{\ }g_L)_T$ 1225 are combined in adder 1250 to produce $((g_L \oplus g_S)\hat{\ }g_L)_{C+T}$ 1255. Comparator 1260 determines whether $((g_L \oplus g_S)\hat{\ }g_L)_{C+T}$ 1255 is equal to $BP(g_S, g_L)$ 650, which is received from breakpoint identification stage 640. Output 1265 of comparator 1260 will be 1 if $((g_L \oplus g_S)\hat{\ }g_L)_{C+T}$ 1255 is equal to $BP(g_S, g_L)$ 650, and otherwise will be 0. As discussed in the preceding paragraph, output 1265 of comparator 1260 will therefore be 1 in case (2) discussed above, and otherwise will be 0.

Comparator 1230 determines whether the latitude/longitude version of $Mask_{suffix:T}$ 1215 is equal to $((g_L \oplus g_S)\hat{\ }g_L)_T$ 1225. Output 1235 of comparator 1230 will be 1 if the latitude/longitude version of $Mask_{suffix:T}$ 1215 is equal to $((g_L \oplus g_S)\hat{\ }g_L)_T$ 1225, and otherwise will be zero. Comparator 1270 determines whether $(g_L \oplus g_S)\hat{\ }g_S$ 1205 is equal to $BP(g_S, g_L)$ 650. Output 1275 of comparator 1270 will be 1 if $(g_L \oplus g_S)\hat{\ }g_S$ 1205 is equal to $BP(g_S, g_L)$ 650, and otherwise will be zero. The aforementioned outputs 1235 and 1275 are combined by AND gate 1280 to produce signal 1285. Signals 1265 and 1285 are processed by OR gate 1290 to produce output signal 1295.

Pseudocode for an exemplary algorithm for performing an external touch operation according to an embodiment of the present invention includes:

```
 1: g_L⊕g_S        ← XOR of g_S and g_L
 2: touch_ex       ← FALSE as default
 3: if (K is at latitude) then
 4:     constant_suffix:S ← Mask_suffix:S ^ <0101...>
 5: else
 6:     constant_suffix:S ← Mask_suffix:S ^ <1010...>
 7: end if
 8: if (g_L⊕g_S = constant_suffix:S) then
 9:     XOR condition holds
10: end if
11: g_S ← <0...> || <S_K 0 S_K+2 0...> || <0...>
12: g_L ← <0...> || <1_K 0 1_K+2 0...> || < 1_K+4 0...> || <0...>
13: if XOR condition holds then
14:     if ((g_S)_suffix:S:lat/long = bp(g_S,g_L)) and ((g_S)_suffix:T:lat/long = bp(g_S,g_L))
        then
15:         touch_ex ← TRUE
16:     end if
17:     if ((g_L)_suffix:L:lat/long = bp(g_S,g_L)) then
18:         touch_ex ← TRUE
19:     end if
20: end if
21: return tocuh_ex
```

Figure 13:
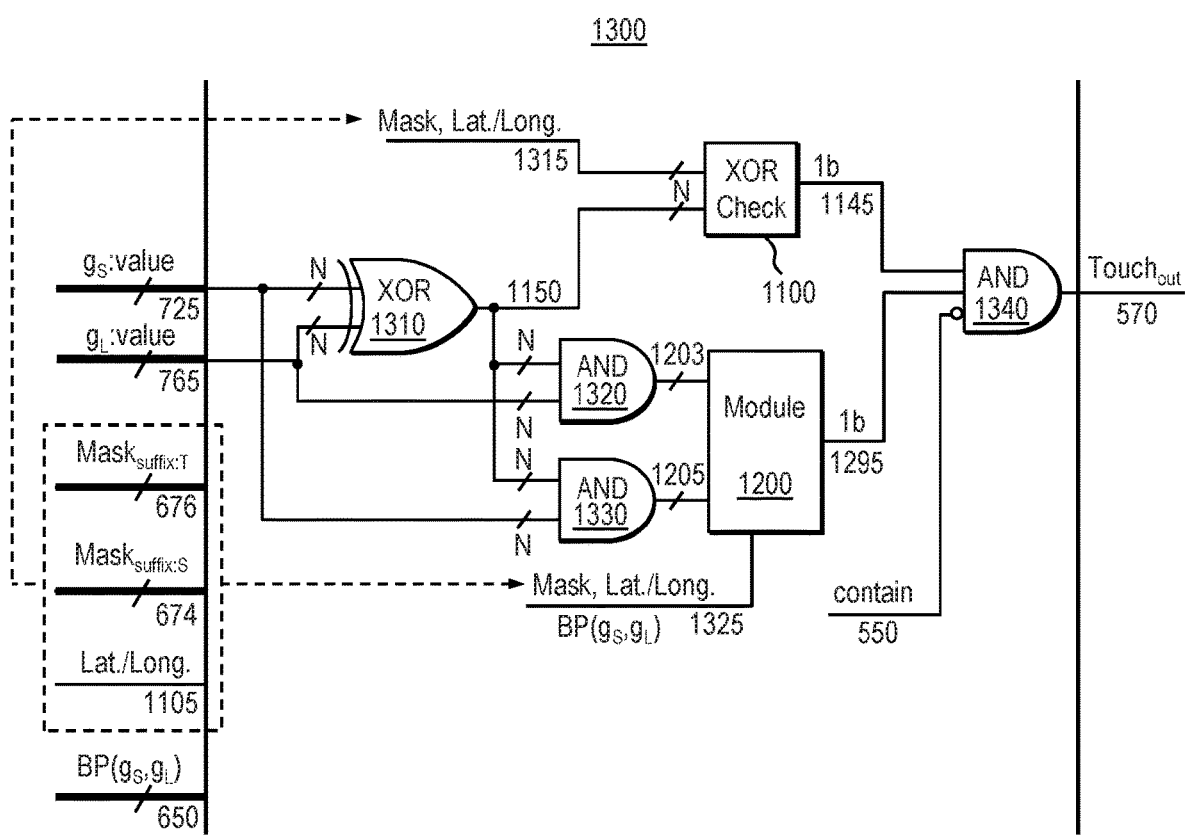

FIG. 13 shows a schematic for an exemplary circuit 1300 to implement the external touch module 687 of the main stage 680. $g_S$:value 725 and $g_L$:value 765, which are received from preprocessing stage 620 as discussed above with reference to FIG. 7, are combined by XOR gate 1310 to produce $g_L \oplus g_S$ 1150, which is input into an XOR check module 1100 of the type shown in FIG. 11. As discussed above with reference to FIG. 11, other inputs 1315 to the XOR check module include $Mask_{suffix:S}$ 674 and latitude/longitude select signal 1105.

$g_L \oplus g_S$ 1150 is combined with $g_L$ 765 in AND gate 1320 to produce $(g_L \oplus g_S)\hat{\ }g_L$ 1203. $g_L \oplus g_S$ 1150 is combined with $g_S$ 725 in AND gate 1330 to produce $(g_L \oplus g_S)\hat{\ } g_S$ 1205. Signals 1203 and 1205 are provided as inputs into a module 1200 of the type shown in FIG. 12. As discussed above with reference to FIG. 12, other inputs 1325 to module 1200 include $Mask_{suffix:S}$ 674, $Mask_{suffix:T}$ 676, latitude/longitude select signal 1105, and $BP(g_S, g_L)$ 650. The output 1145 of XOR check module 1100 and the output 1295 of module 1200 are combined with the inverse of the output 550 of contain module 685 by AND gate 1340 to produce the final output signal 570 of external touch module 687 of the main stage 680.

II-G-3. Second Embodiment: Lat./Long. Split with Min-Contain Operation

Another embodiment of external touch module 687 of the main stage 680 splits latitude and longitude bits with a min-contain operation. For example, assume that breakpoint K is a latitude value. The latitude and longitude of two geohashes $g_S$ and $g_L$ would then be:

$$g_{L:lat} = \{prefix\} \| \{l_K\ l_{K+2}\ l_{K+4} \ldots\} \| \{0_L \ldots 0_{N-1}\}$$

$$g_{S:lat} = \{prefix\} \| \{s_K\ s_{K+2}\ s_{K+4} \ldots\} \| \{0_L \ldots 0_{N-1}\}$$

$$g_{L:long} = \{prefix\} \| \{l_{K+1}\ l_{K+3}\ l_{K+5} \ldots l_{S-1}\ l_S \ldots\} \| \{0_L \ldots 0_{N-1}\}$$

$$g_{S:long} = \{prefix\} \| \{s_{K+1}\ s_{K+3}\ s_{K+5} \ldots s_{S-1}\} \| \{0_L \ldots 0_{N-1}\}$$

The exact value of $g_L$ at the breakpoint K can be found by performing a bitwise AND operation on $BP(g_S,g_L)$lat and $g_L$:lat, which only has a valid bit value at K:

$$BP(g_S,g_L)_{lat} = \{0 \ldots 0\} \| \{1_K\ 0_{K+2}\ 0_{K+4} \ldots\} \| \{0_L \ldots 0_{N-1}\}$$

$$g_{L:lat} = \{prefix\} \| \{l_K\ l_{K+2}\ l_{K+4} \ldots\} \| \{0_L \ldots 0_{N-1}\}$$

$$BP(g_S,g_L)_{lat}\hat{\ }g_{L:lat} = \{0 \ldots 0\} \| \{l_K\ 0_{K+2}\ 0_{K+4} \ldots\} \| \{0_L \ldots 0_{N-1}\}$$

```
1:  if BP(g_S, g_L)_lat ^ g_L:lat = 0
2:      l_K = 0      // case (1)
3:  else
4:      l_K = 1      // case (2)
```

Next, by performing a bitwise AND operation on $g_{L:lat}$ and $Mask_{suffix:L:lat}$, the valid suffix values, $\{l_K, l_{K+2}, l_{K+4}, \ldots\}$ can be isolated:

$$g_{L:lat} = \{prefix\} \| \{l_K\ l_{K+2}\ l_{K+4} \ldots\} \| \{0_L \ldots 0_{N-1}\}$$

$$Mask_{suffix:L:lat} = \{0 \ldots 0\} \| \{1_K\ 1_{K+2}\ 1_{K+4} \ldots\} \| \{0_L \ldots 0_{N-1}\}$$

$$g_{L:lat}\hat{\ }Mask_{suffix:L:lat} = \{0 \ldots 0\} \| \{l_K\ l_{K+2}\ l_{K+4} \ldots\} \| \{0_L \ldots 0_{N-1}\}$$

As previously discussed, there are only two possible cases depending on $l_K/s_K$ value to touch externally in latitude dimension:

| Case (1) | OR | Case (2) |
|---|---|---|
| $s_K = 1, s_{K+2} = s_{K+4} = s_{K+6} = \ldots = 0$ | | $s_K = 0, s_{K+2} = s_{K+4} = s_{K+6} = \ldots = 1$ |
| $l_K = 0, l_{K+2} = l_{K+4} = l_{K+6} = \ldots = 1$ | | $l_K = 1, l_{K+2} = l_{K+4} = l_{K+6} = \ldots = 0$ |

Accordingly, if one geohash region pushes toward other, there are only two possible conditions for $\{l_K, l_{K+2}, l_{K+4}, \ldots\}$:

IN Case (1), IF:

$$\{0_0 \ldots 0_{K-1}\} \| \{l_K\ l_{K+2}\ l_{K+4} \ldots\} \| \{0_L \ldots 0_{N-1}\} = \{0_0 \ldots 0_{K-1}\} \| \{0_K\ 1_{K+2}\ 1_{K+4} \ldots\} \| \{0_L \ldots 0_{N-1}\}$$

THEN $g_L$ pushes towards $g_S$.

IN Case (2), IF:

$$\{0_0 \ldots 0_{K-1}\} \| \{l_K\ l_{K+2}\ l_{K+4} \ldots\} \| \{0_L \ldots 0_{N-1}\} = \{0_0 \ldots 0_{K-1}\} \| \{1_K\ 0_{K+2}\ 0_{K+4} \ldots\} \| \{0_L \ldots 0_{N-1}\}$$

THEN $g_L$ pushes towards $g_S$

Likewise, if one geohash region pushes toward other, there are only two possible conditions for $\{S_K, S_{K+2}, S_{K+4}, \ldots\}$:

IN Case (1), IF:

$$\{0_0 \ldots 0_{K-1}\} \| \{s_K\ s_{K+2}\ s_{K+4} \ldots\} \| \{0_L \ldots 0_{N-1}\} = \{0_0 \ldots 0_{K-1}\} \| \{1_K\ 0_{K+2}\ 0_{K+4} \ldots\} \| \{0_L \ldots 0_{N-1}\}$$

THEN $g_S$ pushes towards $g_L$.

IN Case (2), IF:

$$\{0_0 \ldots 0_{K-1}\} \| \{s_K\ s_{K+2}\ s_{K+4} \ldots\} \| \{0_L \ldots 0_{N-1}\} = \{0_0 \ldots 0_{K-1}\} \| \{0_K\ 1_{K+2}\ 1_{K+4} \ldots\} \| \{0_L \ldots 0_{N-1}\}$$

THEN $g_S$ pushes towards $g_L$.

In either Case (1) or Case (2), the regions must also satisfy both $g_{L:alt}$ and $g_{S:lat}$ in latitude dimension:

```
IF (BP(g_S,g_L)_lat ^ g_L:lat = 0)
    AND (g_L:lat ^ Mask_suffix:L:lat + BP(g_S,g_L)_lat = Mask_suffix:L:lat)
    AND (g_S:lat ^ Mask_suffix:S:lat = BP(g_S,g_L)_lat)
        THEN g_L and g_S push towards each other in Case (1)
IF (BP(g_S,g_L)_lat ^ g_L:lat ≠ 0)
    AND (g_L:lat ^ Mask_suffix:L:lat = BP(g_S,g_L)_lat)
    AND (g_S:lat ^ Mask_suffix:S:lat + BP(g_S,g_L)_lat = Mask_suffix:S:lat)
```

THEN $g_L$ and $g_S$ push towards each other in Case (2)

In longitude dimension, one can consider that is $g_{L:long}$ contains $g_{S:long}$, $g_{L:long}$ and $g_{S:long}$ should stay overlapped with each other with no splitting in longitude dimension. So it can be decided by reusing contain operation previously described, but with different size of geohashes because it only considers part of the full geohash. Interleaving of the geohash starts from longitude, so an example operation to calculate sizes of latitude and longitude from the original size of the geohash is:

$g_A$ size=7 bits (4 bits for longitude+3 bits for latitude)

$g_A$ size=0111=7

$g_{A:lat}$ size=»011»1=3

$g_{A:long}$ size=011+1=4

The size of latitude can be obtained by shifting one bit right, and the size of longitude can be done by adding the shifted end bit. With given latitude or longitude geohash data values and size values, the contain operation can be performed. Thus, external touch can be determined by checking if two geohashes push towards each other in one dimension and if they are in contain in other dimension.

Figure 14:
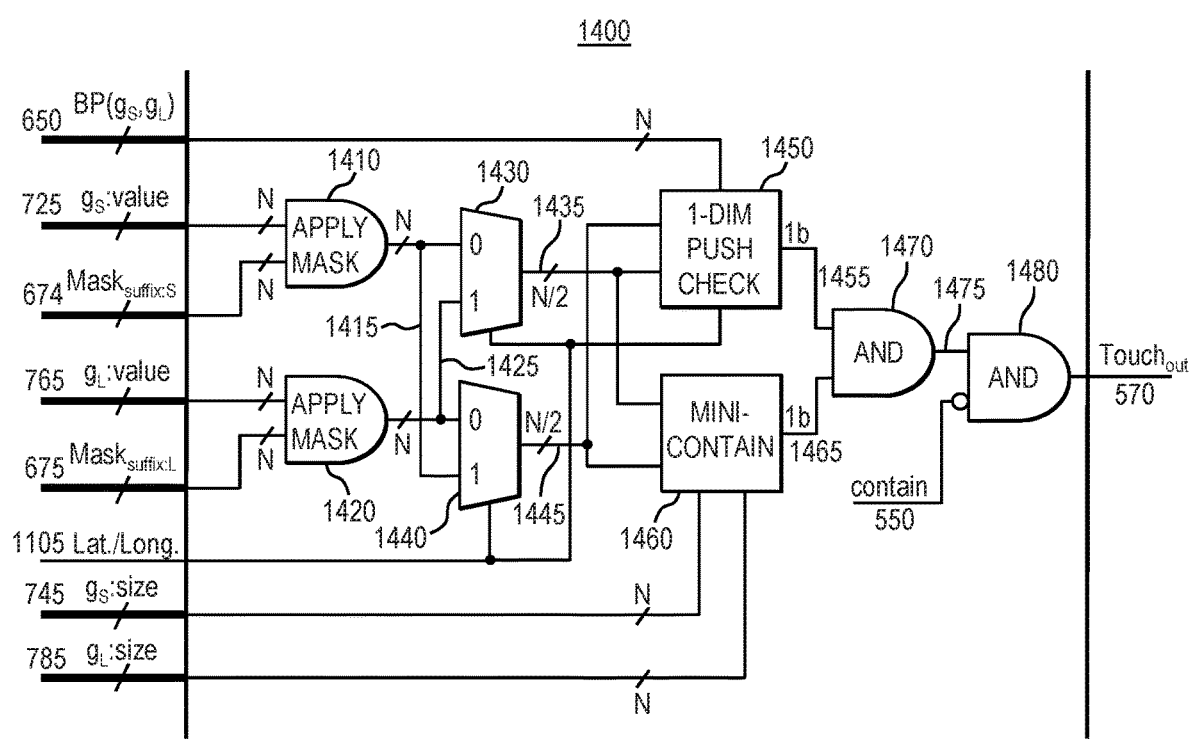

FIG. 14 shows a schematic for an exemplary circuit 1400 to implement the external touch module 687 of the main stage 680. Mask$_{suffix:S}$ 674 is applied to $g_S$ 725 using a bitwise AND operation in gate 1410 to produce suffix$_S$ 1415, and Mask$_{suffix:L}$ 675 is applied to $g_L$ 765 using a bitwise AND operation in gate 1420 to produce suffix$_L$ 1425. suffix$_S$ 1415 and suffix$_L$ 1425 are applied to the respective "0" and "1" inputs of multiplexer 1430, and are also applied to the respective "1" and "0" inputs of multiplexer 1440. Latitude/longitude select signal 1105 is used to control outputs 1435 and 1445 of multiplexers 1430 and 1440, each of which has N/2 bits. If latitude/longitude select signal is "0," the output 1435 of multiplexer 1430 will be suffix$_S$ and the output 1445 of multiplexer 1440 will be suffix$_L$. If latitude/longitude select signal is "1," the output 1435 of multiplexer 1430 will be suffix$_L$ and the output 1445 of multiplexer 1440 will be suffix$_S$.

Mux outputs 1435 and 1445 are provided as inputs to a one-dimensional push check module 1450 and a mini-contain module 1460. Mux output 1435 is coupled to a lower input of one-dimensional push check module 1450 and an upper input of mini-contain module 1460, while mux output 1445 is coupled to an upper input of one-dimensional push check module 1450 and a lower input of mini-contain module 1460.

One-dimensional push check module 1450 receives additional inputs latitude/longitude select signal 1105 and BP($g_S$, $g_L$) 650, and generates a single-bit output 1455, according to the following pseudocode:

```
IF (BP(gS,gL)lat ˆ gL:lat = 0)
    AND (gL:lat ˆ Masksuffix:L:lat +BP(gS,gL)lat = Masksuffix:L: lat)
    AND (gS:lat ˆ Masksuffix:S:lat = BP(gS,gL)lat)
        THEN gL and gS push towards each other in Case (1)
IF (BP(gS,gL)lat ˆ gL:lat ≠ 0)
    AND (gL:lat ˆ Masksuffix:L:lat = BP(gS,gL)lat)
    AND (gS:lat ˆ Masksuffix:S:lat +BP(gS,gL)lat) = Masksuffix:S:lat)
        THEN gL and gS push towards each other in Case (2)
```

Mini-contain module 1460 receives additional inputs $g_L$:size 745 and $g_L$:size 785, and generates a single-bit output 1465. Mini-contain module 1460 is similar to contain module 685 discussed above, except that mini-contain module 1460 only operates on bits filtered to only include either longitude or latitude.

Outputs 1455 and 1465, respectively generated by one-dimensional push check module 1450 and mini-contain module 1460 are combined using a bitwise AND operation in gate 1470 to produce signal 1475, which in turn is combined with the inverse of the contain signal 550, generated by contain module 685 of main stage 680, using a bitwise AND operation in gate 1480 to produce output 570 of external touch module 687 of main stage 680.

II-H. Corner Touch Module of Main Stage

II-H-1. First Embodiment: Comparison with Constants

There are only limited cases for corner touch. After the breakpoint, the regions defined by the two geohashes push toward each other in two directions, vertical and horizontal, at same time, i.e. in the diagonal direction on grid. Thus, they must be in accordance with one of these two bit patterns:

Pattern (a):

$g_S = < \ldots > \| < 1_K \; 1_{K+1} \; 0_{K+2} \; 0_{K+3} \; 0_{K+4} \; 0_{K+5} \ldots 0_{S-2} \; 0_{S-1} > \| < \ldots >$ $g_L = < \ldots > \| < 0_K \; 0_{K+1} \; 1_{K+2} \; 1_{K+3} \; 1_{K+4} \; 1_{K+5} \; 1_{K+6} \ldots 1_{L-2} \; 0_{L-1} > \| < \ldots >$ Pattern (b):

$g_S = < \ldots > \| < 0_K \; 1_{K+1} \; 1_{K+2} \; 0_{K+3} \; 1_{K+4} \; 0_{K+5} \ldots 0_{S-2} \; 1_{S-1} > \| < \ldots >$ $g_L = < \ldots > \| < 1_K \; 0_{K+1} \; 0_{K+2} \; 1_{K+3} \; 0_{K+4} \; 1_{K+5} \; 0_{K+6} \ldots 1_{L-2} \; 0_{L-1} > \| < \ldots >$ As was described earlier for the external touch, bit values for latitude and longitude can be considered separately. For the corner touch, the condition for pushing towards should hold for both directions:

$$s_{K+2} = s_{K+4} = \ldots = \overline{s_K} \quad s_{K+3} = s_{K+5} = \ldots = \overline{s_{K+1}}$$
$$l_{K+2} = l_{K+4} = \ldots = \overline{l_K} \quad \text{AND} \quad l_{K+3} = l_{K+5} = \ldots = \overline{l_{K+1}}$$

Considering the entire geohash string$_S$ at once, there are only two particular bit patterns at the suffix strings. (a) If one of them, for example, $g_S$ has <1,1> at {K, K+1}, then it should have all zeros for the remainder of the suffix string; while the other, $g_L$, should have <0,0> at {K, K+1} and all ones afterwards. (b) If $g_S$ has <0,1> at {K, K+1} then it should keep continuing <1,0> behind K+1, and the other should have the inverse of this pattern.

By shifting left and then right to cancel prefix bits at [0,K) and invalid bits at [S or L, N), only the suffix regions are left for $g_S$ and $g_L$. Next, the valid bit string$_S$ left after shifting are checked to match to the same length of constants given, such as 11000 . . . $_{(2)}$, 001111 . . . $_{(2)}$, 011010 . . . $_{(2)}$, or 100101 . . . $_{(2)}$. If one of the cases holds, then the regions defined by the two input geohashes touch at a corner.

II-H-2. Second Embodiment: Checking All Zeros Or All Ones

If two geohash regions touch at their corner, they push toward each other in both dimensions, latitude and longitude. Thus, an illustrative embodiment can detect corner touch by adopting similar conditions from external touch for both latitude and longitude to push towards each other:

$g_L = \{l_0 \; l_1 \ldots l_{K-1}\} \| \{l_K \; l_{K+1} \ldots l_{S-2} \; l_{S-1}\} \| \{l_S \ldots l_{L-2} \; l_{L-1}\} \| \{0_L \ldots 0_{N-1}\}$ $g_S = \{s_0 \; s_1 \ldots s_{K-1}\} \| \{s_K \; s_{K+1} \ldots s_{S-2} \; s_{S-1}\} \| \{0_S \ldots 0_{L-2} \; 0_{L-1}\} \| \{0_L \ldots 0_{N-1}\}$ $l_K \neq l_{K+2} = l_{K+4} = l_{K+6} = \ldots = s_K$ $s_K \neq s_{K+2} = s_{K+4} = s_{K+6} = \ldots$ $l_{K+1} \neq l_{K+3} = l_{K+5} = l_{K+7} = \ldots = s_{K+1}$ $s_{K+1} \neq s_{K+3} = s_{K+5} = s_{K+7} = \ldots$ Therefore, these two geohashes should be in this form:

$g_L = \{\text{prefix}\} \| \{x \; y \; \overline{x} \; \overline{y} \; x \; \overline{y} \ldots \overline{x} \; \overline{y} \ldots \} \| \{0 \ldots 0\}$ $g_S = \{\text{prefix}\} \| \{\overline{x} \; \overline{y} \; x \; y \; x \; y \ldots \} \| \{0 \; 0 \ldots 0 \; 0\}$ There are only two cases depending on a bit at a breakpoint of each geohash for latitude or longitude:

| Case (A-1): | Case (B-1): |
| --- | --- |
| If a bit at a breakpoint of $g_s = 1$ ($s_K = x = 1$) | If a bit at the next to breakpoint of $g_s = 1$ ($s_{K+1} = y = 1$) |
| $s_K = 1, s_{K+2} = s_{K+4} = s_{K+6} = \ldots = 0$ | $s_{K+1} = 1, s_{K+3} = s_{K+5} = s_{K+7} = \ldots = 0$ |
| $l_K = 0, l_{K+2} = l_{K+4} = l_{K+6} = \ldots = 1 = s_K$ | $l_{K+1} = 0, l_{K+3} = l_{K+5} = l_{K+7} = \ldots = 1 = s_K$ |
| Case (A-2): | Case (B-2): |
| If a bit at a breakpoint of $g_s = 0$ ($s_K = x = 0$) | If a bit at the next to breakpoint of $g_s = 0$ ($s_{K+1} = y = 0$) |
| $s_K = 0, s_{K+2} = s_{K+4} = s_{K+6} = \ldots = 1$ | $s_{K+1} = 0, s_{K+3} = s_{K+5} = s_{K+7} = \ldots = 1$ |
| $l_K = 1, l_{K+2} = l_{K+4} = l_{K+6} = \ldots = 0 = s_K$ | $l_{K+1} = 1, l_{K+3} = l_{K+5} = l_{K+7} = \ldots = 0 = s_K$ |

Corner touch can be decided by checking if the geohash pair is in one of these cases. Using suffix masks, $g_S$ transforms to the following form:

$$g_{s0} = \{0_0 \ldots 0_{K-1}\} \| \{s_K \, s_{K+2} \, s_{K+3} \ldots s_{S-2} \, s_{S-1}\} \| \{0_S \ldots 0_{N-1}\}$$

$$g_{s1} = \{1_0 \ldots 1_{K-1}\} \| \{s_K \, s_{K+2} \, s_{K+3} \ldots s_{S-2} \, s_{S-1}\} \| \{1_S \ldots 1_{N-1}\}$$

Figure 15:
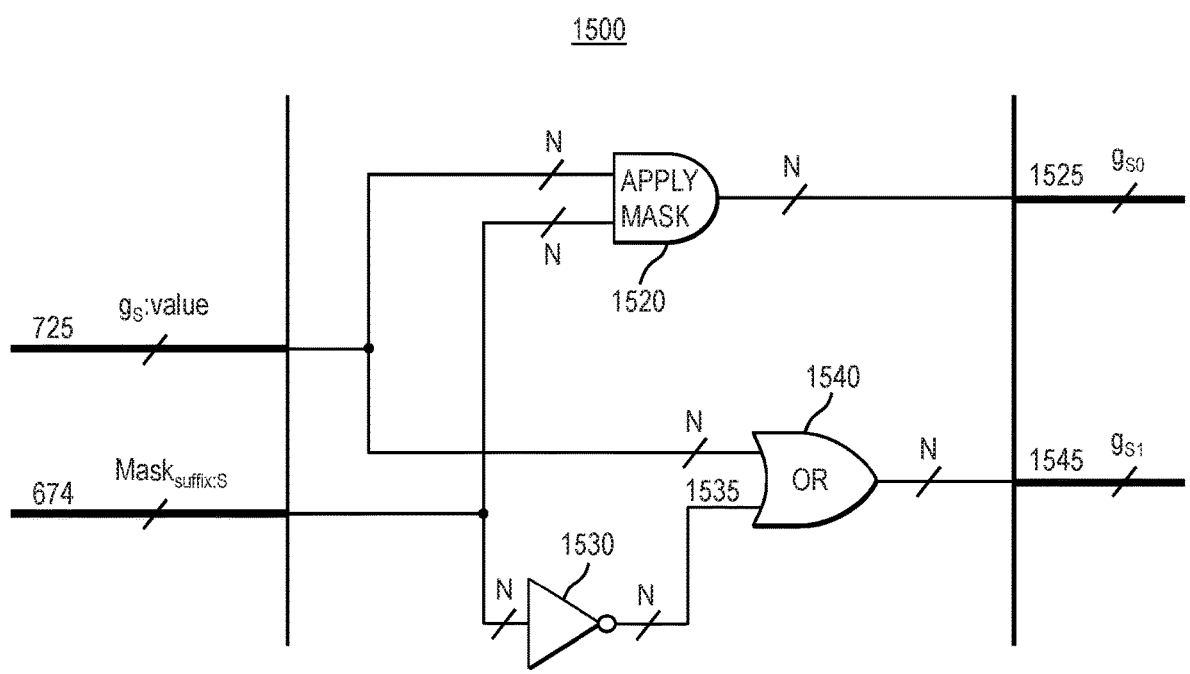

FIG. 15 is a schematic diagram of an exemplary circuit 1500 which can be used to apply a mask within an illustrative embodiment of corner touch module 688 in main stage 680. Mask$_{suffix:S}$ 674 is applied to $g_S$ 725 using a bitwise AND operation by gate 1520 producing $g_{s0}$ 1525 having the above form. Mask$_{suffix:S}$ 674 is inverted by NOT gate 1530, with the output 1535 being applied to $g_S$ 725 using a bitwise OR operation by gate 1540 producing $g_{s1}$ 1545 having the above form.

$g_S$ is then split into a set of latitude only and longitude only data. Note that in case (A-1) presented above, inverting one $s_K$ bit makes all zeros in $g_{s0:lat}$.

$$g_{s0:lat} = \{0 \ldots 0\} \| \{s_K \, s_{K+2} \, s_{K+4} \, s_{K+6} \ldots\} \| \{0 \ldots 0\}$$

$$g_{s0:long} = \{0 \ldots 0\} \| \{s_K \, s_{K+3} \, s_{K+5} \, s_{K+7} \ldots\} \| \{0 \ldots 0\}$$

Figure 16:
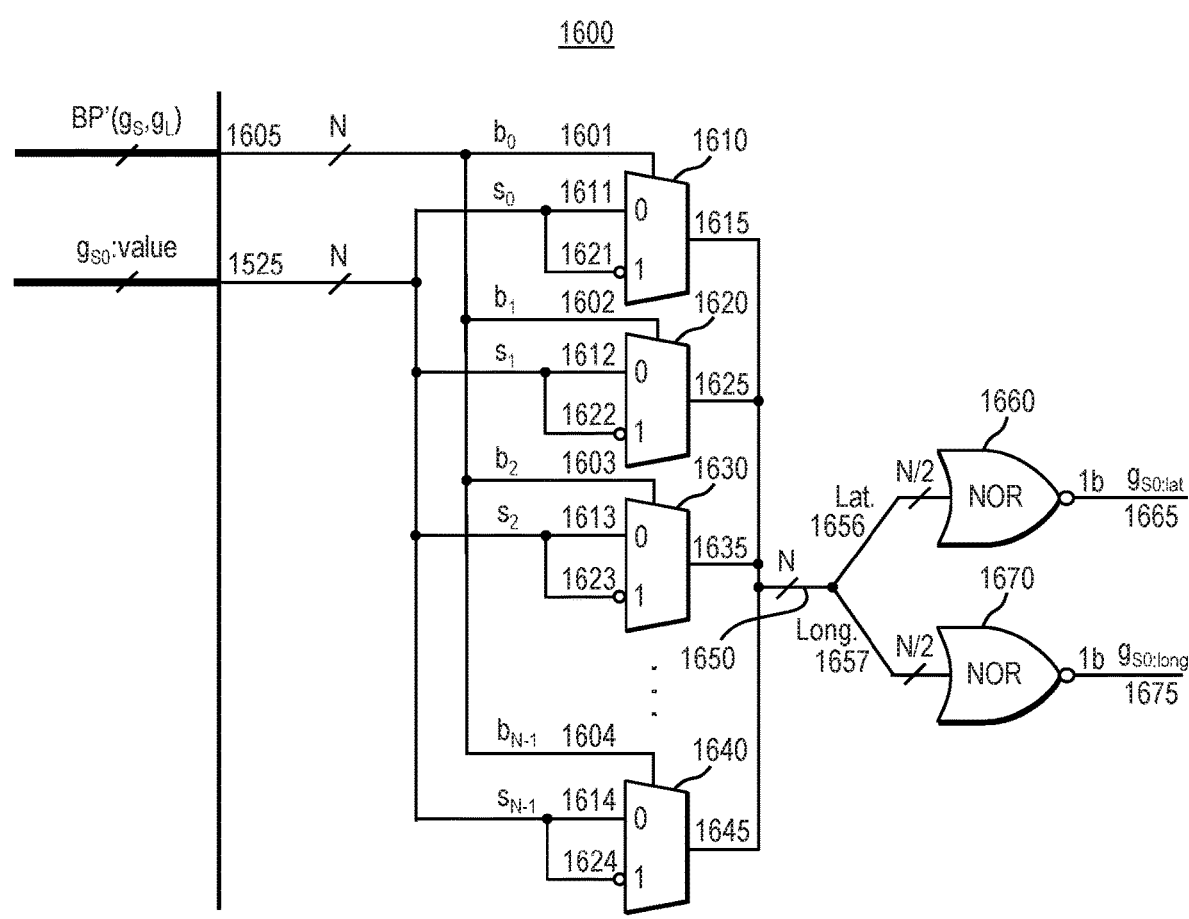

FIG. 16 is a schematic diagram of an exemplary circuit 1600 which can be used to perform a zeros check operation within an illustrative embodiment of corner touch module 688 in main stage 680. BP'($g_S,g_L$) 1605 is generated from BP($g_S,g_L$) 650 by shifting one bit to right and performing a bitwise OR:

$$BP(g_S,g_L) = \{0 \ldots 0\} \| \{1_K \, 0 \, 0 \, 0 \ldots\} \| \{0 \ldots 0\}$$

$$BP'(g_S,g_L) = \{0 \ldots 0\} \| \{1_K \, 1_{K+1} \, 0 \, 0 \, 0 \ldots\} \| \{0 \ldots 0\}$$

Each bit of BP'($g_S,g_L$) 1605 (e.g., $b_0$ 1601) is used to switch a multiplexer (e.g., 1610) having a corresponding bit of $g_{s0}$ 1525 (e.g., $s_0$ 1611) coupled to a 0 input and the inverse of that bit of $g_{s0}$ 1525 (e.g., $s'_0$ 1621) coupled to a 1 input. Thus, when a kth bit, $b_k$, in BP'($g_S,g_L$) 1605 is 0, a multiplexer (e.g., 1610) just returns $S_k$ (e.g., 1611) as output (e.g., 1615), while an active 1 as a kth bit in BP'($g_S,g_L$) 1605 causes $S_k$ to be inverted and returns $S'_k$ (e.g., 1621) as output (e.g., 1615). The multiplexer outputs (e.g., 1615-1645) are rejoined to form signal 1650. Signal 1650 is then split into latitude 1656 and longitude 1657, each of which is coupled to a respective NOR gate 1660, 1670 to form a corresponding output 1665, 1675. Output 1665 will be 1 if $\overline{s_K = s_{K+2} = s_{K+4}} = \ldots = 0$ and otherwise it will be 0. Likewise, output 1675 will be 1 if $\overline{s_{K+1} = s_{K+3} = s_{K+5}} = \ldots = 0$ and otherwise it will be 0.

It is similar for $g_L$, but with ones instead of zeroes:

$$g_{L0} = \{0_0 \ldots 0_{K-1}\} \| \{l_K \, l_{K+2} \, l_{K+3} \ldots l_{L-2} \, l_{L-1}\} \| \{0_L \ldots 0_{N-1}\}$$

$$g_{L1} = \{1_0 \ldots 1_{K-1}\} \| \{l_K \, l_{K+2} \, l_{K+3} \ldots l_{L-2} \, l_{L-1}\} \| \{1_L \ldots 1_{N-1}\}$$

From $g_{L1}$ above, taking only latitude makes the form below such that inverting one $l_K$ bit causes $g_{L1:lat}$ to have all ones:

$$g_{L1:lat} = \{1 \ldots 1\} \| \{l_K \, l_{K+2} \, l_{K+4} \, l_{K+6} \ldots\} \| \{1 \ldots 1\}$$

$$g_{L1:long} = \{1 \ldots 1\} \| \{l_{K+1} \, l_{K+3} \, l_{K+5} \, l_{K+7} \ldots\} \| \{1 \ldots 1\}$$

Figure 17:
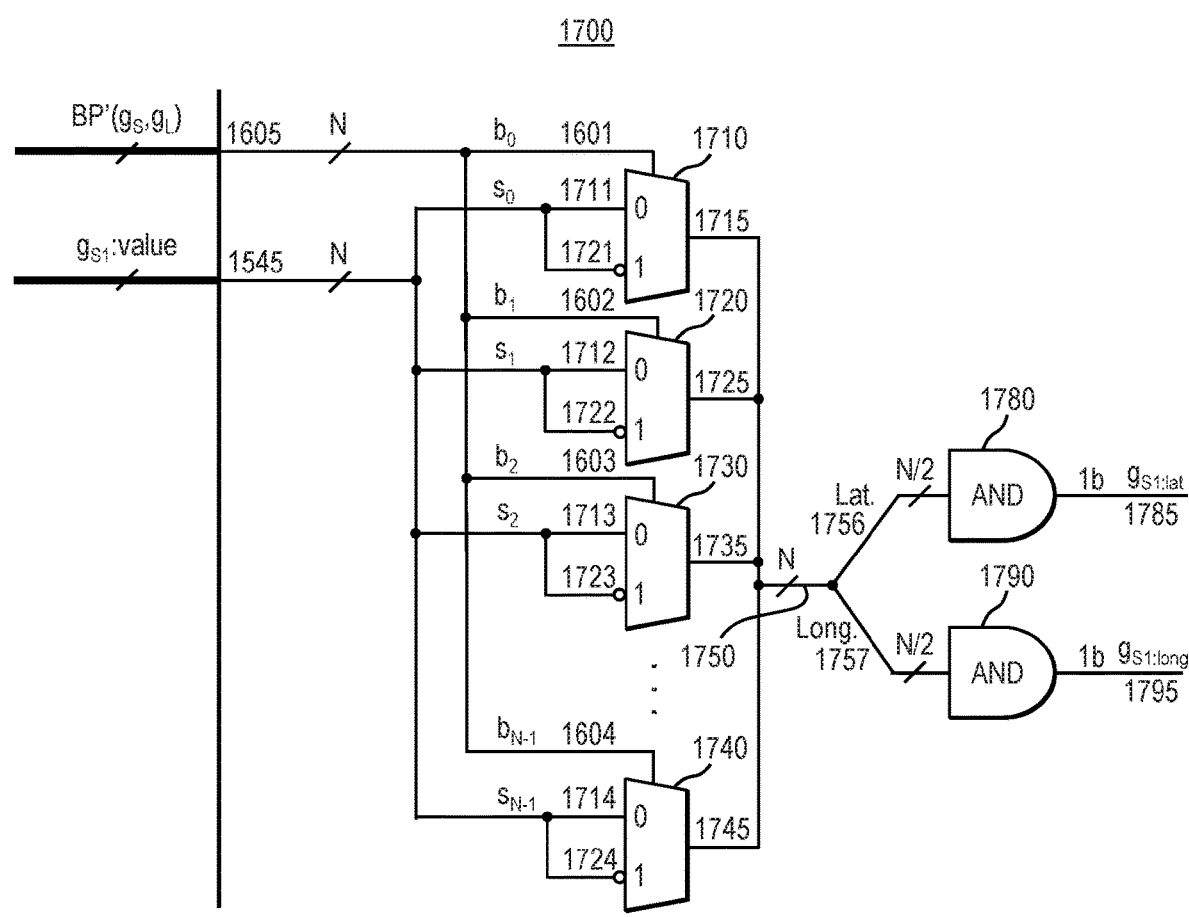

FIG. 17 is a schematic diagram of an exemplary circuit 1700 which can be used to perform a ones check operation within an illustrative embodiment of corner touch module 688 in main stage 680. Each bit of BP'($g_S,g_L$) 1605 (e.g., $b_0$ 1601) is used to switch a multiplexer (e.g., 1710) having a corresponding bit of gsi 1545 (e.g., so 1711) coupled to a 0 input and the inverse of that bit of $g_{S1}$ 1545 (e.g., $s'_0$ 1721) coupled to a 1 input. Thus, when a kth bit, $b_k$, in BP'($g_S,g_L$) 1605 is 0, a multiplexer (e.g., 1710) just returns $S_k$ (e.g., 1711) as output (e.g., 1715), while an active 1 as a kth bit in BP'($g_S,g_L$) 1605 causes $S_k$ to be inverted and returns $S'_k$ (e.g., 1721) as output (e.g., 1715). The multiplexer outputs (e.g., 1715-1745) are rejoined to form signal 1750. Signal 1750 is then split into latitude 1756 and longitude 1757, each of which is coupled to a respective AND gate 1780, 1790 to form a corresponding output 1785, 1795. Output 1765 will be 1 if $\overline{s_K = s_{K+2} = s_{K+4}} = \ldots = 1$ and otherwise it will be 0. Likewise, output 1775 will be 1 if $\overline{s_{K+1} = s_{K+3} = s_{K+5}} = \ldots = 1$ and otherwise it will be 0.

Figure 18:
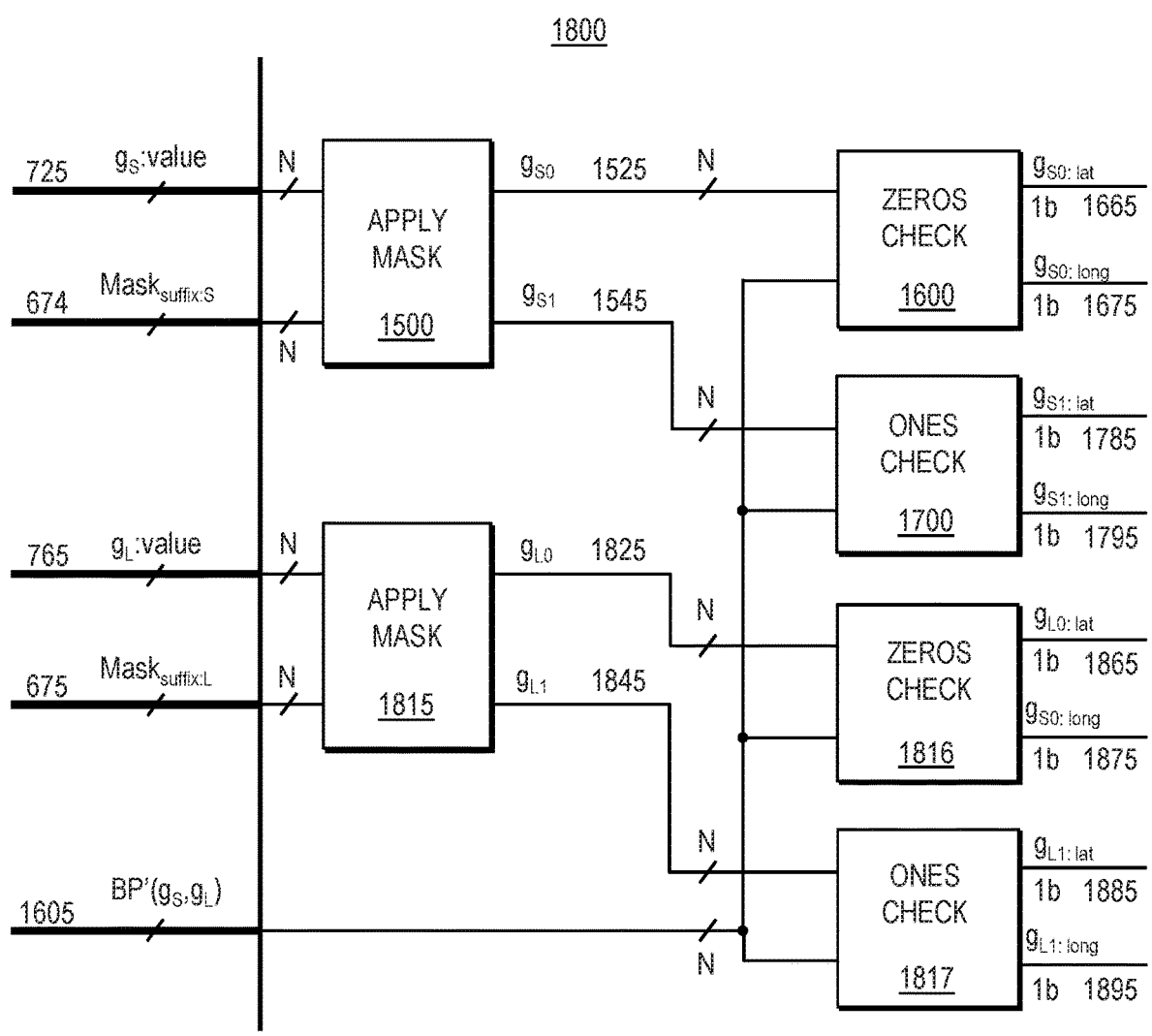

Combining Case$_{(A-1)}$, Case$_{(A-2)}$, Case$_{(B-1)}$, and Case$_{(B-2)}$ results in a corner touch:

( Case$_{(A-1)}$ or Case$_{(A-2)}$ ) and ( Case$_{(B-1)}$ or Case$_{(B-2)}$ ) = corner touch
IF (($g_{S0:lat}$ and $g_{L1:lat}$) or ($g_{S1:lat}$ and $g_{L0:lat}$)) and
(($g_{S0:long}$ and $g_{L1:long}$) or ($g_{S1:long}$ and $g_{L0:long}$))
THEN $g_S$ and $g_L$ touch each other in the corner
ELSE $g_S$ and $g_L$ do not touch each other in the corner FIG. 18 is a schematic diagram of an exemplary circuit 1800 which can be used to implement an illustrative embodiment of corner touch module 688 in main stage 680. Mask$_{suffix\,S}$ 674 is applied to $g_S$ 725 by apply mask module 1500, as shown in FIG. 15 and discussed above with reference thereto, to produce $g_{s0}$ 1525 and $g_{s1}$ 1545. $g_{s0}$ 1525 is coupled to a zeros check module 1600, as shown in FIG. 16 and discussed above with reference thereto, and $g_{s1}$ 1545 is coupled to a ones check module 1700, as shown in FIG. 17 and discussed above with reference thereto. BP'($g_S,g_L$) 1605 is also coupled to modules 1600 and 1700. Zeros check module 1600 produces outputs 1665 and 1675, and ones check module 1700 produces outputs 1785 and 1795.

Mask$_{suffix:L}$ 675 is applied to $g_L$ 765 by apply mask module 1815. Apply mask module 1815 is structurally and functionally similar to module 1500, but is coupled to different inputs and therefore produces different outputs. Specifically, apply mask module produces $g_{L0}$ 1825, which is coupled to a zeros check module 1816, and gLi 1845, which is coupled to a ones check module 1817. Zeros check module 1816 and ones check module 1817 are structurally and functionally similar to modules 1600 and 1700, respectively, but are coupled to different outputs and therefore different outputs. However, BP'($g_S$,$g_L$) 1605 is coupled to modules 1816 and 1817 as well as 1600 and 1700. Zeros check module 1816 produces outputs 1865 and 1875, and ones check module produces outputs 1885 and 1895.

III. Software for Calculating Geospatial Primitives and Predicates

III-A. Overview of Software Implementation

A naive software implementation would be bit-serial, in that the input geohashes would be processed bit by bit. While hardware approaches can process all geohash bits in parallel using custom circuitry as discussed above, doing so in software would prove to be inefficient and slow. Embodiments of the present invention provide methods to evaluate spatial primitives on geohash pairs while processing all geohash input bits in parallel, thereby avoiding the serial bottleneck. The spatial primitives are contain, and touch (internal, external, corner).

In order to achieve the most performance benefits, each developed routine frequently makes use of vector-wide bit level operations, namely shift left/right, AND, OR, and XOR. The general function flow comprises (1) restructuring data for the following steps (2) generating bit masks (3) processing the restructured data using the generated masks to check for certain conditions (depending on the spatial primitive). The actual order of the aforementioned steps may be different depending on the spatial primitive at hand, and/or may have more stages.

The input to the spatial primitive evaluation functions is a pair of geohashes ($g_A$ and $g_B$), each of which represented using an N-bit vector, alongside respective actual geohash sizes (A and B). A first step (corresponding to preprocessing stage 620 in the hardware implementation) is to identify which of the geohashes is the shorter one ($g_S$), and conversely the longer one ($g_L$). This may be achieved using the following algorithm:

```
if (A > B) {
    g_S = g_B ;
    S = B ;
    g_L = g_A ;
    L = A ;
} else {
    g_S = g_A ;
    S = A ;
    g_L = g_B ;
    L = B ;
}
```

III-B. Contain Function

When given inputs of a shorter and longer geohashes and their sizes, $g_S$, $g_L$, S, and L, func_contain returns true if $g_S$ contains $g_L$, otherwise false. Exemplary pseudocode follows:

```
//// Contain operation
//  Input   : g_S and S (a N-bits shorter geohash and its length)
//          : g_L and L (a N-bits longer geohash and its length)
//  Output  : 1-bit contain signal
  0: bit func_contain(g_S, g_L, S, L){
  1:
  2:     // generate mask
  3:     mask = Shift left N-bit of ones by ( N – S );
  4:
  5:     // apply XOR g_S and g_L and bit-mask it to leave only prefix
  6:     g_S xor g_L = xor(g_S,g_L) & mask;
  7:
  8:     // if a prefix part of XOR is all zeros
  9:     if (g_S xor g_L == 0)
 10:         return true
 11:     else
 12:         return false
 13:
 14: }
```

In line 3, func_contain generates a mask by left-shifting a constant of N-bits of ones by N–S, as shown in FIG. 24. For example, when N is 64, with long, long unsigned, int, or uint64_t bit precision, the constant of 64-bits ones is 0xFFFFFFFFFFFFFFFF in hexadecimal.

After left shifting in line 3, the result will be a binary number as follows:

$$\text{Mask}_{short} = \{1_0\ 1_1 \ldots 1_{K-2}\ 1_{K-1}\}\|\{1_K\ 1_{K+1} \ldots 1_{S-2}\ 1_{S-1}\}\|\{0_S \ldots 0_{L-2}\ 0_{L-1}\}\|\{0_L \ldots 0_{N-1}\}$$

Software programming supports basic bit level logic operations, such as AND, OR, and XOR. So line 6 of func_contain applies XOR to $g_S$ and $g_L$ and then performs an AND operation with Maskshort, applying a bitmask to isolate the prefix:

$$(g_L \oplus g_S)\hat{}\text{Mask}_{short} = \{l_0 \oplus s_0 \ldots l_{S-1} \oplus s_{S-1}\}\|\{0_S \ldots 0_{L-1}\}\|\{0_L \ldots 0_{N-1}\}$$

As shown in lines 9-12, if this result is all zeroes, then func_contain returns true meaning $g_S$ contains $g_L$, otherwise func_contain returns false meaning $g_S$ does not contain $g_L$.

III-C. Touch Internal Function

Exemplary pseudocode for a software implementation of touch internal follows:

```
//// touch internal
//  Input   : g_S and S (a N-bits shorter geohash and its length)
//          : g_L and L (a N-bits longer geohash and its length)
//  Output  : 1-bit touch_in signal
  0: bit func_touch_in(g_S, g_L, S, L){
  1:
  2:     // check contain first
  3:     contain = func_contain(g_S, g_L, S, L)
  4:
  5:     // if it contains
  6:     if ( contain ){
  7:
  8:         // generate masks
  9:         mask_short = Shift left N-bit of ones by ( N – S );
 10:         mask_suffix:T:lat = Shift left N-bit of 0101's by ( N – L )
                                 & ~ mask_short;
 11:         mask_suffix:T:lon = Shift left N-bit of 1010's by ( N – L )
                                 & ~ mask_short;
 12:
 13:         // check lat/long bits of g_L using mask_suffix:T
 14:         if ( g_L & mask_suffix:T:lat == mask_suffix:T:lat ) or
                ( g_L & mask_suffix:T:lat == 0 ) or
 15:            ( g_L & mask_suffix:T:lon == mask_suffix:T:lon ) or
                ( g_L & mask_suffix:T:lon == 0 )
 16:             return true;
 17:     }
 18:     return false;
 19: }
```

All three touch operations use the result of func_contain result. Internal touch can only exist where $g_S$ contains $g_L$, while external touch and corner touch can only exist where $g_S$ does not contain $g_L$. More particularly, external touch and corner touch require that $g_S$ and $g_L$ do not overlap except at an edge or a corner. Thus, func_touch_in checks the result of func_contain in line 3, and only proceeds with additional processing if contain is true in line 6. If contain is false in line 6, then func_touch_in merely returns false in line 18.

When contain is true for two geohashes in line 6, lines 8-11 generate necessary masks $mask_{short}$, $mask_{suffix:T:lat}$, $mask_{suffix:T:lon}$ using shift operations. (This functionality is similar to that discussed above with reference to mask generation stage 660 of the hardware implementation.) To handle latitude bits and longitude bits separately, lines 10 and 11 use two constants of interleaving ones and zeros in a different order. For longitude bits, the constant starts with one(1) then zero(0), and for latitudes, the constant starts with zero(0) then one(1):

$Constant_{long} = \{1_0\ 0_1\ 1_2\ 0_3\ \ldots\ 1_{i-2}\ 0_{i-1}\ 1_i\ 0_{L+1}\ \ldots\}$ $Constant_{lat} = \{0_0\ 1_1\ 0_2\ 1_3\ \ldots\ 0_{i-2}\ 1_{i-1}\ 0_i\ 1_{L+1}\ \ldots\}$ Moreover, touch operations are relations of suffixes, so the inverse mask of $mask_{short}$ is applied in lines 10-11 to isolate the suffix region of the geohash codes. As shown in lines 14-15, to check if all latitude or longitude bits are ones, func_touch_in compares $g_L$ & $mask_{suffix:T:lat(or\ lon)}$ with the $mask_{suffix:lat}$. To check for all zero bits on latitude or longitude, func_touch_in compares $g_L$ & $mask_{suffix:lat(or\ lon)}$ with one or more zeros(0).

III-D. Touch External Function

III-D-1. Overview of Touch External Function

The fundamental concepts used by a software algorithm for touch external operation are similar to those discussed above with reference to a hardware implementation. When the breakpoint K is a latitude value:

$g_{L:lat} = \{prefix\} \| \{l_K\ l_{K+2}\ l_{K+4}\ \ldots\} \| \{0_L\ \ldots\ 0_{N-1}\}$ $g_{S:lat} = \{prefix\} \| \{s_K\ s_{K+2}\ s_{K+4}\ \ldots\} \| \{0_L\ \ldots\ 0_{N-1}\}$ $g_{L:long} = \{prefix\} \| \{l_{K+1}\ l_{K+3}\ l_{K+5}\ \ldots\ l_{S-1}\ l_S\ \ldots\} \| \{0_L\ \ldots\ 0_{N-1}\}$ $g_{S:long} = \{prefix\} \| \{s_{K+1}\ s_{K+3}\ s_{K+5}\ \ldots\ s_{S-1}\} \| \{0_L\ \ldots\ 0_{N-1}\}$ The latitude values should therefore be either:

| Case (1) | OR | Case (2) |
|---|---|---|
| $s_K = 1, s_{K+2} = s_{K+4} = s_{K+6} = \ldots = 0$ | | $s_K = 0, s_{K+2} = s_{K+4} = s_{K+6} = \ldots = 1$ |
| $l_K = 0, l_{K+2} = l_{K+4} = l_{K+6} = \ldots = 1$ | | $l_K = 1, l_{K+2} = l_{K+4} = l_{K+6} = \ldots = 0$ |

At the same time, the longitude of $g_S$ should a prefix of $g_L$, such as containing:

$s_{K+1} = l_{K+1}, s_{K+3} = l_{K+3}, s_{K+5} = l_{K+5}, \ldots\ s_{i<S} = l_{i<S}.$ (for all i=K+2m+1<S, such as m is a positive integer)

Exemplary pseudocode for a software implementation of touch external follows:

```
//// touch external
//  Input  : g_S and S (a N-bits shorter geohash and its length)
//         : g_L and L (a N-bits longer geohash and its length)
//  Output : 1-bit touch_ex signal
 0: bit func_touch_ex(g_S, g_L, S, L){
 1:
 2:     // check contain first
 3:     contain = func_contain(g_S, g_L, S, L)
 4:
 5:     // if it contains
 6:     if ( NOT contain ){
 7:
 8:         // XOR g_S and g_L
 9:         g_S xorg_L = xor(g_S, g_L);
10:
11:         // find the breakpoint K, e.g., breakpoint =
              { 0 ... 0 1_K 0 ... 0 }
12:         (K, breakpoint) = func_find_breakpoint(g_S xorg_L);
13:
14:         // generate masks
15:         mask_prefix = Shift left N-bit of ones by ( N - K );
16:         mask_short = Shift left N-bit of ones by ( N - S );
17:         mask_suffix:S = Shift left N-bit of ones by ( N - S )
                            & ~ mask_prefix;
18:         mask_suffix:T = Shift left N-bit of ones by ( N - L )
                            & ~ mask_short;
19:
20:         if (the breakpoint at longitude) // e.g. K is even
21:             sel_latlong = N-bit of 0101's;
22:         if (the breakpoint at latitude) // e.g. K is odd
23:             sel_latlong = N-bit of 1010's;
24:
25:         //
26:         if ( xorcheck( ) ) and ( case1( ) or case2( ) )
27:             return true;
28:     }
29:     return false;
30: }
```

As previously noted, external touch can only exist where $g_S$ does not contain $g_L$. Thus, func_touch_ex checks the result of func_contain in line 3, and only proceeds with additional processing if contain is false in line 6. If contain is true in line 6, then func_touch_ex merely returns false in line 29.

The result of bit-wised xor($g_S$, $g_L$) (or $g_L \oplus g_S$) performed in line 9 has its first one(1) bit at the breakpoint K. The function func_find_breakpoint called in line 12 is analogous to the breakpoint identification stage 640 in the hardware implementation discussed above. Specifically, func_find_breakpoint finds the first nonzero position, leading zeros, from xor($g_S$, $g_L$), and returns two outputs, K and BP($g_S$, $g_L$), breakpoint. This function can be implemented in different ways, with one example being:

```
//// example codes of
//  (K, breakpoint) = func_find_breakpoint(g_S xorg_L)
 0: K = __builtin_clzl(g_S xorg_L)
 1: breakpoint = 0x8000000000000000 >> K;
```

Note that _builtin_clzl( ) is a gcc (GNU C Compiler) built-in function that potentially makes use of processor assembly instructions. The purpose of _builtin_clzl( ) is to count the leading zeros in a bit vector. This example assumes N is 64, and the breakpoint is thus generated by left-shifting a 64 bit hexadecimal constant number 0x8000000000000000 by K, which is 10000000 . . . $_{(2)}$ in binary numbering system.

Next, using N, S and K, func_touch_ext at lines 14-18 generates multiple masks needed. Then, depending on whether the breakpoint K is located at latitude or longitude, func_touch_ex at lines 20-23 generates a constant select$_{latlong}$. Using these masks and input variables provided thereto, func_touch_ex at line 26 checks three binary results returned by each of three functions: xorcheck, case1 and case2. When xorcheck is true and either case1 or case2 is also true, then func_touch_ex returns true at line 27. Otherwise, func_touch_ex returns false at line 27.

III-D-2. XORCheck Function

The function xorcheck is analogous similar to the XOR check module 1100 previously described with reference to FIG. 11. Specifically, xorcheck checks if xor($g_L,g_S$) have a pattern of {1 0 1 0} at the range between K and S−1:

$$g_L \oplus g_S = \{l_0 \oplus s_0 \ldots l_{K-1} \oplus s_{K-1}\} \| \{l_K \oplus s_k \ldots l_{S-1} \oplus s_{S-1}\} \| \{l_s 0_s \ldots l_{L-1} \oplus 0_{L-1}\} \| \{0_L \ldots 0_{N-1}\}$$

When XORing $g_S$ and $g_L$, a prefix region by K−1 is all zero, and all latitude values at {K, K+2, K+4, . . . } are ones, all longitude values at {K+1, K+3, K+5, . . . } are zeros, and {1$_S$, . . . 1$_{L-1}$} remain at the backend:

$$g_L \oplus g_S = \{0_0 \ldots 0_{K-1}\} \| \{1_K 0_{K+1} 1_{K+2} 0_{K+3} \ldots 1(0)_{S-1}\} \| \{l_S \ldots l_{L-1}\} \| \{0_L \ldots 0_{N-1}\}$$

Here, xor($g_L,g_S$) must have a pattern of {1 0 1 0} at the range between K and S−1. By masking xor($g_L,g_S$) using mask$_{suffix:S}$, the aforementioned range is isolated.

Exemplary pseudocode for a software implementation of xorcheck follows:

```
//// xorcheck
// Input   : g_S and g_L (a N-bits shorter and longer geohash)
//         : mask_{suffix:S}, sel_{latlong}
// Output  : 1-bit xorcheck signal
  0: bit xorcheck(g_S, g_L, mask_{suffix:S}, sel_{latlong}){
  1:
  2:    xor_{suffix:S} = xor(g_S, g_L) & mask_{suffix:S};
  3:    sel_{latlong:suffix:S} = sel_{latlong} & mask_{suffix:S};
  4:
  5:    if ( xor_{suffix:S} == sel_{latlong:suffix:S} )
  6:        return true;
  7:    else
  8:        return false;
  9: }
```

III-D-3. Case1 and Case2 Functions

The function case1 and case2 respectively correspond to the cases below:

| Case (1) | OR | Case (2) |
|---|---|---|
| $s_K = 1, s_{K+2} = s_{K+4} = s_{K+6} = \ldots = 0$ | | $s_K = 0, s_{K+2} = s_{K+4} = s_{K+6} = \ldots = 1$ |
| $l_K = 0, l_{K+2} = l_{K+4} = l_{K+6} = \ldots = 1$ | | $l_K = 1, l_{K+2} = l_{K+4} = l_{K+6} = \ldots = 0$ |

Exemplary pseudocode for a software implementation of case1 follows:

```
//// case1
// Input   : g_S and g_L (a N-bits shorter and longer geohash)
//         : breakpoint, mask_{suffix:T}, sel_{latlong}
```

```
// Output  : 1-bit case1 signal
  0: bit case1(g_S, g_L, breakpoint, mask_{suffix:T}, sel_{latlong}){
  1:
  2:    xorg_S = xor(g_S, g_L) & g_S;
  3:    xorg_L = xor(g_S, g_L) & g_L;
  4:    sel_{latlong:suffix:T} = sel_{latlong} & mask_{suffix:T};
  5:
  6:    if ( xorg_L == breakpoint ) & ( xorg_S &
        sel_{latlong:suffix:T} == sel_{latlong:suffix:T} )
  7:        return true;
  8:    else
  9:        return false;
 10: }
```

The first portion of line 6 of case1 checks if the lower bits of xor($g_L,g_S$)&$g_L$ is same as the breakpoint, which means $s_K=1$ and the rest of bits from $s_{K+2}$ are zeros:

$$(g_L \oplus g_S)^\wedge g_S =$$
$$\{0_0 \ldots 0_{K-1}\} \| \{1_K\ 0_{K+1}\ 1_{K+2}\ 0_{K+3}\ \ldots\} \| \{l_S \ldots l_{L-1}\} \| \{0_L \ldots 0_{N-1}\} =$$
$$\{0_0 \ldots 0_{K-1}\} \| \{1_K{}^\wedge s_K\ 0_{K+1}{}^\wedge s_{K+1}\ 1_{K+2}{}^\wedge s_{K+2}\ 0_{K+3}{}^\wedge s_{K+3}\ \ldots\}$$
$$\| \{l_S{}^\wedge 0_S \ldots l_{L-1}{}^\wedge 0_{L-1}\} \| \{0_L \ldots 0_{N-1}\} =$$
$$\{0_0 \ldots 0_{K-1}\} \| \{s_K\ 0_{K+1}\ s_{K+2}\ 0_{K+3}\ \ldots\} \| \{0_S \ldots 0_{L-1}\} \| \{0_L \ldots 0_{N-1}\}$$

The second portion of line 6 of case1 checks whether the remaining suffix of the longer geohash beyond S is still at the edge.

Exemplary pseudocode for a software implementation of case2 follows:

```
//// case2
// Input   : g_S and g_L (a N-bits shorter and longer geohash)
//         : breakpoint, mask_{short}, mask_{suffix:S}, mask_{suffix:T}, sel_{latlong}
// Output  : 1-bit case2 signal
  0: bit case2(g_S, g_L, breakpoint, mask_{short},
      mask_{suffix:S}, mask_{suffix:T}, sel_{latlong}){
  1:
  2:    xorg_L = xor(g_S, g_L) & g_L;
  3:    sel_{latlong:suffix:T} = sel_{latlong} & mask_{suffix:T};
  4:
  5:    xorg_{L:suffix:C} = xorg_L & mask_{short};
  6:    xorg_{L:suffix:T} = xorg_L & sel_{latlong:suffix:T};
  7:
  8:    if ( xorg_{L:suffix:C} + xorg_{L:suffix:T} == breakpoint )
  9:        return true;
 10:    else
 11:        return false;
 12: }
```

Lines 5-8 of case2 generates (xor($g_L,g_S$)&$g_L$)$_{C+T}$ as discussed above with reference to FIG. 12. First, case2 at line 2 performs an AND operation on xor($g_L,g_S$) and $g_L$:

$$\text{xor}(g_L,g_S)\&g_L = \{0_0 \ldots 0_{K-1}\} \| \{1_K\ 0_{K+1}\ 1_{K+2}\ 0_{K+3} \ldots\} \| \{l_S\ l_{S+1}\ l_{S+2}\ l_{S+3} \ldots l_{L-1}\} \| \{0_L \ldots 0_{N-1}\}$$

Using an mask$_{suffix:T}$ and the sel$_{latlong}$, line 3 of case2 makes a latitude/longitude version of masksuffix$_{suffix:T}$, sel$_{latlong:suffix:T}$. At lines 5-6 of case2, sel$_{latlong:suffix:T}$ and mask$_{short}$ are applied to xor($g_L$,$g_S$)&$g_L$ to generate (xor($g_L$, $g_S$)&$g_L$)$_C$ and (xor($g_L$,$g_S$)&$g_L$)T):

(xor($g_L$,$g_S$)&$g_C$)$_C$={$0_0 \ldots 0_{K-1}$}||{$l_K\ 0_{K+1}\ l_{K+2}$ $0_{K+3} \ldots$ }||{$0_S\ 0_{S+1}\ 0_{S+2}\ 0_{S+3} \ldots 0_{L-1}$}||{$0_L \ldots 0_{N-1}$}

(xor($g_L$,$g_S$)&$g_C$)$_T$={$0_0 \ldots 0_{K-1}$}||{$0_K\ 0_{K+1}\ 0_{K+2}$ $0_{K+3} \ldots$ }||{$l_S\ 0_{S+1}\ l_{S+2}\ 0_{S+3} \ldots 0_{L-1}$}||{$0_L \ldots 0_{N-1}$}

Adding these two variables at line 8 of case2 generates (xor($g_L$,$g_S$)&$g_L$)$_{C+T}$, which only remains valid values of {$1_K$, $1_{K+2}$, $1_{K+4}$, ...}:

(xor($g_L$,$g_S$)&$g_C$)$_{C+T}$={$0_0 \ldots 0_{K-1}$}||{$l_K\ 0_{K+1}\ l_{K+2}$ $0_{K+3} \ldots$ }||{$l_S\ 0_{S+1}\ l_{S+2}\ 0_{S+3} \ldots 0_{L-1}$}||{$0_L \ldots 0_{N-1}$}

Thus, case2 returns true at line 9 only if this value is the same as breakpoint, otherwise case2 returns false at line 11.

III-E. Corner Touch Function

Exemplary pseudocode for a software implementation of corner touch follows:

```
//// touch corner
// Input   : g_S and S (a N-bits shorter geohash and its length)
//         : g_L and L (a N-bits longer geohash and its length)
// Output : 1-bit touch_corner signal
 0: bit func_touch_corner(g_S, g_L, S, L){
 1:
 2:   // check contain first
 3:   contain = func_contain(g_S, g_L, S, L)
 4:
 5:   // if it contains
 6:   if ( NOT contain ){
 7:
 8:     // find the breakpoint K, e.g., breakpoint = { 0 ... 0 1_K 0 ... 0 }
 9:     ( K, breakpoint ) = func_find_breakpoint(g,xorg_L);
10:
11:     // four possible cases
12:     const __00111111...
13:     const __11000000...
14:     const __01101010...
15:     const __10010101...
16:
17:     // cut four possible cases into the length of interest
18:     ( __001111_{new:S}, __001111_{new:L} ) = cut_interest(const __00111111..., S, L, K);
19:     ( __110000_{new:S}, __110000_{new:L} ) = cut_interest(const __11000000..., S, L, K);
20:     ( __011010_{new:S}, __011010_{new:L} ) = cut_interest(const __01101010..., S, L, K);
21:     ( __100101_{new:S}, __100101_{new:L} ) = cut_interest(const __10010101..., S, L, K);
22:
23:     // cut prefix out from geohashes into the length of interest
24:     g_{S:new} = cut_prefix(g_S);
25:     g_{L:new} = cut_prefix(g_L);
26:
27:     // check if they match
28:     if ((g_{S:new} == __001111_{new:S}) AND (g_{L:new} == __001111_{new:L})) or
29:        ((g_{S:new} == __110000_{new:S}) AND (g_{L:new} == __110000_{new:L})) or
30:        ((g_{S:new} == __011010_{new:S}) AND (g_{L:new} == __011010_{new:L})) or
31:        ((g_{S:new} == __100101_{new:S}) AND (g_{L:new} == __100101_{new:L}))
32:       return true;
33:   }
34:   return false;
35: }
```

Like func_touch_ex, func_touch_corner first checks func_contain at line 3 and performs further processing only if it returns false at line 6. If func_contain returns true, func_touch_corner immediately returns false at line 34.

For func_touch_corner to be true, there are only four possible cases for $g_S$ and $g_L$ pair. These geohashes can have different lengths, but their bit patterns are strictly fixed:

$g_L$={$l_0\ l_1 \ldots l_{K-1}$}||{$l_K\ l_{K+1} \ldots l_{S-2}\ l_{S-1}$}||{$l_S \ldots l_{L-2}\ l_{L-1}$}||{$0_L \ldots 0_{N-1}$}

$g_S$={$s_0\ s_1 \ldots s_{K-1}$}||{$s_K\ s_{K+1} \ldots s_{S-2}\ s_{S-1}$}||{$0_S \ldots 0_{L-2}\ 0_{L-1}$}||{$0_L \ldots 0_{N-1}$}

$l_K \neq l_{K+2} = l_{K+4} = l_{K+6} = \ldots = s_K$ $s_K \neq s_{K+2} = s_{K+4} = s_{K+6} = \ldots$ $l_K \neq l_{K+3} = l_{K+5} = l_{K+7} = \ldots = s_{K+1}$ $s_{K+1} \neq s_{K+3} = l_{K+5} = l_{K+7} = \ldots$ Therefore, these two geohashes should be in the form:

$$g_L = \{\text{prefix}\} \| \{x\, y\, \bar{x}\, \bar{y}\, \bar{x}\, \bar{y} \ldots \bar{x}\, \bar{y} \ldots \} \| \{0 \ldots 0\}$$

$$g_S = \{\text{prefix}\} \| \{\bar{x}\, \bar{y}\, x\, y\, x\, y \ldots \} \| \{0\, 0 \ldots 0\, 0\}$$

There are only two cases depending on a bit at a breakpoint of each geohash for latitude or longitude:

Case (A-1):
If a bit at a breakpoint of $g_s = 1$ ($s_K = x = 1$)
$s_K = 1, s_{K+2} = s_{K+4} = s_{K+6} = \ldots = 0$
$l_K = 0, l_{K+2} = l_{K+4} = l_{K+6} = \ldots = 1 = s_K$
Case (A-2):
If a bit at a breakpoint of $g_s = 0$ ($s_K = x = 0$)
$s_K = 0, s_{K+2} = s_{K+4} = s_{K+6} = \ldots = 1$
$l_K = 1, l_{K+2} = l_{K+4} = l_{K+6} = \ldots = 0 = s_K$ Case (B-1):
If a bit at the next to breakpoint of $g_s = 1$ ($s_{K+1} = y = 1$)
$s_{K+1} = 1, s_{K+3} = s_{K+5} = s_{K+7} = \ldots = 0$
$l_{K+1} = 0, l_{K+3} = l_{K+5} = l_{K+7} = \ldots = 1 = s_K$
Case (B-2):
If a bit at the next to breakpoint of $g_s = 0$ ($s_K+1 = y = 0$)
$s_{K+1} = 0, s_{K+3} = s_{K+5} = s_{K+7} = \ldots = 1$
$l_{K+1} = 1, l_{K+3} = l_{K+5} = l_{K+7} = \ldots = 0 = s_K$ Corner touch can be decided by checking if the geohash pair is in one of these cases. Therefore, func_touch_corner isolates a specific region of $\ldots \| \{x\, y\, \bar{x}\, \bar{y}\, \bar{x}\, \bar{y} \ldots \bar{x}\, \bar{y} \ldots \} \| \ldots$ in $g_L$ and $\ldots \| \{\bar{x}\, \bar{y}\, x\, y\, x\, y \ldots \} \| \ldots$ in $g_S$ and compares the values therein to fixed constants. The targeted region in both geohashes is only suffixes, decided by the length of suffixes, L–K or S–K. For example, the expression shown in FIG. 26 has a suffix with S–K bits.

To transform the constants and two geohashes into the proper form to be compared, func_touch_corner at lines 17-21 cuts off constant values into L–K or S–K bits, as shown in FIG. 27. The expression depicted in FIG. 27 is cut off into S–K bits.

Therefore, cut interest basically performs mask operations as shown below:

```
//// example codes of
//  ( _100101_{new:S}, _100101_{new:L} ) = cut_interest(const _10010101..., S, L, K);
    0: mask_{S-K} = Shift left N-bit of ones by ( N – S – K );
    1: mask_{L-K} = Shift left N-bit of ones by ( N – L – K );
    2:
    3: _100101_{new:S} = 001111 & mask_{S-K};
    4: _100101_{new:L} = 001111 & mask_{L-K};
    5:
    6: return ( _100101_{new:S}, _100101_{new:L} )
```

The $g_S$ and $g_L$ should be shifted to match the bit locations $g_S$ and $g_{S:new}$ shown in FIG. 28.

An excerpt of an exemplary cut_prefix includes:

```
//// example codes of
//  g_{S:new} = cut_prefix(g_S);
    0: g_{S:new} = Shift left g_S by ( N – K );
    1: return g_{S:new} ;
```

Lines 27-32 of func_touch_corner determine whether the targeted bit locations of the geohashes match any of four cases enumerated above, and if so func_touch_corner returns true. Otherwise, func_touch_corner returns false at line 34.

IV. Experimental Results

IV-A. Introduction

The inventors named herein have actually reduced the invention to practice. Specifically, the inventors have developed and tested embodiments of both the hardware implementation discussed in Section II and the software implementation discussed in Section III. (The inventors have not patented, described in a printed publication, offered for sale, or otherwise made these embodiments available to the public prior to the filing of the present application.) The inventors compared the performance of a hardware embodiment and a software embodiment of the present invention relative to each other, and also relative to software using conventional techniques to evaluate spatial predicates using DE-9IM.

Experimental results indicate that both hardware-based and software-based embodiments of the present invention provided significant performance improvements relative to the best known prior art. For example, when employing FPGAs for exploiting the bit-level granularity of geohash codes, experimental results show end-to-end speedup of more than 20× and 90× over highly optimized single-threaded DE-91M implementations of the contain and touch predicates, respectively.

IV-B. Experimental Setup

IV-B-1. Hardware Implementation of the Present Invention

The target board employed for this project was the ADM-PCIE-7v3 board commercially available from Alpha Data Inc. The board was coupled to a Virtex® 7 FPGA (XC7VX690T-2) commercial available from Xilinx, Inc. The inventors connected the board to a host via 8 lanes of PCIe® (Peripheral Component Interconnect Express) Gen. 3, using the driver and PCIe® core provided by Alpha Data, Inc. In order to simplify development, the inventors implemented the proposed processing core using Vivado® High-Level Synthesis (HLS) 2015.2 commercially available from Xilinx, Inc. Vivado® 2015.2 was also used for bitstream generation. An embodiment of the core takes as input two geohash codes (with respective size fields) and produces four output bits per input pair (contain, touch internal, touch external, touch corner). The generated core was connected to the Alpha Data PCIe® engine via an AXI-Stream interface, and runs at 250 MHz. End-to-end performance is reported, which includes data transfer time to and from the host's main memory. The predicates evaluation core operates in a fully pipelined manner, and does not make use of the on-board memory. Virtex® and Vivado® are registered trademarks of Xilinx, Inc. PICe® and PCI Express® are registered trademarks of PCI-SIG Corp.

IV-B-2. Software Implementation of the Present Invention

The inventors used the C programming language and the GNU C Compiler to develop a software-based embodiment of the present invention which performed optimized geohash-based spatial predicates evaluation. The software was executed on a single socket 8-core high-end Intel® Xeon® processor with a 24 MB cache, running at 2.6 GHz, coupled with 256 GB of main memory. Performance is reported with input and output data being in main memory. Intel® and Xeon® are registered trademarks of Intel Corp.

IV-B-3. Software Implementation of Conventional Approaches

The aforementioned hardware and software embodiments of the present invention were compared with the closest known prior art: state-of-the-art software employing DE-9IM for predicate evaluation within the IBM® Streams and SPSS® software packages commercially available from the assignee of the present invention, International Business Machines Corp. IBM® and SPSS® are registered trademarks of International Business Machines Corp. The software was executed on a single socket 8-core high-end Intel® Xeon® processor with a 24 MB cache, running at 2.6 GHz, coupled with 256 GB of main memory. Performance is reported with input and output data being in main memory.

IV-B-4. Description of Experimental Datasets

Since the performance of the hardware and software solutions discussed above is mostly agnostic to the properties of the input data (i.e. whether or not regions contain/touch), the experiments described herein used of synthetic datasets. Geohashes were represented using 64-bits (actual geohash size could be less), while latitude/longitude are represented using double precision (64-bit) floating point each. Regions were defined using a single 64-bit geohash (for the inventive geohash-based embodiments), or 2 latitude and 2 longitude points (for the commercially-available DE-9IM software). Performance is reported in MPairs/sec, referring to the millions of pairs of regions that can be processed per second (evaluating spatial predicates).

IV-C. Experimental Results

IV-C-1. Hardware Predicate Evaluation Performance

Figure 19:
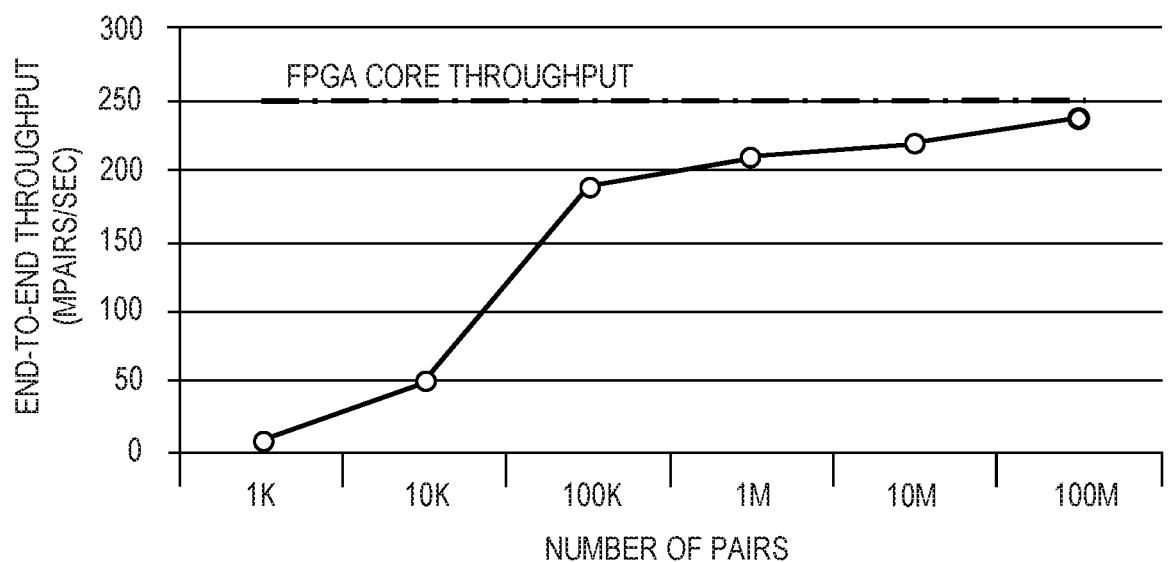
FIGS. 19-22 show experimental results obtained by the inventors using an actual reduction to practice of one or more illustrative embodiments of the present invention.

The performance of an embodiment of the present invention was evaluated utilizing FPGA hardware for predicate evaluation using batches of varying sizes. Here, a batch consists of pairs of 64-bit geohash codes that start off by residing on the host's main memory. FIG. 19 depicts the end-to-end throughput evaluating contain and touch (internal, external, corner) spatial predicates as the number of pairs increases. Since a single predicates evaluation core (running at 250 MHz) is employed on the FPGA, the theoretical peak throughput is of 250 MPairs/sec. Actual end-to-end throughput is limited by PCIe® overhead, and approximately 240 MPairs/sec is achieved for a large enough batch (100 M pairs). At this point, the available Gen. 3×8 PCIe® bandwidth is saturated; given this setup, throughput is PCIe®-bound, and adding more cores on the FPGA would not increase performance. Performance is initially limited by PCIe® overheads, and available Gen. 3×8 PCIe® bandwidth becomes saturated for larger batches.

IV-C-2. Hardware Vs. Software Performance

Figure 20:
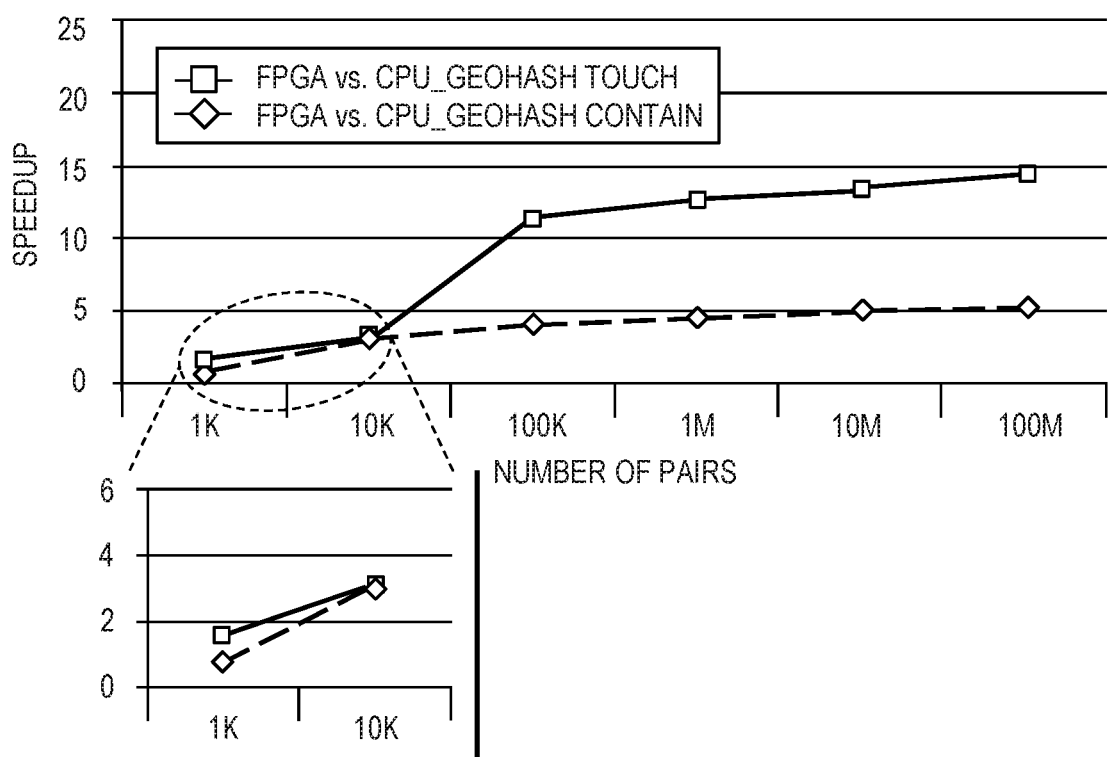

FIG. 20 shows the end-to-end speedup (and slowdown) of a hardware-based embodiment of the present invention compared to inventive single-threaded CPU-based spatial predicates evaluation systems. First, FIG. 20 shows that a software-based embodiment using inventive geohash-based techniques provided significant performance improvements. For example, for a batch of 10 M, the inventive geohash-based software implementation results in speedups of about 5× and 13× for contain and touch, respectively. Second, the FPGA-based implementation of the present invention outperforms inventive CPU-based approaches for batches larger than 1K (where slowdown occurs only for the contain predicate compared to both approaches).

Figures 21, 22:
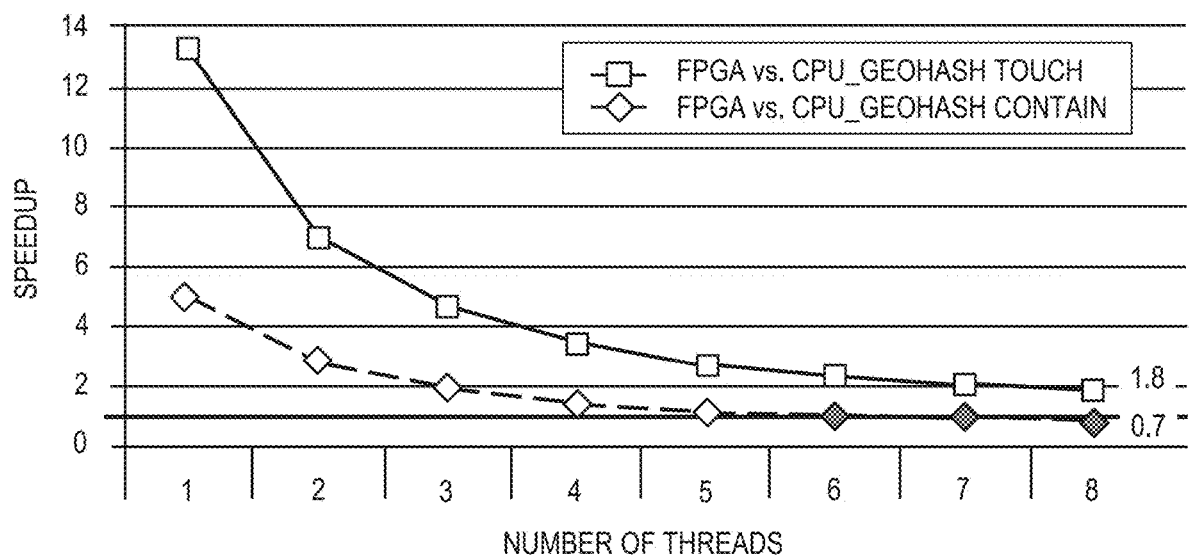

FIG. 21 depicts the end-to-end speedup of an FPGA-based embodiment of the present invention compared to a multi-threaded implementation of a software-based embodiment of the present invention utilizing a geohash-based approach. The number of software threads is increased until all hardware threads available in the CPU socket are utilized. The batch size is fixed at 10 M pairs. As expected, the relative performance advantage of the hardware-based embodiment decreases in direct proportion to the number of added threads of the software-based embodiment. The FPGA-based solution still results in 1.8× speedup for the touch predicate versus a full CPU socket, with comparable (though slower) performance evaluating the contain predicate. That said, highlighted data points below the lower line indicate slower performance of the hardware embodiment of the invention compared to the software embodiment of the invention.

IV-C-3. FPGA Resource Utilization

FIG. 22 shows resource utilization for the FPGA-based embodiment of the present invention. The proposed spatial predicates evaluation core consists mostly of bit-level operations (no complex arithmetic). FIG. 22 shows that resources used are minimal; resources are shown separately for the contain predicate evaluation, touch predicate evaluation, and finally predicate evaluations including the PCIe® interface core. The FPGA resources considered include look up tables (LUTs), flip-flops (FFs), digital signal processors (DSPs), and the 18 K of available block random access memory (BRAM). Predicate evaluation cores utilize around 1% of resources (of a relatively large FPGA) standalone, and around 10% when including the PCIe core. These results showcase the ability of FPGAs to leverage the bit-level composition of geohash codes, attaining high performance whilst utilizing minimal resources.

V. Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 23:
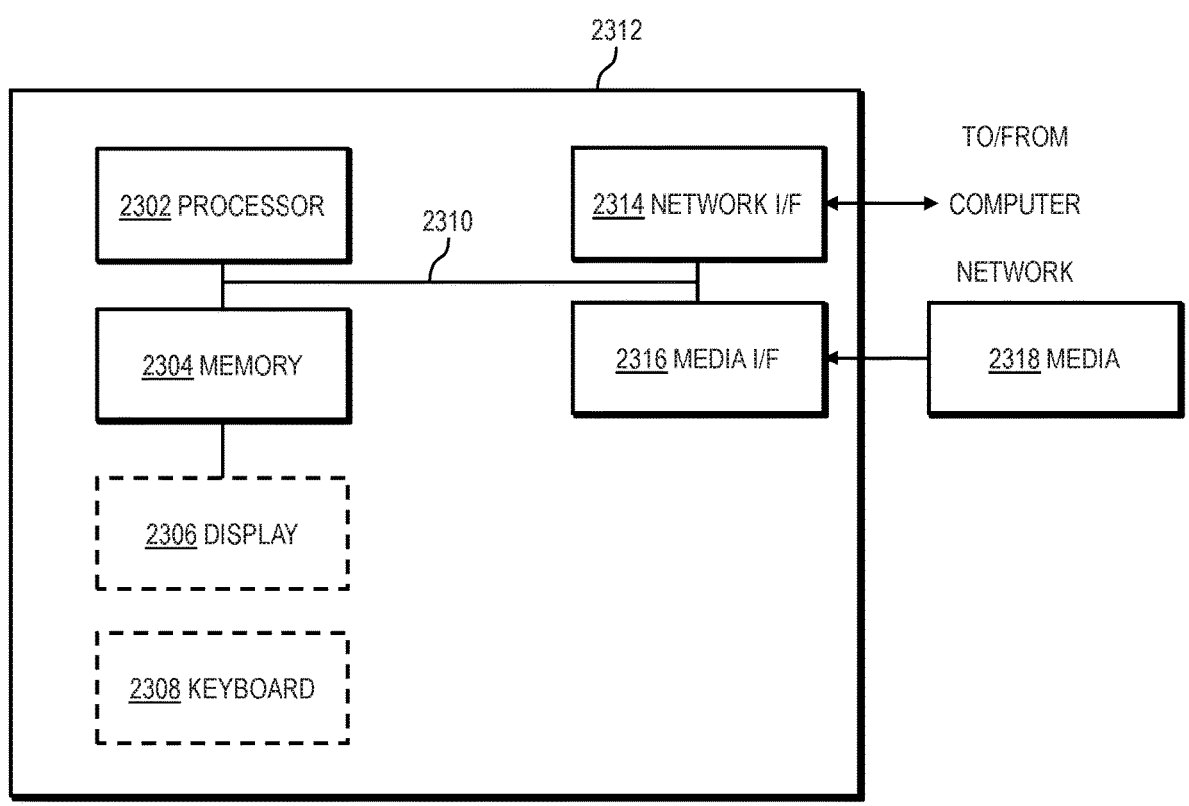
FIG. 23 depicts a computer system that may be useful in implementing one or more aspects and/or elements of the invention.

One or more embodiments can make use of software running on a general purpose computer or workstation which, when configured according to one or more embodiments of the invention, becomes a special-purpose apparatus. With reference to FIG. 23, such an implementation might employ, for example, a processor 2302, a memory 2304, and an input/output interface formed, for example, by a display 2306 and a keyboard 2308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 2302, memory 2304, and input/output interface such as display 2306 and keyboard 2308 can be interconnected, for example, via bus 2310 as part of a data processing unit 2312. Suitable interconnections, for example via bus 2310, can also be provided to a network interface 2314, such as a network card, which can be provided to interface with a computer network, and to a media interface 2316, such as a diskette or CD-ROM drive, which can be provided to interface with media 2318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 2302 coupled directly or indirectly to memory elements 2304 through a system bus 2310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 2308, displays 2306, pointing devices, and the like) can be coupled to the system either directly (such as via bus 2310) or through intervening I/O controllers (omitted for clarity).

Network adapters such as network interface 2314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 2312 as shown in FIG. 23) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 2318 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer readable storage medium may be any non-transitory medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that at least a portion of one or more modules of the flowchart illustrations and/or block diagrams, and combinations of modules in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved and/or the specific application in which the method is employed. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a non-transitory computer readable storage medium; the modules can include, for example, any or all of the elements depicted in the block diagrams and/or described herein; by way of example only and without limitation, an equal operator, a subtraction operator, a shift-right-by-one operator, a shift-left-by-one operator, an adder, a divide-by-two operator and a multiplexer. The method steps can then be carried out using the distinct software modules and/or sub-modules of the system, as described above, executing on one or more hardware processors 2302. Further, a computer program product can include a non-transitory computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuits (ASICs), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of performing an evaluation of a spatial predicate for a first region and a second region, the method comprising:
   receiving, by a geohash primitive calculation module, a first set of one or more geohashes representing a first region;
   receiving, by the geohash primitive calculation module, a second set of one or more geohashes representing a second region;
   for each geohash within the first set of one or more geohashes:
      performing, in real-time using the geohash primitive calculation module, a respective pairwise evaluation of a first spatial primitive for the geohash within the first set and each of the geohashes within the second set, to produce a set of first binary results corresponding to respective ones of the geohashes within the second set; and
      combining the set of first binary results using a first Boolean logic operator to produce one of a set of second binary results corresponding to respective ones of the geohashes within the first set; and
   combining the set of second binary results using a second Boolean logic operator to produce a set of third binary results as an output of a computer, the set of third binary results corresponding to the evaluation of the spatial predicate for the first region and the second region.

2. The method of claim 1, wherein a first one of the set of third binary results respectively corresponds to at least the first spatial primitive and a second spatial primitive, the method further comprising the steps of:
   for each geohash within the first set of one or more geohashes:
      performing a respective pairwise evaluation of the second spatial primitive for the geohash within the first set and each of the geohashes within the second set, to produce another set of first binary results corresponding to respective ones of the geohashes within the second set; and
      combining the other set of first binary results using a third Boolean logic operator to produce one of another set of second binary results corresponding to respective ones of the geohashes within the first set; and combining the other set of second binary results using a fourth Boolean logic operator to produce a second one of the set of third binary results corresponding to a second spatial predicate; and combining the set of third binary results using a fifth Boolean logic operator to produce a fourth binary result, wherein the fourth binary result is the evaluation of the spatial predicate for the first region and the second region.

3. The method of claim 2, wherein the spatial predicate is "disjoint;"
the first spatial primitive is "contains;"
the first Boolean logic operator is OR;
the second Boolean logic operator is NOR;
the second spatial primitive is "touches (external OR corner);"
the third Boolean logic operator is OR;
the fourth Boolean logic operator is NOR; and
the fifth Boolean logic operator is AND.

4. The method of claim 2, wherein the spatial predicate is "touch;"
the first spatial primitive is "touches (external OR corner);"
the first Boolean logic operator is OR;
the second Boolean logic operator is OR;
the second spatial primitive is "contains;"
the third Boolean logic operator is OR;
the fourth Boolean logic operator is NOR; and
the fifth Boolean logic operator is AND.

5. The method of claim 2, wherein the spatial predicate is "intersects;"
the first spatial primitive is "contains;"
the first Boolean logic operator is OR;
the second Boolean logic operator is OR;
the second spatial primitive is "touches;"
the third Boolean logic operator is OR;
the fourth Boolean logic operator is OR; and
the fifth Boolean logic operator is OR.

6. The method of claim 1, wherein the spatial predicate is "equals;"
the first spatial primitive is "equals;"
the first Boolean logic operator is OR; and
the second Boolean logic operator is AND.

7. The method of claim 1, wherein the spatial predicate is "touchBorder;"
the first spatial predicate is "touches;"
the first Boolean logic operator is OR; and
the second Boolean logic operator is OR.

8. The method of claim 1, wherein the spatial predicate is "contains;"
the first spatial predicate is "contains;"
the first Boolean logic operator is OR; and
the second Boolean logic operator is AND.

9. The method of claim 1, wherein at least a portion of the geohash primitive calculation module is implemented using a field-programmable gate array.

10. The method of claim 1, wherein performing the respective pairwise evaluation of the first spatial primitive for the geohash within the first set and each of the geohashes within the second set is achieved using parallel hardware in the geohash primitive calculation module.

11. The method of claim 1, wherein at least the evaluation of the first spatial primitive is performed by the geohash primitive calculation module in a fully pipelined manner.

12. The method of claim 11, wherein evaluation of the first spatial primitive by the geohash primitive calculation module is performed in a fully pipelined manner regardless of a length or size of the geohash.

13. The method of claim 1, wherein each of the set of third binary results comprises a single bit indicating whether a respective spatial primitive is satisfied with respect to respective input geohashes in the first and second set of one or more geohashes.

* * * * *